(12) United States Patent
Sato et al.

(10) Patent No.: US 12,019,941 B2
(45) Date of Patent: Jun. 25, 2024

(54) INFORMATION PROCESSING APPARATUS AND INFORMATION PROCESSING METHOD

(71) Applicant: SATURN LICENSING LLC, New York, NY (US)

(72) Inventors: Masahiko Sato, Tokyo (JP); Hideaki Miyahara, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/637,645

(22) PCT Filed: Aug. 20, 2020

(86) PCT No.: PCT/JP2020/031379
§ 371 (c)(1),
(2) Date: Feb. 23, 2022

(87) PCT Pub. No.: WO2021/044851
PCT Pub. Date: Mar. 11, 2021

(65) Prior Publication Data
US 2022/0276822 A1  Sep. 1, 2022

(30) Foreign Application Priority Data
Sep. 3, 2019 (JP) ................. 2019-160125

(51) Int. Cl.
*G06F 3/14* (2006.01)
*G06K 19/06* (2006.01)
*G06V 40/12* (2022.01)

(52) U.S. Cl.
CPC ..... *G06F 3/1454* (2013.01); *G06K 19/06037* (2013.01); *G06V 40/1365* (2022.01)

(58) Field of Classification Search
None
See application file for complete search history.

(56) References Cited

U.S. PATENT DOCUMENTS

2014/0085486 A1\* 3/2014 Emura ............... H04N 23/64
 348/207.1
2014/0240445 A1\* 8/2014 Jaynes .................. G09G 5/14
 348/14.07

(Continued)

FOREIGN PATENT DOCUMENTS

EP   3144819 A   3/2017
JP   2014-068206 A   4/2014
(Continued)

OTHER PUBLICATIONS

International Search Report and Written Opinion of PCT Application No. PCT/JP2020/031379, issued on Nov. 17, 2020, 09 pages of ISRWO.

*Primary Examiner* — Nicholas J Lee
(74) *Attorney, Agent, or Firm* — Jeffery J. Brosemer

(57) ABSTRACT

The present technology relates to an information processing apparatus and an information processing method that enable screen sharing to be easily and reliably performed. Provided is an information processing apparatus including a processing unit that generates, on the basis of a message transmitted from a sharing source device that performs screen sharing, identification information that identifies the information processing apparatus serving as a sharing candidate device as a candidate for screen sharing, provides the sharing source device with device information regarding the information processing apparatus, and outputs the generated identification information. The present technology can be applied to a device that performs screen sharing.

11 Claims, 40 Drawing Sheets

(56) References Cited

U.S. PATENT DOCUMENTS

| | | |
|---|---|---|
| 2016/0055826 A1 | 2/2016 | Abe et al. |
| 2017/0031586 A1* | 2/2017 | Kondo .................... G06F 3/147 |
| 2017/0086014 A1* | 3/2017 | Hwang ................... H04L 67/55 |
| 2017/0300285 A1 | 10/2017 | Yoshida |

FOREIGN PATENT DOCUMENTS

| | | |
|---|---|---|
| JP | 2016-045291 A | 4/2016 |
| JP | 2016-071637 A | 5/2016 |
| JP | 2017-191189 A | 10/2017 |
| WO | 2014/207798 A1 | 12/2014 |
| WO | 2015/174112 A1 | 11/2015 |

* cited by examiner

FIG. 10

```
<device>
    <deviceType>urn:schemas-upnp-org:device: deviceType : v </deviceType>
    <friendlyName> short user-friendly title </friendlyName>
    <manufacturer> manufacturer name </manufacturer>
    <manufacturerURL> URL to manufacturer site</manufacturerURL>
    <modelDescription> long user-friendly title </modelDescription>
    <modelName> model name </modelName>
    <modelNumber> model number </modelNumber>
    <modelURL> URL to model site </modelURL>
    <serialNumber> manufacturer's serial number </serialNumber>
    <UDN>uuid: UUID </UDN>
    <UPC> Universal Product Code </UPC>
    <iconList>
        <icon>
            <mimetype>image/format </mimetype>
            <width> horizontal pixels </width>
            <height> vertical pixels </height>
            <depth> color depth </depth>
            <url> URL to icon </url>
        </icon>
        <!-- XML to declare other icons, if any,go here -->
    </iconList>
    ::::
</device>
```

FIG. 11

```
<displaySource>
<url> relative address value/filename </url>
</displaySource>
```

FIG. 22

```
<renderPattern>
<url> relative address value/filename </url>
</renderPattern>
```

FIG. 25

```
<renderPattern>
<url> relative address value/filename </url>
</renderPattern>
```

FIG. 28

```
<soundSource>
  <url> relative address value/filename </url>
</soundSource>
<displaySource>
  <url> relative address value/filename </url>
</displaySource>
```

FIG. 29

```
<device>
  <deviceType>urn:schemas-upnp-org:device: deviceType : v </deviceType>
  <friendlyName> short user-friendly title </friendlyName>
  <manufacturer> manufacturer name </manufacturer>
  <manufacturerURL> URL to manufacturer site</manufacturerURL>
  <modelDescription> long user-friendly title </modelDescription>
  <modelName> model name </modelName>
  <modelNumber> model number </modelNumber>
  <modelURL> URL to model site </modelURL>
  <serialNumber> manufacturer's serial number </serialNumber>
  <UDN>uuid: UUID </UDN>
  <UPC> Universal Product Code </UPC>
  <iconList>
    <icon>
      <mimetype>image/format </mimetype>
      <width> horizontal pixels </width>
      <height> vertical pixels </height>
      <depth> color depth </depth>
      <url> URL to icon </url>
    </icon>
    <!-- XML to declare other icons, if any, go here -->
  </iconList>

<displaySource>
    <picture_url>relative address value/filename </picture_url>: DISPLAY IMAGE FILE
    <fingerprint_url>relative address value/filename </fingerprint_url>: IMAGE FINGERPRINT FILE
  </displaySource>
  <soundSource>
    <fingerprint_url>relative address value/filename </fingerprint_url>: AUDIO FINGERPRINT FILE
  </soundSource>
  <deviceID> random number value </deviceID> <DISPLAY RANDOM NUMBER FILE>
  <2dCode> 2d code value </2dCode>: DISPLAY TWO-DIMENSIONAL CODE FILE
  <renderPattern>
    <soundEmission_url> relative address value/filename </soundEmission_url>: SOUND WAVE PATTERN FILE
    <lightEmission_url> relative address value/filename </lightEmission_url>: LIGHT EMISSION PATTERN FILE
  </renderPattern>
  ::::::
</device>
```

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/031379 filed on Aug. 20, 2020, which claims priority benefit of Japanese Patent Application No. JP 2019-160125 filed in the Japan Patent Office on Sep. 3, 2019. Each of the above-referenced applications is hereby incorporated herein by reference in its entirety.

TECHNICAL FIELD

The present technology relates to an information processing apparatus and an information processing method, and more particularly to an information processing apparatus and an information processing method that enable screen sharing to be easily and reliably performed.

BACKGROUND ART

In recent years, devices that enable viewing and listening content have been diversified, and there are various methods for users to view and listen content.

For example, there is a method for viewing and listening content while sharing a screen between devices. As a technique related to this type of screen sharing, a technique disclosed in Patent Document 1, or the like is known.

CITATION LIST

Patent Document

Patent Document 1: Japanese Patent Application Laid-Open No. 2016-71637

SUMMARY OF THE INVENTION

Problems to be Solved by the Invention

Incidentally, when screen sharing is performed between devices, the screen sharing is required to be performed easily and reliably.

The present technology has been developed in view of the above circumstances, and is to enable screen sharing to be easily and reliably performed.

Solutions to Problems

An information processing apparatus according to one aspect of the present technology is an information processing apparatus including a processing unit that generates, on the basis of a message transmitted from a sharing source device that performs screen sharing, identification information that identifies the information processing apparatus serving as a sharing candidate device as a candidate for screen sharing, provides the sharing source device with device information regarding the information processing apparatus, and outputs the generated identification information.

An information processing method according to one aspect of the present technology is an information processing method including, by an information processing apparatus, generating, on the basis of a message transmitted from a sharing source device that performs screen sharing, identification information that identifies the information processing apparatus serving as a sharing candidate device as a candidate for screen sharing, providing the sharing source device with device information regarding the information processing apparatus, and outputting the generated identification information.

In an information processing apparatus and information processing method according to one aspect of the present technology, on the basis of a message transmitted from a sharing source device that performs screen sharing, identification information that identifies the information processing apparatus serving as a sharing candidate device as a candidate for screen sharing is generated, the sharing source device is provided with device information regarding the information processing apparatus, and the generated identification information is output.

An information processing apparatus according to one aspect of the present technology is an information processing apparatus including a processing unit that acquires device information regarding a sharing candidate device as a candidate for screen sharing, acquires identification information that identifies the sharing candidate device, and decides, on the basis of the acquired device information and the acquired identification information, a sharing target device as a target for screen sharing from among a plurality of the sharing candidate devices.

An information processing method according to one aspect of the present technology is an information processing method including, by an information processing apparatus, acquiring device information regarding a sharing candidate device as a candidate for screen sharing, acquiring identification information that identifies the sharing candidate device, and deciding, on the basis of the acquired device information and the acquired identification information, a sharing target device as a target for screen sharing from among a plurality of the sharing candidate devices.

In an information processing apparatus and information processing method according to one aspect of the present technology, device information regarding a sharing candidate device as a candidate for screen sharing is acquired, identification information that identifies the sharing candidate device is acquired, and a sharing target device as a target for screen sharing is decided from among a plurality of the sharing candidate devices on the basis of the acquired device information and the acquired identification information.

Note that an information processing apparatus according to one aspect of the present technology may be an independent apparatus or may be an inner block including one apparatus.

BRIEF DESCRIPTION OF DRAWINGS

FIG. 10 is a diagram illustrating an example of description for a device description.

FIG. 11 is a diagram illustrating an example of description of an address of an image file.

FIG. 22 is a diagram illustrating an example of description of an address of a sound wave pattern file.

FIG. 25 is a diagram illustrating an example of description of an address of a light emission pattern file.

FIG. 28 is a diagram illustrating an example of description of an address of a fingerprint file.

FIG. 29 is a diagram illustrating an example of description for a device description in a case where a plurality of screen sharing methods is provided.

MODE FOR CARRYING OUT THE INVENTION

Hereinafter, an embodiment of the present technology will be described with reference to the drawings. Note that the description will be given in the following order.
 1. Embodiment of the Present Technology
 2. Modifications 1. Embodiment of the Present Technology (Current Screen Sharing Method)

Figure 1:
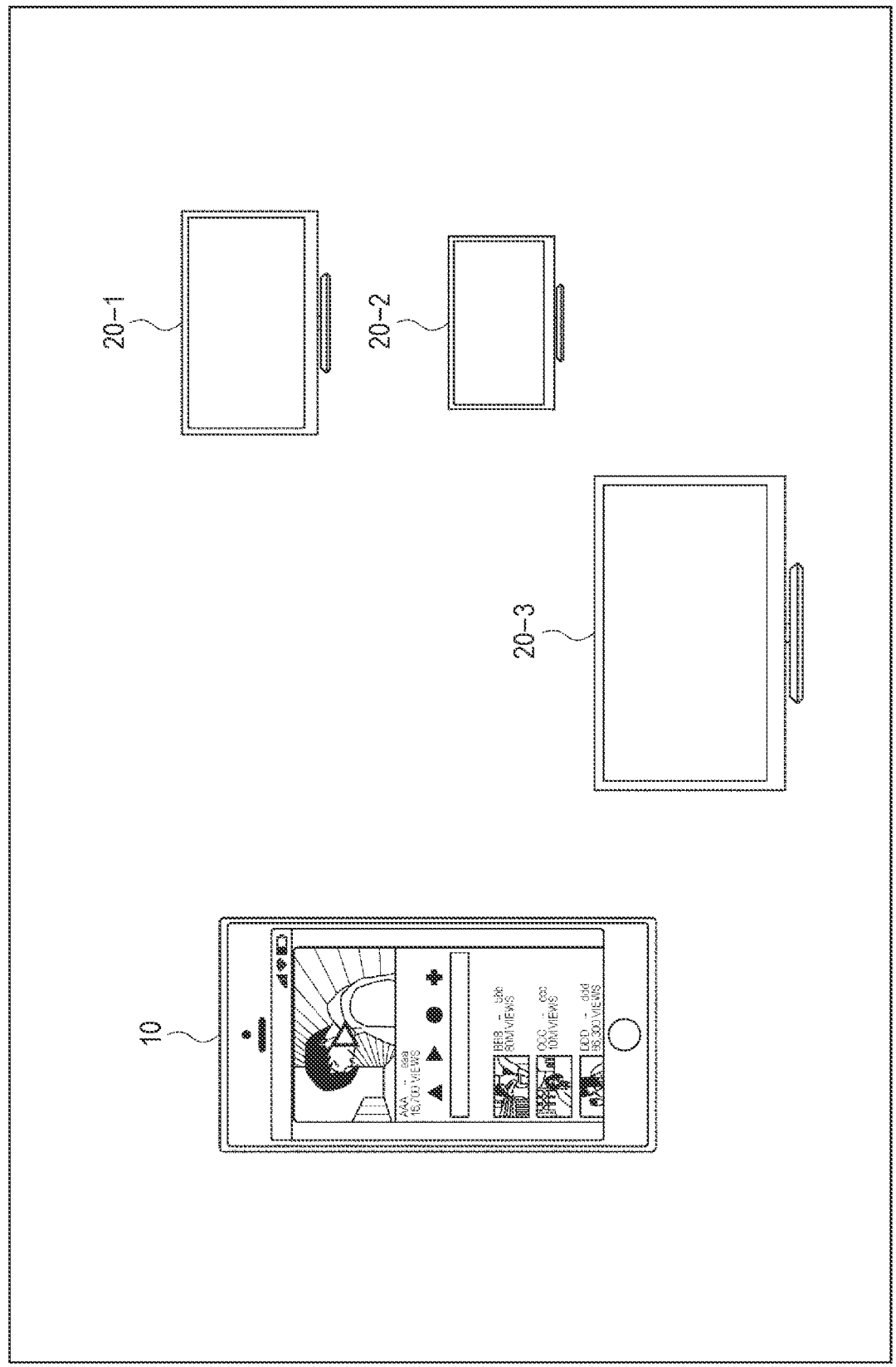
FIG. 1 is a diagram for describing a current screen sharing method.
Figure 2:
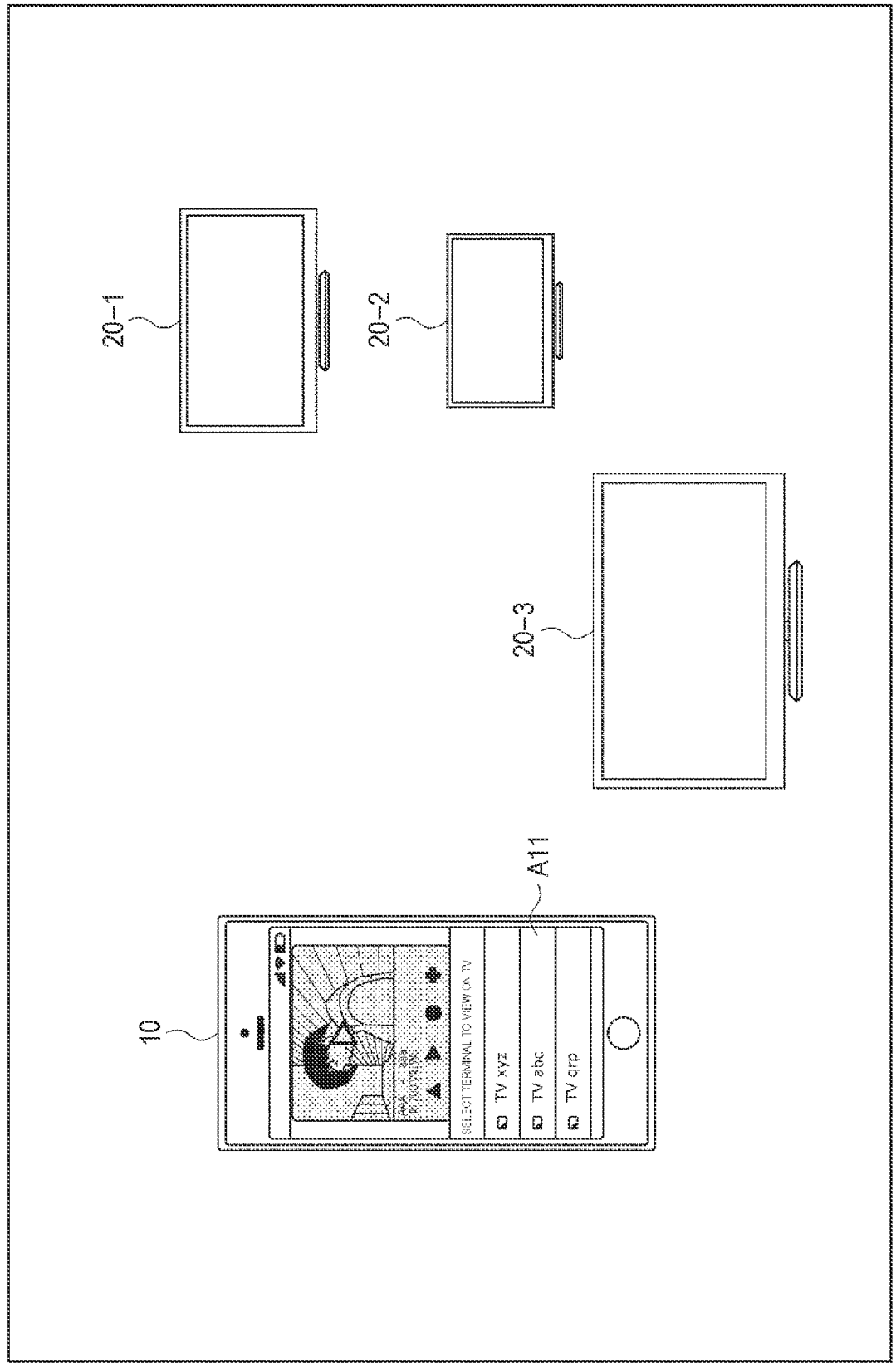
FIG. 2 is a diagram for describing the current screen sharing method.

As a method in which a certain device shares a screen with another device and displays content of a moving image, still image, or the like, there are methods as illustrated in FIGS. 1 and 2.

FIG. 1 illustrates a case where an information device 10 such as a smartphone performs screen sharing with any one of display devices 20-1 to 20-3 such as television receivers. That is, with content of a moving image or the like displayed on a screen of the information device 10 at hand of a user as a source, operation of displaying the content on any one of the display devices 20-1 to 20-3 as candidates for screen sharing is performed.

In FIG. 1, the information device 10 and the display devices 20-1 to 20-3 are devices compliant with Universal Plug and Play (UPnP), and are connected via a home network such as a wireless local area network (LAN).

On the information device 10, when screen sharing of a moving image or the like is performed, a list of friendly names (FriendlyName) ("TV xyz", "TV abc", and "TV qrp") indicating the respective display devices 20 is displayed as a selection screen All on the basis of device descriptions acquired from the display devices 20-1 to 20-3 (FIG. 2).

With this arrangement, the user can check the friendly names from the selection screen All displayed on the information device 10, but cannot identify which friendly name corresponds to which display device 20, and therefore, it is difficult to distinguish each of the display devices 20.

Therefore, in a case where the user selects a friendly name from the list on the selection screen All of the information device 10, for example, screen sharing may be performed with the display device 20-1 or the display device 20-2, which is different from the display device 20-3 that is desired.

Furthermore, Patent Document 1 described above discloses that a certain device receives a status of another device, which shares a display screen with the certain device, from the another device (described in paragraph 0006). However, it is difficult to identify a device only with a status of the device in a case where there is a plurality of other devices. Therefore, depending on operation by a user, there is a possibility that the screen is shared with an unintended device.

Therefore, the present technology proposes a screen sharing method (hereinafter, also referred to as a novel method) that enables screen sharing with a desired display device 20 easily and reliably when content of a moving image or the like that can be displayed on an information device 10 is displayed on any one of the plurality of display devices 20 that is candidates for screen sharing. Hereinafter, detailed content of the novel method will be described with reference to FIGS. 3 to 30.

Note that, in FIG. 1 and the like, assuming a case in which the information device 10 and display devices 20-1 to 20-3 are devices compliant with Digital Living Network Alliance (DLNA (registered trademark)) standards, it can be said that the information device 10 operates as a digital media controller (DMC) device, and that each of the display devices 20-1 to 20-3 operates as a digital media renderer (DMR) device. DLNA is formulated based on UPnP.

(Configuration of System)

Figure 3:
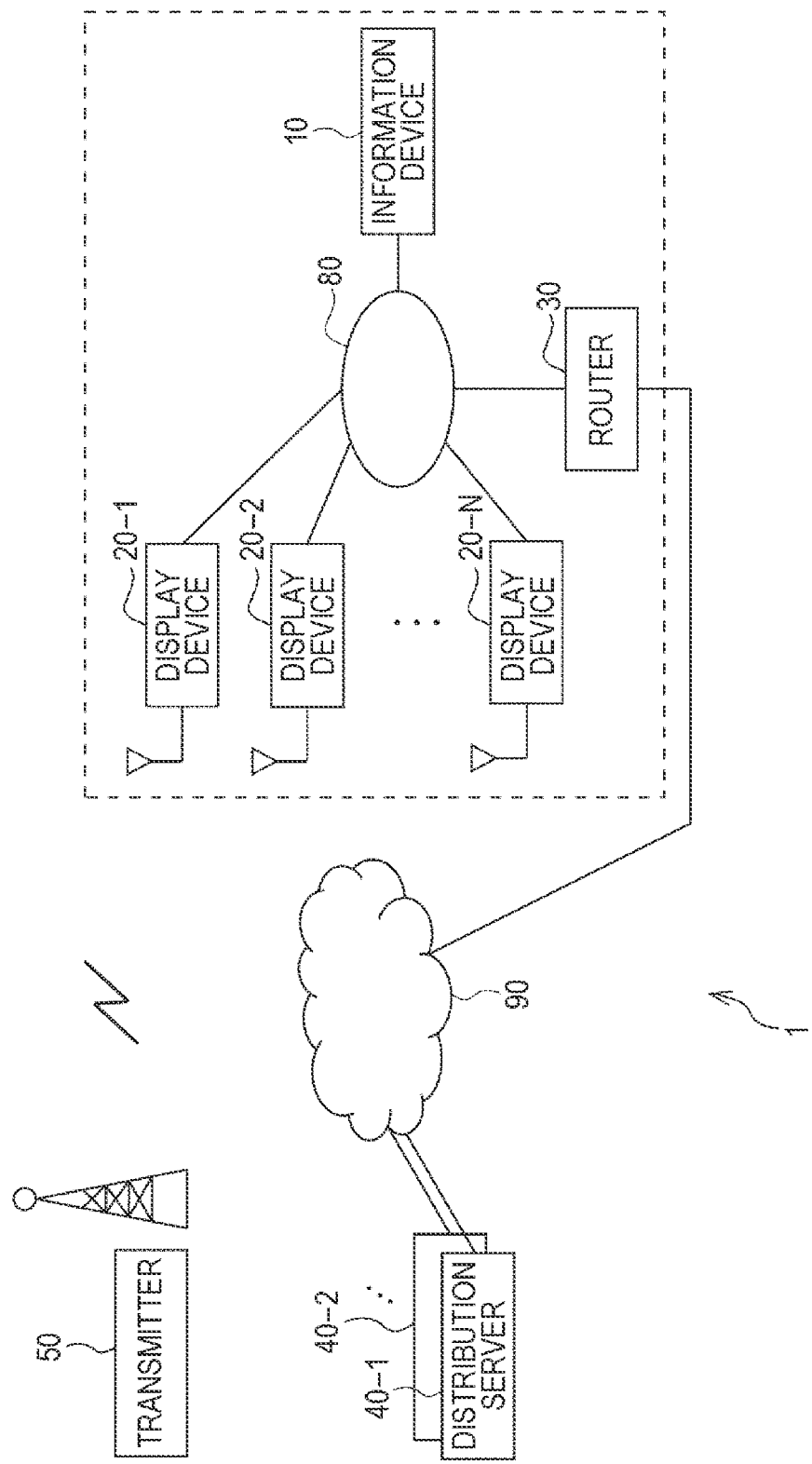
FIG. 3 is a diagram illustrating an example of a configuration of one embodiment of an information processing system to which the present technology is applied.

FIG. 3 is illustrates an example of a configuration of a content reproduction system 1 as one embodiment of an information processing system to which the present technology is applied.

In FIG. 3, the information device 10, display devices 20-1 to 20-N (N: an integer of 2 or more), and a router 30 are mutually connected via a network 80. The network 80 includes a home network such as a wireless LAN constructed in a predetermined space such as a home of the user or a conference room of a company.

The information device 10 is a device having a predetermined user interface (UI), such as a smartphone, a mobile phone, a tablet terminal, a remote controller, a wearable device, a portable music player, a game machine, or a personal computer.

The information device 10 performs various operations corresponding to operation by the user on the predetermined user interface. For example, the information device 10 can share a screen with any one of the display devices 20-1 to 20-N via the network 80 according to operation by the user.

The display device 20-1 is a device having a predetermined display function, such as a television receiver, a display apparatus, a tablet terminal, a personal computer, or a projector. Furthermore, the display device 20-1 may be a home appliance such as a refrigerator having a display, an acoustic device such as a smart speaker (smart display) having a display, or the like.

The display device 20-1 can share a screen with the information device 10 via the network 80.

Each of the display devices 20-2 to 20-N is configured as a device such as a television receiver similarly to the display device 20-1. Each of the display devices 20-2 to 20-N can share a screen with the information device 10.

Note that, in the following description, the display devices 20-1 to 20-N will be simply referred to as a display device 20 in a case where the display devices are not particularly necessary to be distinguished from one another. Furthermore, in the following description, a case where the display device 20 is a television receiver will be exemplified.

Furthermore, In FIG. 3, the router 30 can be connected to a network 90. The network 90 includes a communication network such as the Internet, an intranet, or a mobile telephone network. The router 30 connects the network 80 and the network 90 and relays data exchanged between the networks.

External servers such as distribution servers 40-1 to 40-M (M: an integer of 1 or more) are connected to the network 90.

The distribution server 40-1 includes one or a plurality of servers, and is installed at a data center or the like. The distribution server 40-1 is provided by a provider or the like that provides a service such as a video distribution service. The distribution server 40-1 distributes communication content such as a moving image via the network 90 or the like in response to a request from the information device 10 or the display device 20.

Similarly to the distribution server 40-1, each of the distribution servers 40-2 to 40-M distributes communication content such as a moving image in response to a request from the information device 10 or the display device 20. Note that, in the following description, the distribution servers 40-1 to 40-M will be simply referred to as a distribution server 40 in a case where the distribution servers are not particularly necessary to be distinguished from one another.

The information device 10 or the display device 20 transmits a communication content distribution request to the distribution server 40 via the network 90 or the like. The information device 10 or the display device 20 receives and processes the streaming data transmitted from the distribution server 40 via the network 90 or the like, and outputs a screen image and audio of communication content such as a moving image.

Furthermore, via an antenna, the display device 20 can receive a broadcast signal transmitted from a transmitter 50 via a radio tower or the like. The display device 20 receives and processes a broadcast signal corresponding to tuning operation by the user, and outputs a screen image and audio of broadcast content of a television program or the like.

(Configuration of Information Device)

Figure 4:
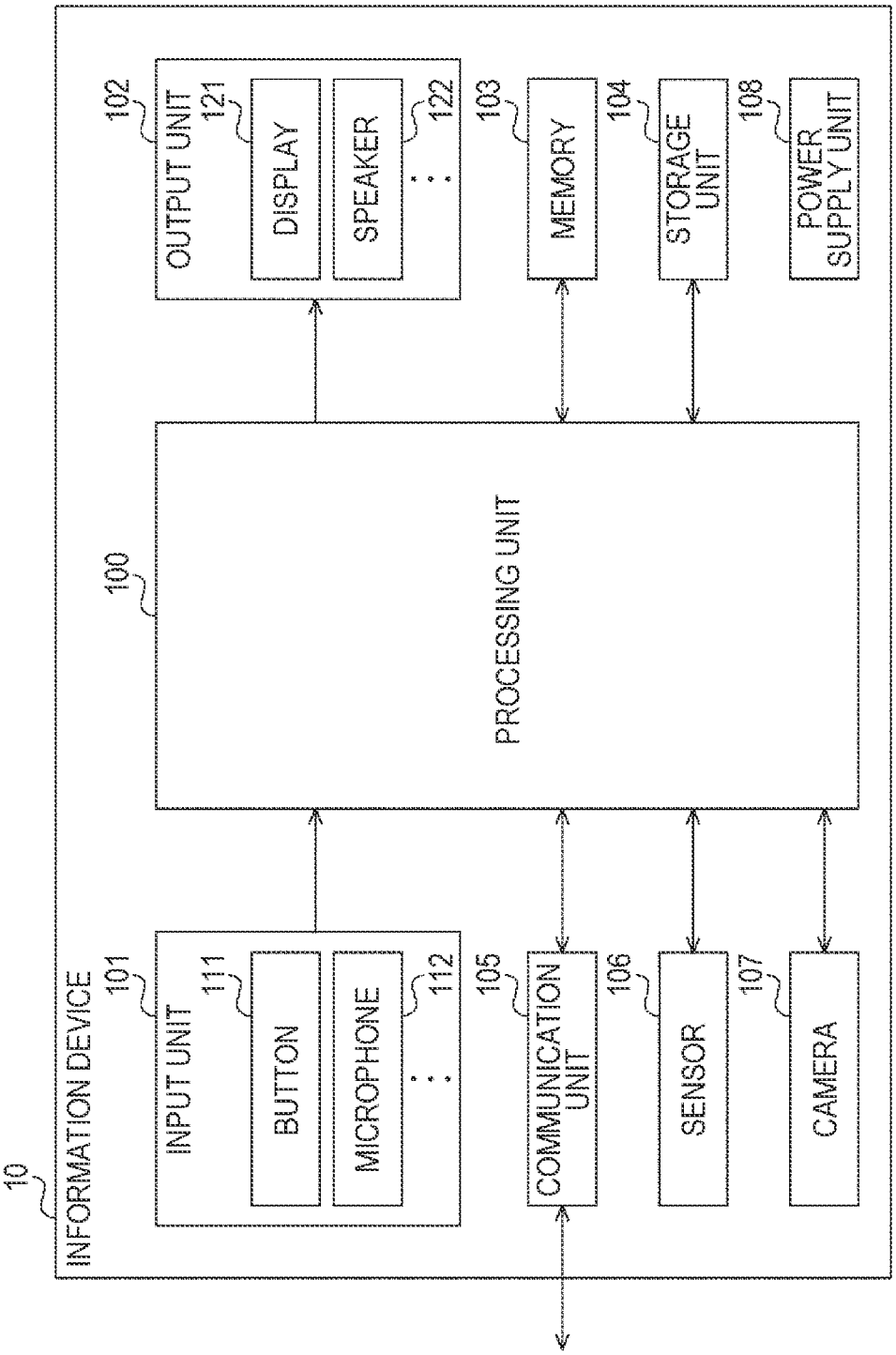
FIG. 4 is a block diagram illustrating an example of a configuration of one embodiment of an information processing apparatus to which the present technology is applied.

FIG. 4 illustrates an example of a configuration of the information device 10 in FIG. 3 as one embodiment of an information processing apparatus to which the present technology is applied.

In FIG. 4, the information device 10 includes a processing unit 100, an input unit 101, an output unit 102, a memory 103, a storage unit 104, a communication unit 105, a sensor 106, a camera 107, and a power supply unit 108.

The processing unit 100 includes a processor or the like such as a central processing unit (CPU). The processing unit 100 is a main processing apparatus (control apparatus) that controls operation of each unit and performs various arithmetic processing.

The input unit 101 is an input apparatus such as a physical button 111 or a microphone 112. The input unit 101 supplies operation data corresponding to operation by the user to the processing unit 100. The processing unit 100 controls operation of each unit on the basis of the operation data from the input unit 101.

The output unit 102 is an output apparatus such as a display 121, a speaker 122, or the like. The output unit 102 outputs information corresponding to various data under control of the processing unit 100.

The display 121 is a display unit that displays a screen image corresponding to screen image data from the processing unit 100. Note that the display 121 may be configured as a touch panel along with an input unit that supplies the processing unit 100 with operation data corresponding to a contact position (position of a predetermined point) when a finger of the user comes in contact with (touches) a surface of a screen of the display 121.

The speaker 122 outputs audio (sound) corresponding to audio data from the processing unit 100.

The memory 103 is a semiconductor memory such as a random access memory (RAM). The memory 103 temporarily stores various data processed by the processing unit 100.

The storage unit 104 is an auxiliary storage apparatus including a semiconductor memory such as a non-volatile memory. The storage unit 104 may be configured as an internal storage or may be an external storage such as a memory card. The storage unit 104 stores various data under control of the processing unit 100.

The communication unit 105 is a communication apparatus including a communication module that supports wireless communication such as wireless LAN, cellular communication (for example, LTE-Advanced, 5G, or the like), or near field communication (for example, Bluetooth (registered trademark) or the like), or wired communication. The communication unit 105 communicates with another device via the network 80 or the like under control of the processing unit 100.

Specifically, the communication unit 105 exchanges various data with the display device 20 via the network 80 under control of the processing unit 100.

Furthermore, via the network 80 or the like, the communication unit 105 requests the distribution server 40 to distribute communication content such as a moving image. The communication unit 105 receives the streaming data transmitted from the distribution server 40 via the network 90 or the like, and supplies the streaming data to the processing unit 100.

The processing unit 100 performs processing such as decoding on the streaming data from the communication unit 105, by which a screen image of communication content such as a moving image is displayed on the display 121 and audio of the communication content is output from the speaker 122.

The sensor 106 includes various sensor devices or the like. The sensor 106 performs sensing of the user, vicinity thereof, or the like, and supplies the processing unit 100 with sensing data obtained as a result. The processing unit 100 performs various processing on the basis of the sensing data from the sensor 106.

Here, the sensor 106 can include an acceleration sensor that measures acceleration, a gyro sensor that measures an angle (orientation), angular velocity, or angular acceleration, a biological sensor that measures information such as a heart rate, body temperature, or posture of a living thing, a magnetic sensor that measures a magnitude or direction of a magnetic field (magnetic field), a proximity sensor that measures a nearby object, or the like.

The camera 107 includes an optical system, an image sensor, a signal processing circuit, or the like. The camera 107 captures an image of a subject, and supplies the processing unit 100 with imaging data obtained as a result. The processing unit 100 performs various processing on the basis of the imaging data from the camera 107.

The power supply unit 108 includes a battery such as a secondary battery and a power supply management circuit, and supplies power to each unit including the processing unit 100.

Figure 5:
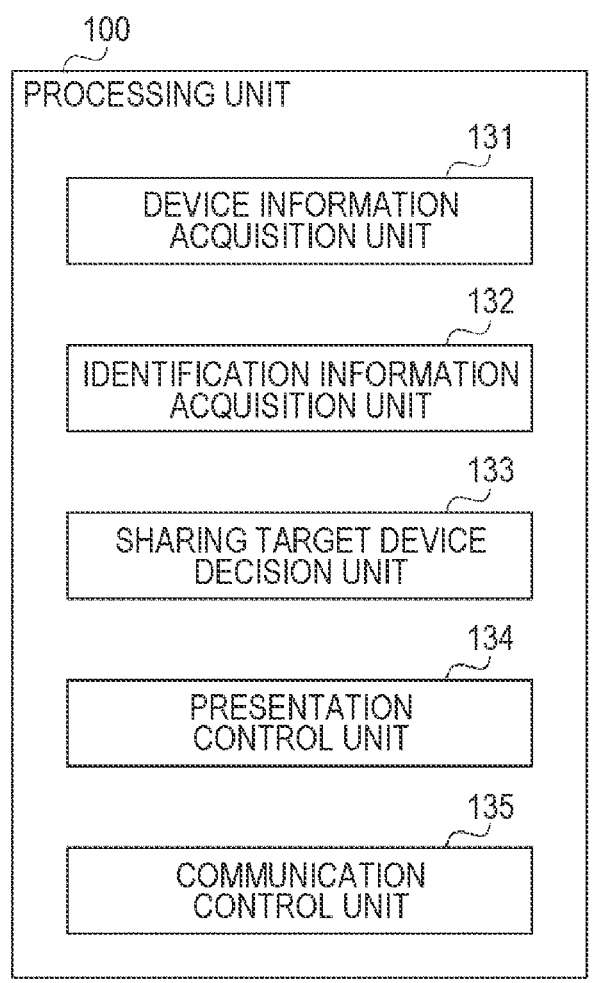
FIG. 5 is a block diagram illustrating an example of a functional configuration of a processing unit in FIG. 4.

FIG. 5 illustrates an example of a functional configuration of the processing unit 100 in FIG. 4.

In FIG. 5, the processing unit 100 includes a device information acquisition unit 131, an identification information acquisition unit 132, a sharing target device decision unit 133, a presentation control unit 134, and a communication control unit 135.

The device information acquisition unit 131 acquires device information provided by the display device 20 and supplies the device information to the sharing target device decision unit 133.

The device information is information regarding a sharing candidate device that is a candidate for screen sharing. The device information includes a device description. Here, in a case where the information device 10 is a sharing source device that performs screen sharing, the sharing candidate devices are a plurality of display devices 20 connected to the network 80.

The identification information acquisition unit 132 acquires identification information generated by the display device 20 and supplies the identification information to the sharing target device decision unit 133.

The identification information is information for identifying a sharing candidate device. The identification information includes information regarding an image, text, a code, or the like. Furthermore, the device information such as a device description includes information regarding identification information (for example, an address of an image file, or the like).

The sharing target device decision unit 133 decides a display device 20 as a target for screen sharing from among the plurality of display devices 20 on the basis of the device information acquired by the device information acquisition unit 131 and the identification information acquired by the identification information acquisition unit 132.

Here, it can be said that the display device 20 decided by the sharing target device decision unit 133 is the sharing target device selected as the target for screen sharing from among the plurality of sharing candidate devices.

Note that details of processing for deciding a sharing target device executed by the sharing target device decision unit 133 will be described in first to eighth examples of the screen sharing method to be described later.

The presentation control unit 134 controls the output unit 102 such as the display 121 or the speaker 122 to present information corresponding to various data.

The communication control unit 135 controls the communication unit 105 to perform communication with another device via the network 80 or the like.

Figure 6:
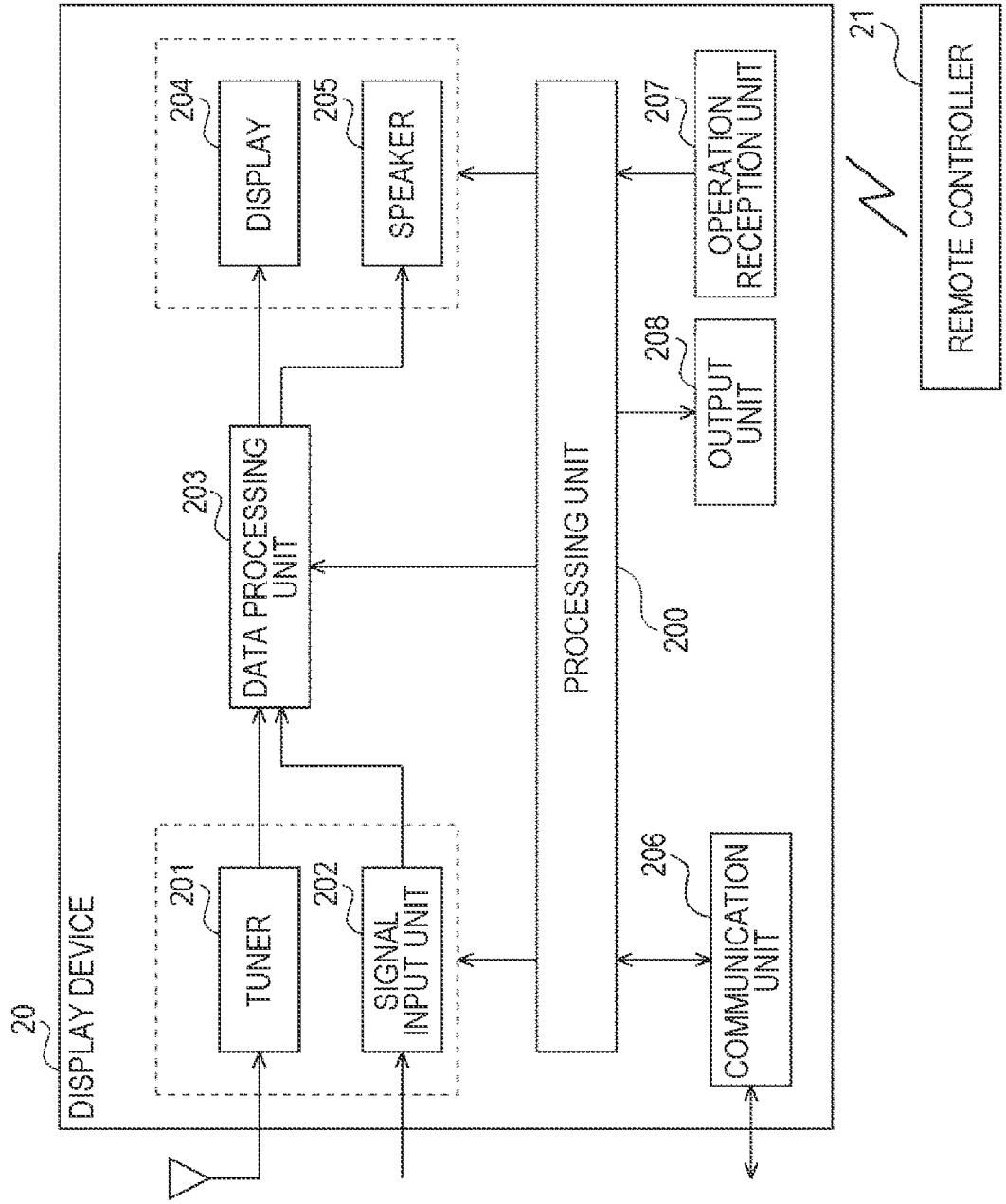
FIG. 6 is a block diagram illustrating an example of a configuration of one embodiment of an information processing apparatus to which the present technology is applied.

(Configuration of Display Device) FIG. 6 illustrates an example of a configuration of the display devices 20 in FIG. 3 as one embodiment of an information processing apparatus to which the present technology is applied.

In FIG. 6, the display device 20 includes a processing unit 200, a tuner 201, a signal input unit 202, a data processing unit 203, a display 204, a speaker 205, a communication unit 206, an operation reception unit 207, and an output unit 208.

The processing unit 200 includes a processor such as a CPU. The processing unit 200 is a main processing apparatus (control apparatus) that controls operation of each unit and performs various arithmetic processing, and controls operation of each unit of the display devices 20.

The tuner 201 performs processing such as demodulation processing on the broadcast signal received via the antenna, and supplies the data processing unit 203 with data obtained as a result. The broadcast signal here transmits broadcast content according to a broadcast system such as terrestrial broadcasting, satellite broadcasting, or cable television broadcasting.

The signal input unit 202 is configured as an interface conforming to a predetermined standard such as a High-Definition Multimedia Interface (HDMI (registered trademark)) or Universal Serial Bus (USB).

That is, data such as video content recorded by a video recorder (video player) or by a network storage, or recorded content recorded in a recording medium such as a semiconductor memory or an optical disk is input to the signal input unit 202 via an interface conforming to the predetermined standard and supplied to the data processing unit 203.

The data processing unit 203 includes a system on a chip (SoC) or the like. The data processing unit 203 performs processing such as decoding on the data supplied from the tuner 201 or the signal input unit 202, supplies the display 204 with screen image data obtained as a result, and supplies the speaker 205 with audio data obtained as the result.

The display 204 includes, for example, a display unit such as a liquid crystal display unit or an organic light emitting diode (OLED) display unit. The display 204 processes the screen image data supplied from the data processing unit 203 under control of the processing unit 200, and displays a screen image of broadcast content of a television program or the like, or information of various screens or the like.

The speaker 205 processes the audio data supplied from the data processing unit 203 under control of the processing unit 200, and outputs audio (sound) of broadcast content of a television program or the like.

The communication unit 206 is a communication apparatus including a communication module that supports wireless communication such as wireless LAN or wired communication. The communication unit 206 communicates with another device via the network 80 or the like under control of the processing unit 200.

Specifically, the communication unit 206 exchanges various data with the information device 10 via the network 80 under control of the processing unit 200.

Furthermore, via the network 80 or the like, the communication unit 206 requests the distribution server 40 to distribute communication content such as a moving image. The communication unit 206 receives the streaming data distributed from the distribution server 40 via the network 90 or the like, and supplies the streaming data to the data processing unit 203 via the processing unit 200.

The data processing unit 203 performs processing such as decoding on the streaming data from the communication unit 206, by which a screen image of communication content such as a moving image is displayed on the display 204, and audio of the communication content is output from the speaker 205.

The operation reception unit 207 includes, for example, a near field communication module, an infrared light receiving module, or the like. The operation reception unit 207 receives (receives) a signal such as a radio signal or infrared signal transmitted from a remote controller 21, and supplies the signal to the processing unit 200 as operation data.

The processing unit 200 controls operation of each unit on the basis of a command corresponding to the operation data from the operation reception unit 207. Note that, with the near field communication, communication conforming to a standard such as Bluetooth (registered trademark) can be performed. Furthermore, the information device 10 may be used as the remote controller 21.

The output unit 208 includes, for example, a device that emits light such as an LED lamp or a power supply lamp, a device that outputs sound such as a buzzer or a speaker, or the like. The output unit 208 outputs light, sound, or the like under control of the processing unit 200.

Figure 7:
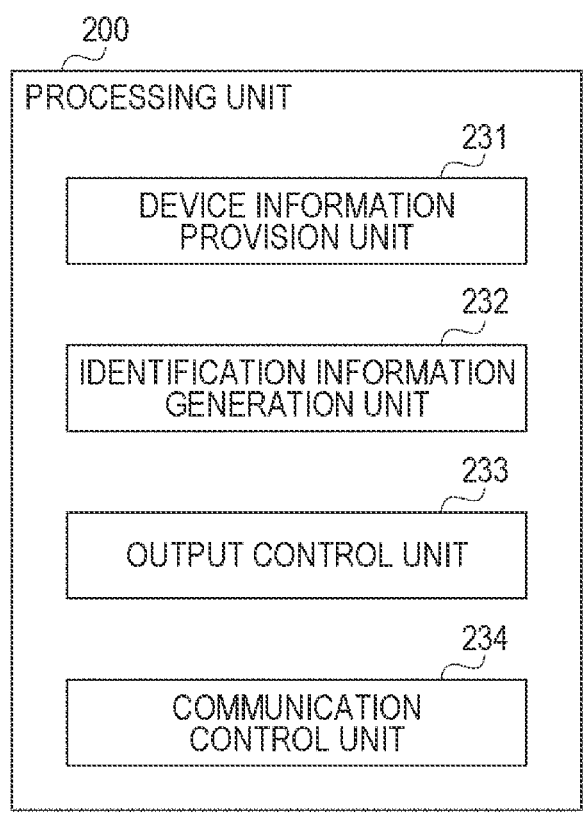
FIG. 7 is a block diagram illustrating an example of a functional configuration of a processing unit in FIG. 6.

FIG. 7 illustrates an example of a functional configuration of the processing unit 200 in FIG. 6.

In FIG. 7, the processing unit 200 includes a device information provision unit 231, an identification information generation unit 232, an output control unit 233, and a communication control unit 234.

The device information provision unit 231 provides the information device 10 with device information such as a device description. Furthermore, the device information provision unit 231 includes, in the device information, information regarding the identification information generated by the identification information generation unit 232.

The identification information generation unit 232 generates identification information (Information regarding an image, text, a code, or the like) on the basis of a message from the information device 10, and supplies the identification information to the device information provision unit 231 and the output control unit 233.

The output control unit 233 controls the display 204, the speaker 205, or the output unit 208 to output the identification information (information regarding an image, text, a code, or the like) generated by the identification information generation unit 232.

Note that details of the device information provision unit 231, identification information generation unit 232, and output control unit 233 will be described in the first to eighth examples of the screen sharing method to be described later.

The communication control unit 234 controls the communication unit 206 to perform communication with another device via the network 80 or the like.

The content reproduction system 1 is configured as described above.

Hereinafter, each of the first to eighth examples of the screen sharing method will be sequentially described as a screen sharing method corresponding to the novel method provided by the content reproduction system 1.

First Example

Figure 8:
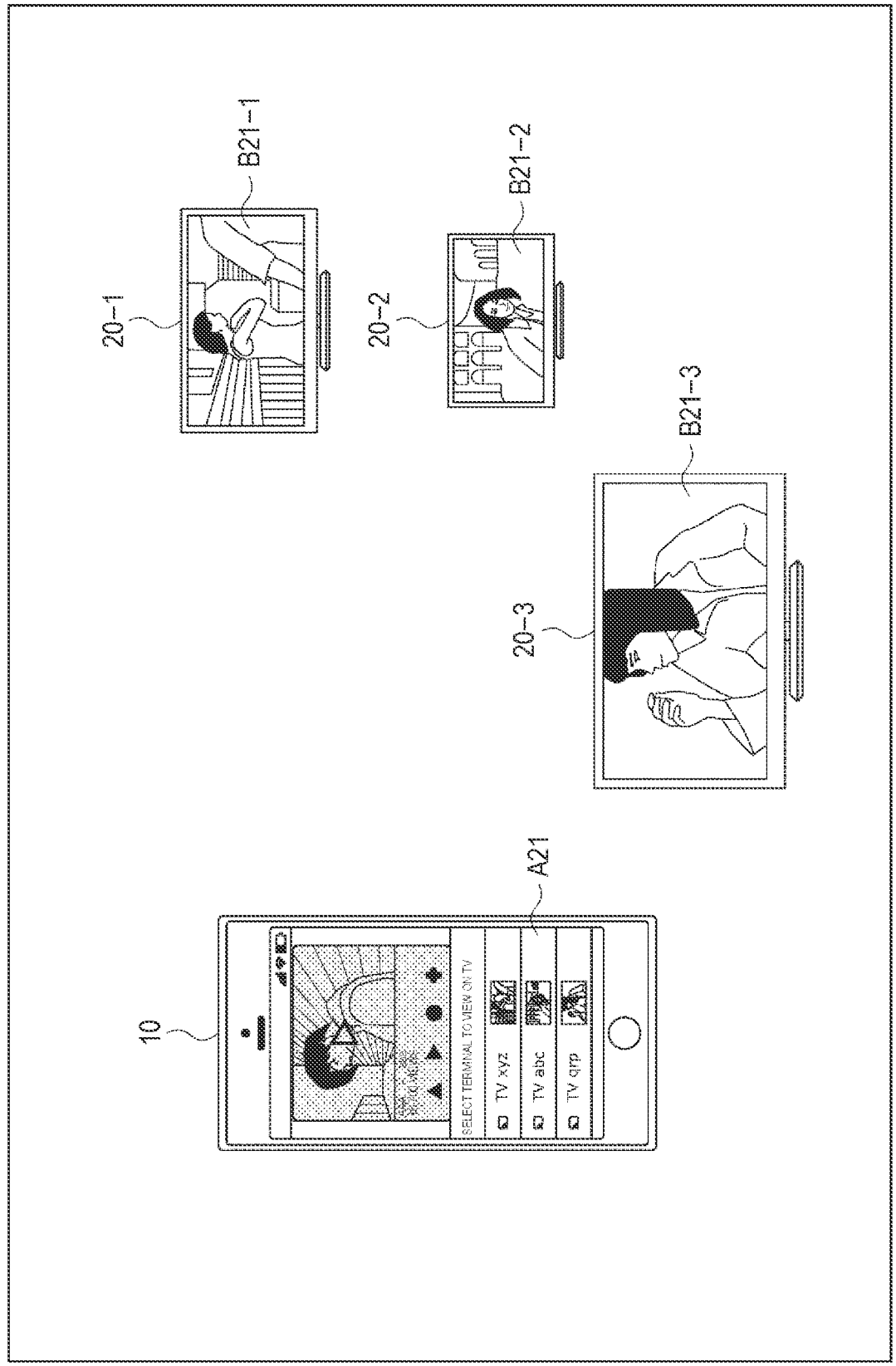
FIG. 8 is a diagram illustrating a first example of the screen sharing method.

FIG. 8 illustrates a first example of the screen sharing method.

In the first example of the screen sharing method, when screen sharing is performed, a common image (the same image or a corresponding image) is displayed on the information device 10 and each of the plurality of display devices 20, by which the plurality of display devices 20 can be identified by the common image, and the screen sharing is performed.

That is, in FIG. 8, in a case where screen sharing is performed from the information device 10 held by the user to a display device 20 having a larger screen, a list on a selection screen A21 of the information device 10 displays reduced images corresponding to images B21-1 to B21-3 displayed on screens of the respective display devices 20-1 to 20-3.

The user can identify the display devices 20-1 to 20-3 as the candidates for screen sharing and select a display device 20 as a target for screen sharing by comparing the reduced images in the list on the selection screen A21 of the information device 10 with the images B21-1 to B21-3 superimposed and displayed on the respective screens of the display devices 20.

Figure 9:
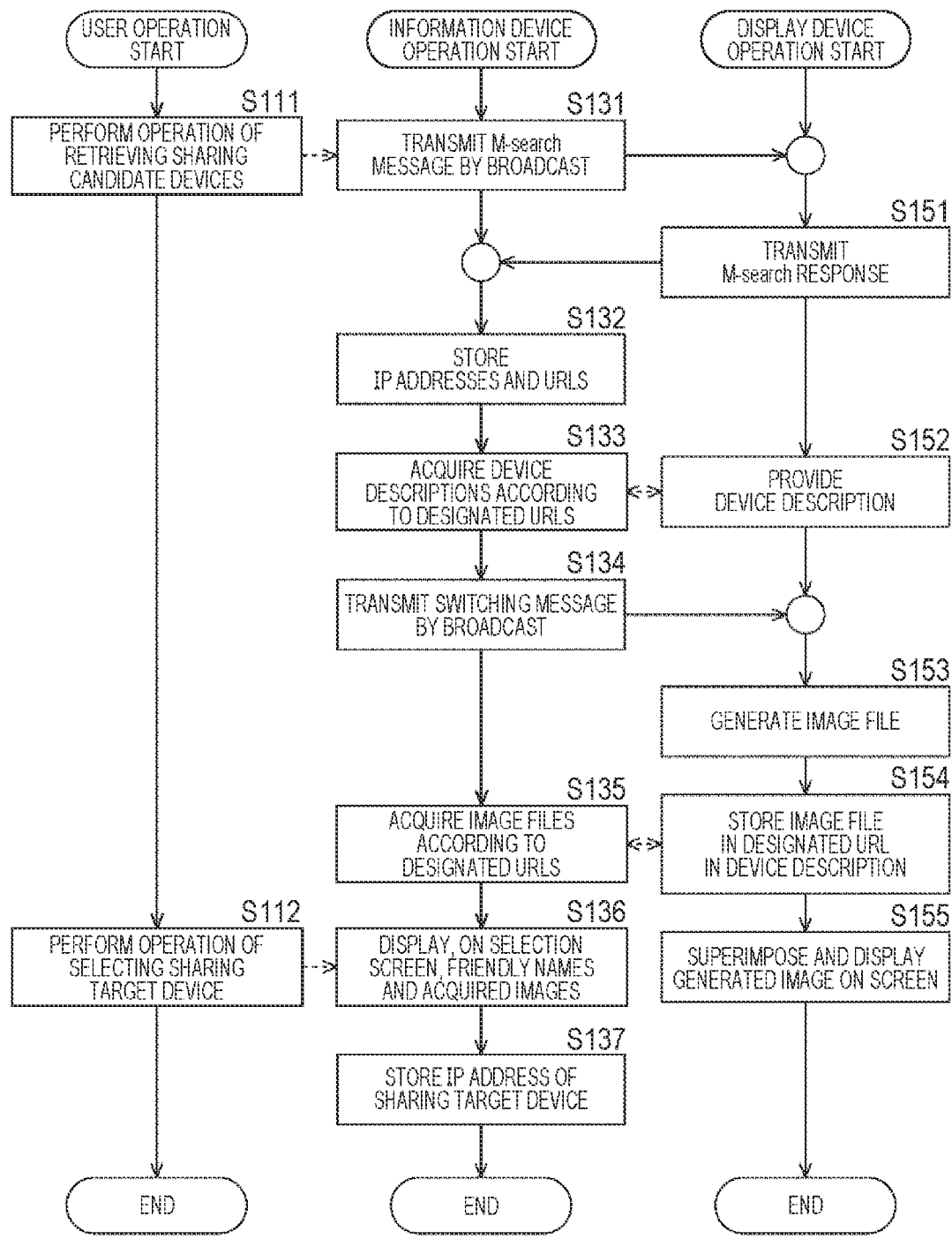
FIG. 9 is a flowchart illustrating a flow of processing by the first example of the screen sharing method.

FIG. 9 is a flowchart illustrating a flow of processing by the first example of the screen sharing method.

In FIG. 9, each processing step of the information device 10 is executed by the processing unit 100. Furthermore, each processing step of the display device 20 is executed by the processing unit 200.

In a case where the information device 10 serving as the sharing source device is operated by the user and operation of retrieving the plurality of display devices 20 serving as the sharing candidate devices is performed (S111), processing in Steps S131 to S136 is executed in the information device 10, and processing in Steps S151 to S155 is executed in each of the display devices 20-1 to 20-3.

That is, by utilizing a User Datagram Protocol (UDP), the information device 10 transmits an M-search message to the network 80 by broadcast (S131). Each of the display devices 20-1 to 20-3 that has received the M-search message transmits an M-search response to the information device 10 via the network 80 (S151).

Here, the M-search message is a message for searching for a device connected to the network. The M-search response is a response message transmitted from a device that has received the M-search message.

The M-search response includes "LOCATION", in which a uniform resource locator (URL) for acquiring a device description is described, or the like as a parameter. The device description includes information regarding a target device. Note that details of the M-search message and the M-search response are disclosed in the following document.

Document: UPnP Device Architecture 2.0 Document Revision Date: Feb. 20, 2015

On the basis of the M-search responses received from the respective display devices 20-1 to 20-3, the information device 10 stores, in the memory 103, IP addresses and URLs of device descriptions of the respective display devices 20 (S132).

According to the stored URLs (designated URLs) of the device descriptions, the information device 10 acquires the device descriptions of the respective display devices 20-1 to 20-3, the device descriptions being provided by the display devices 20 (S133, S152).

FIG. 10 illustrates an example of description for a device description.

In the device description, a deviceType element, a friendlyName element, a manufacturer element, a manufacturerURL element, a modelDescription element, a modelName element, a modelNumber element, a modelURL element, a serialNumber element, a UDN element, a UPC element, and an iconList element are described.

In the deviceType element, a type of the device is described. In the friendlyName element, a friendly name is described, the friendly name being text including an arbitrary character string or the like. In the manufacturer element, a manufacturer (manufacturer) is described. In the manufacturerURL element, a URL of a website of the manufacturer is described.

In the modelDescription element, a title of a model (model) is described. In the modelName element, a model name is described. In the modelNumber element, a model number is described. In the modelURL element, a URL of a website of the model is described. In the serialNumber element, a serial number is described. In the UDN element, a universally unique identifier (UUID) is described. In the UPC element, a universal product code (UPC) is described.

The iconList element includes one or a plurality of icon elements including a mimetype element, a width element, a height element, a depth element, and a url element. In the mimetype element, a MIME type of an icon is described. In the width element and the height element, the number of pixels of the icon in a horizontal direction and a vertical direction is described. In the depth element, color depth of the icon is described. In the url element, a URL of the icon is described.

Note that, although a case where each of the display devices 20 holds a device description of own is exemplified here to simplify description, the device description may be held by another device.

Returning to the description in FIG. 9, by utilizing the UDP, the information device 10 transmits a switching message to the network 80 by broadcast (S134). The switching message includes a message, "switch to selection mode".

Each of the display devices 20-1 to 20-3 that has received the switching message generates an image file (S153).

For example, an image representing content such as a mark of a broadcast station or service, a still image thumbnail or moving image thumbnail of the content, or the like can be generated as the image file. Note that, as the image file, a file of a still image or moving image stored in the display device 20 beforehand, a file of a still image cut out from a moving image, a file of a still image acquired from an outside, or the like may be used.

The display devices 20-1 to 20-3 store the generated image file in an address designated in a url element of a displaySource element described in the device description (S154).

FIG. 11 illustrates an example of description of an address of the image file. FIG. 11 describes a relative address and file name of a field, "relative address value/filename", as the url element of the displaySource element of the device description.

At this time, each of the display devices 20-1 to 20-3 stores the generated image file in a location designated by the relative address (relative address value) with the designated file name (filename) attached thereto.

Note that the relative address described in the url element of the displaySource element means a relative address from a URL described in the URLBase element in a case where the URLBase element is described, and means a relative address from root (IP address of the corresponding device) in a case where the URLBase element is not described. These relations are similarly applied to relative addresses to be described later.

Returning to the description in FIG. 9, the display devices 20-1 to 20-3 superimpose and display, on a screen of the display 204, the respective generated images (the images B21-1 to B21-3 in FIG. 8) corresponding to the generated image file (S155).

According to the stored designated URLs, the information device 10 acquires image files stored by each of the display devices 20-1 to 20-3 (S135). The information device 10 displays, on the selection screen A21 (FIG. 8), the friendly names (for example, names of the devices) corresponding to the friendlyName element of the device description, and the acquired images (reduced images of the images B21-1 to B21-3 in FIG. 8) corresponding to the acquired image file (S136).

With this arrangement, the user can identify each of the display devices 20-1 to 20-3 and perform operation of selecting the desired display device 20 serving as a sharing target device by comparing the acquired images displayed on the selection screen A21 of the information device 10 with the generated images superimposed and displayed on the respective screens of the display devices 20 (S112).

In a case where a sharing target device is decided on the basis of user operation on the selection screen A21, the information device 10 stores, in the memory 103, an IP address of the display device 20 serving as the sharing target device (S137).

With this arrangement, a display device 20 (sharing target device) that performs screen sharing with the information device 10 (sharing source device) is decided from among the plurality of display devices 20 (sharing candidate devices), and the information device 10 (sharing source device) exchanges data with the selected display device 20 (sharing target device) on the basis of a stored IP address, thereby performing screen sharing.

As described above, in the first example of the screen sharing method, the common image is displayed on the display 121 of the information device 10 and the display 204 of each of the display devices 20-1 to 20-3, and therefore, the user can easily and reliably select a display device 20 to perform screen sharing with the information device 10 only by checking the images displayed on the displays of the respective devices.

Note that, although a case where there are three display devices 20-1 to 20-3 as the sharing candidate devices has been exemplified in the above description, the number of sharing candidate devices is not limited to three, and may be two, or four or more. Furthermore, the sharing candidate devices are not limited to the same type of devices, and other types of devices may be included. Furthermore, the information device 10 can display the selection screen A21 even in a case where there is only one sharing candidate device, and can implement the screen sharing method described in the first to eighth examples of the screen sharing method.

Second Example

Figure 12:
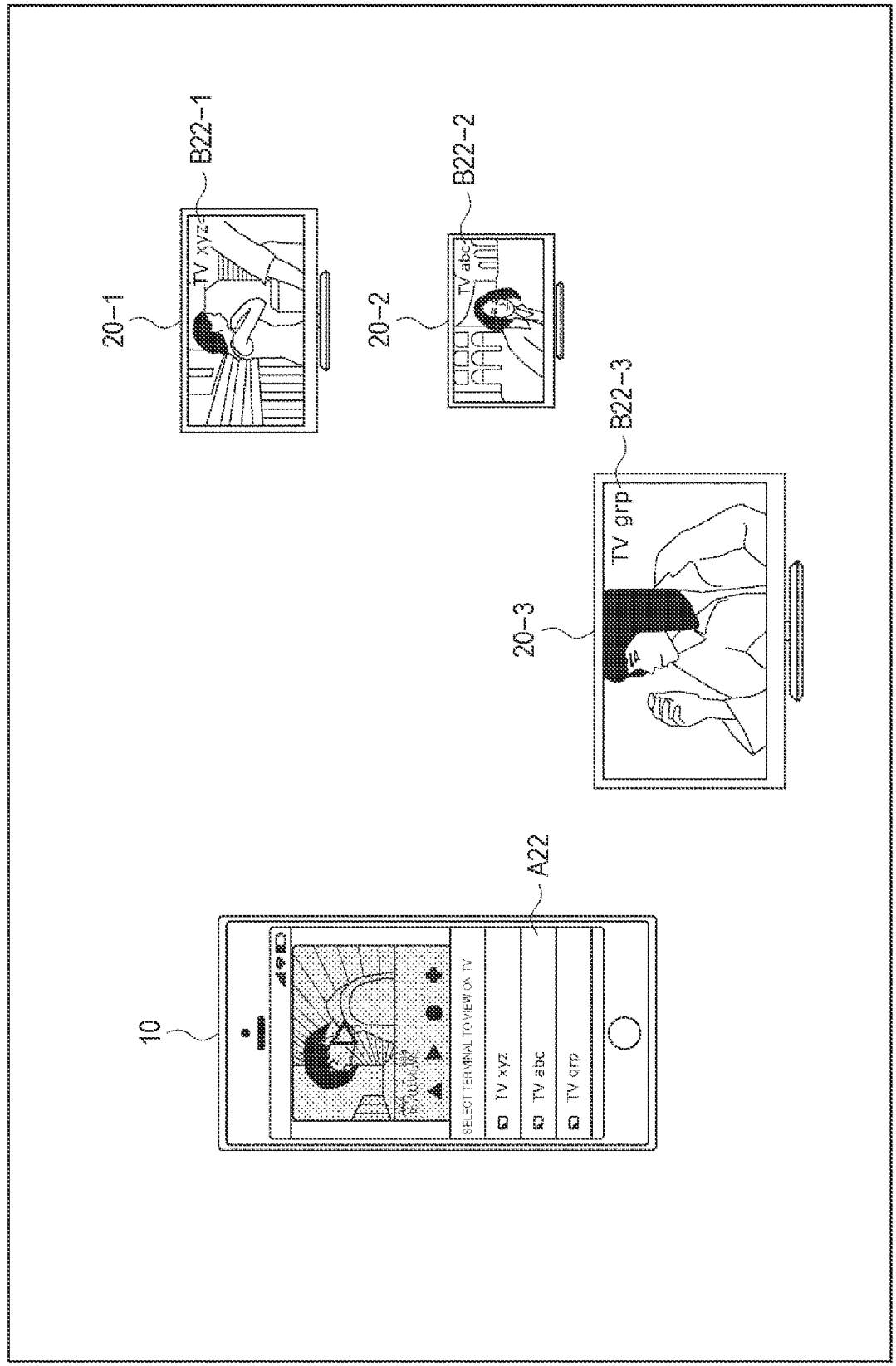
FIG. 12 is a diagram illustrating a second example of the screen sharing method.

FIG. 12 illustrates a second example of the screen sharing method.

In the second example of the screen sharing method, when screen sharing is performed, a common friendly name (the same text or corresponding text) is displayed on the information device 10 and each of the plurality of display devices 20, by which the plurality of display devices 20 can be identified by the common friendly name, and the screen sharing is performed.

That is, in FIG. 12, in a case where screen sharing is performed from the information device 10 to the display device 20, a list on a selection screen A22 of the information device 10 displays text ("TV xyz", "TV abc", "TV qrp") corresponding to text B22-1 to B22-3 displayed on screens of the respective display devices 20-1 to 20-3. Here, for example, text of names of the devices can be described as the friendly names.

The user can identify the display devices 20-1 to 20-3 as the candidates for screen sharing and select a display device 20 as a target for screen sharing by comparing the text in the list on the selection screen A22 of the information device 10 with the text B22-1 to B22-3 superimposed and displayed on the respective screens of the display devices 20.

Figure 13:
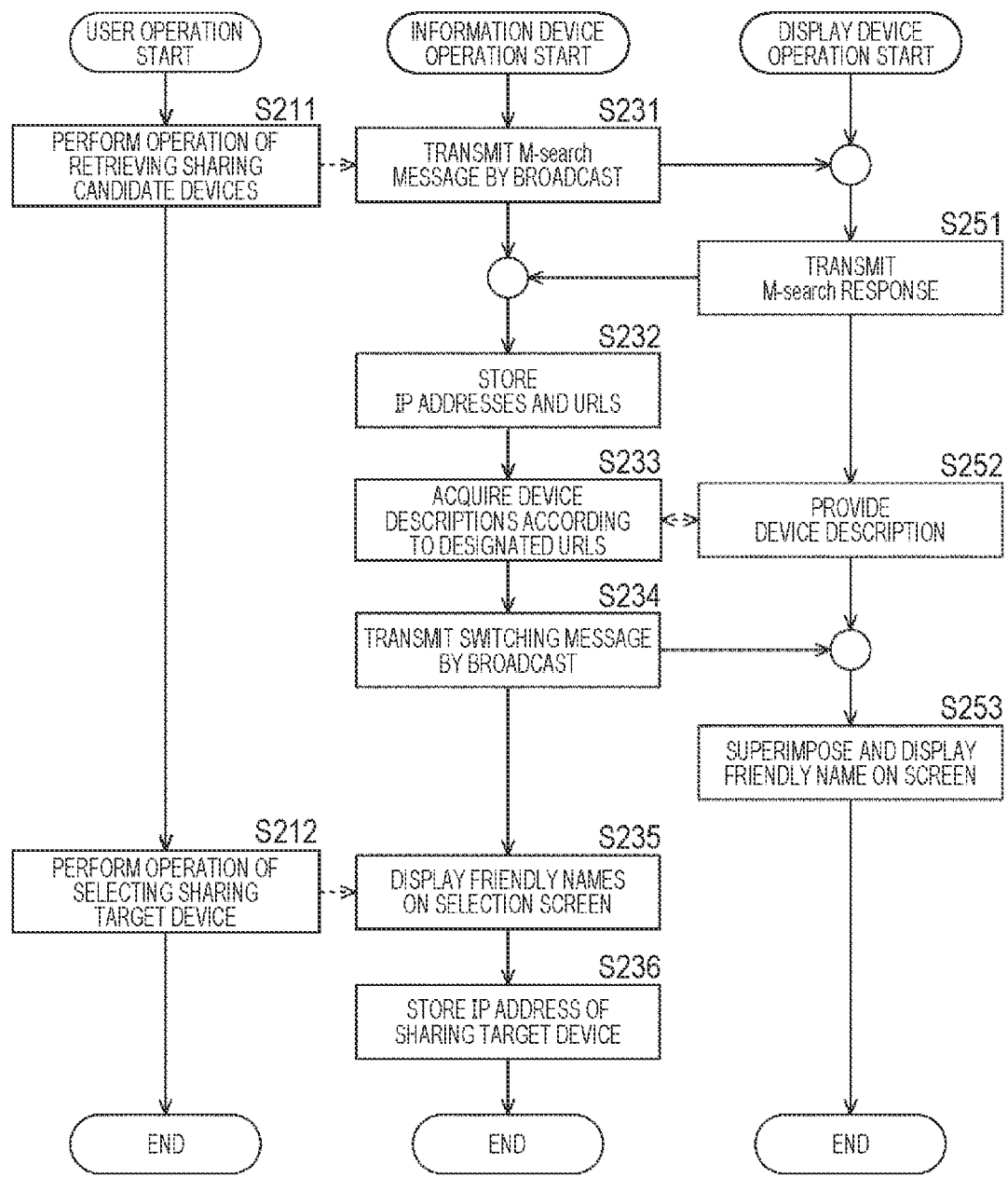
FIG. 13 is a flowchart illustrating a flow of processing by the second example of the screen sharing method.

FIG. 13 is a flowchart illustrating a flow of processing by the second example of the screen sharing method.

In FIG. 13, each processing step of the information device 10 is executed by the processing unit 100. Furthermore, each processing step of the display device 20 is executed by the processing unit 200.

In a case where operation of retrieving the display devices 20 (sharing candidate devices) is performed (S211), processing in Steps S231 to S235 is executed in the information device 10 (sharing source device), and processing in Steps S251 to S253 is executed in each of the display devices 20-1 to 20-3.

In Steps S231 to S233 and S251 to S252, similarly to Steps S131 to S133 and S151 to S152 in FIG. 9, an M-search message and an M-search response are exchanged between the information device 10 and the display devices 20-1 to 20-3, and device descriptions provided from the respective display devices 20 are acquired in the information device 10.

By utilizing the UDP, the information device 10 transmits a switching message to the network 80 by broadcast (S234).

The display devices 20-1 to 20-3 that have received the switching message superimpose and display, on the screen of the display 204, respective friendly names (text B22-1 to B22-3 in FIG. 12) corresponding to the friendlyName element of the device description of own (S253).

Meanwhile, on the basis of the acquired device descriptions, the information device 10 displays friendly names corresponding to the friendlyName elements (text corresponding to the text B22-1 to B22-3 in FIG. 12) on the selection screen A22 (FIG. 12) (S235).

With this arrangement, the user can identify each of the display devices 20-1 to 20-3 and select a desired display device 20 serving as a sharing target device by comparing the friendly names (text) displayed on the selection screen A22 of the information device 10 with the friendly names (text) superimposed and displayed on the respective screens of the display devices 20 (S212).

In a case where a sharing target device is decided on the basis of user operation on the selection screen A22, the information device 10 stores, in the memory 103, an IP address of the display device 20 serving as the sharing target device (S236). Then, in the information device 10, screen sharing is performed by exchanging data with the selected display device 20 (sharing target device) on the basis of the stored IP address.

As described above, in the second example of the screen sharing method, the common text is displayed on the display 121 of the information device 10 and the displays 204 of the display devices 20-1 to 20-3, and therefore, the user can easily and reliably select a display device 20 to perform screen sharing with the information device 10 only by checking the text displayed on the displays of the respective devices.

Third Example

Figure 14:
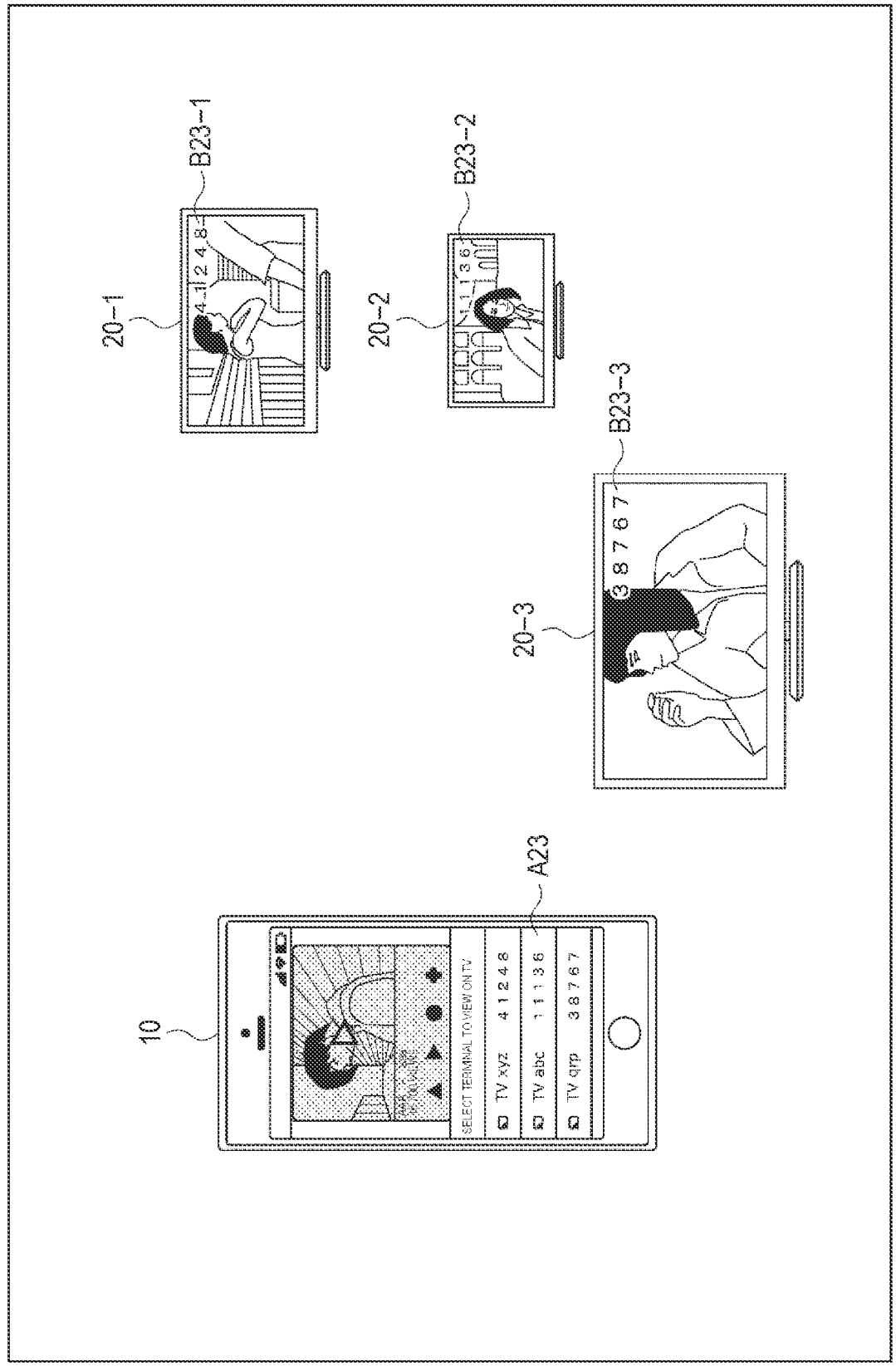
FIG. 14 is a diagram illustrating a third example of the screen sharing method.

FIG. 14 illustrates a third example of the screen sharing method.

In the third example of the screen sharing method, when screen sharing is performed, a common random number (random number unique to each device) is displayed on the information device 10 and each of the plurality of display devices 20, by which the plurality of display devices 20 can be identified by the common random number, and the screen sharing is performed.

That is, in FIG. 14, in a case where screen sharing is performed from the information device 10 to the display device 20, a list on a selection screen A23 of the information device 10 displays random numbers ("41248", "11136", "38767") corresponding to random numbers B23-1 to B23-3 displayed on screens of the respective display devices 20-1 to 20-3.

The user can identify the display devices 20-1 to 20-3 as the candidates for screen sharing and select a display device 20 as a target for screen sharing by comparing the random numbers in the list on the selection screen A23 of the information device 10 with the random numbers B23-1 to B23-3 superimposed and displayed on the respective screens of the display devices 20.

Figure 15:
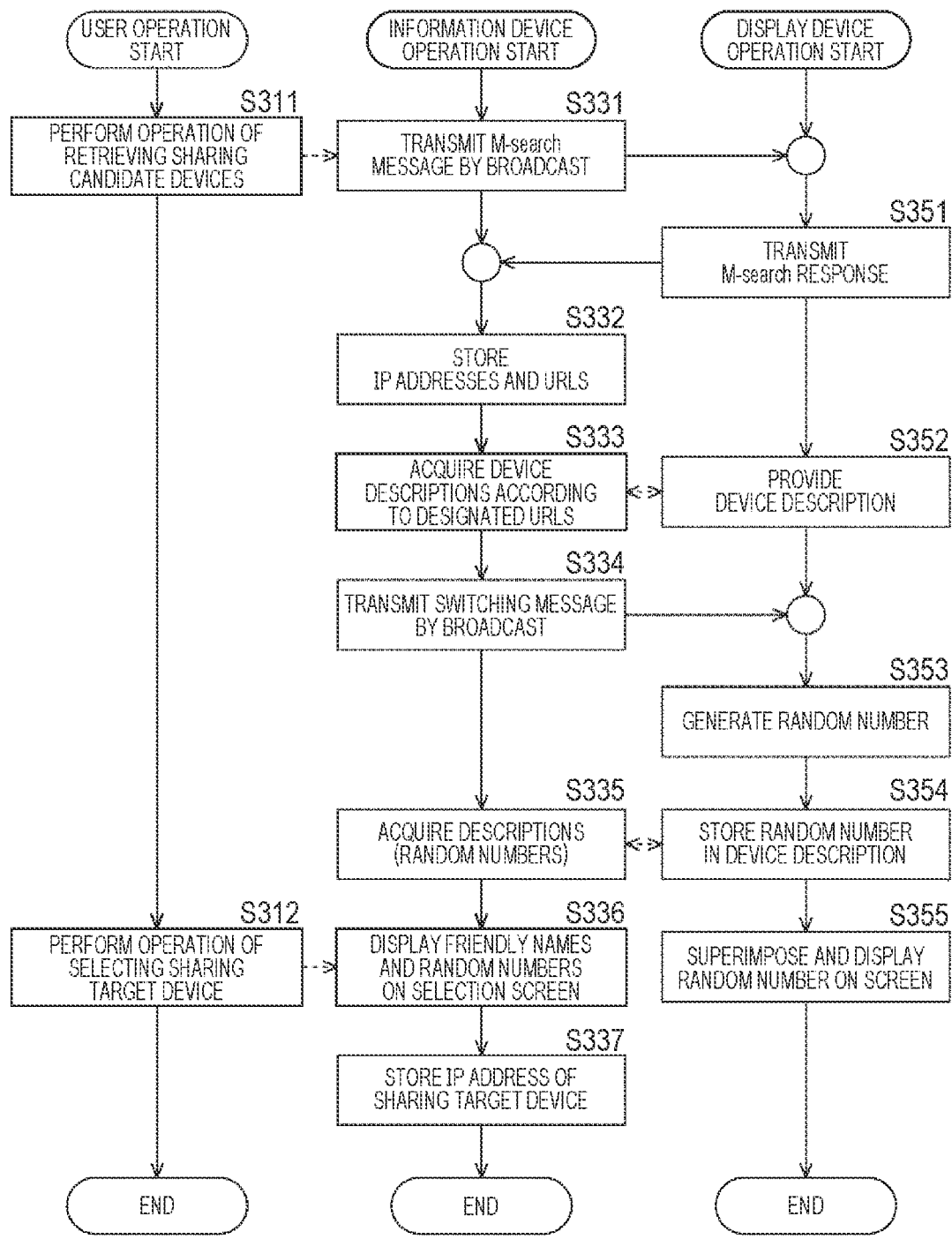
FIG. 15 is a flowchart illustrating a flow of processing by the third example of the screen sharing method.

FIG. 15 is a flowchart illustrating a flow of processing by the third example of the screen sharing method.

In FIG. 15, each processing step of the information device 10 is executed by the processing unit 100. Furthermore, each processing step of the display device 20 is executed by the processing unit 200.

In a case where operation of retrieving the display devices 20 (sharing candidate devices) is performed (S311), processing in Steps S331 to S336 is executed in the information device 10 (sharing source device), and processing in Steps S351 to S355 is executed in each of the display devices 20-1 to 20-3.

In steps S331 to S333 and S351 to S352, similarly to Steps S131 to S133 and S151 to S152 in FIG. 9, an M-search message and an M-search response are exchanged between the information device 10 and the display devices 20-1 to 20-3, and device descriptions provided from the respective display devices 20 are acquired in the information device 10.

By utilizing the UDP, the information device 10 transmits a switching message to the network 80 by broadcast (S334).

Each of the display devices 20-1 to 20-3 that has received the switching message generates a random number (S353). As a method for generating the random number, for example, various methods such as a method using a random number can be used. However, in generation of the random number, a number different from a random number generated by another sharing candidate device is generated.

Each of the display devices 20-1 to 20-3 stores (a value of) the generated random number in the device description (S354).

Figure 16:
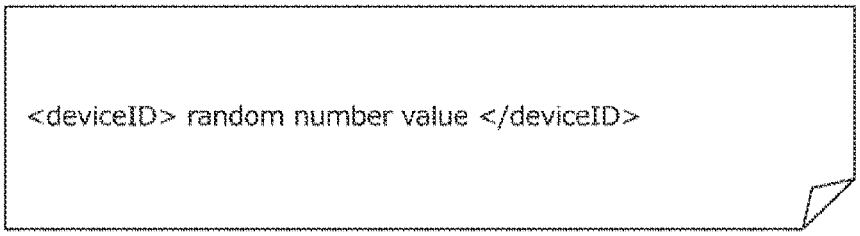
FIG. 16 is a diagram illustrating an example of description of a random number.

FIG. 16 illustrates an example of description of a random number. FIG. 16 describes (a value of) a random number, "random number value", as a deviceID element, of the device description.

Returning to the description in FIG. 15, the display devices 20-1 to 20-3 superimpose and display the respective generated random numbers (the random numbers B23-1 to B23-3 in FIG. 14) on the screen of the display 204 (S355).

According to the stored designated URLs, the information device 10 acquires the random numbers stored in the device descriptions provided from the respective display devices 20 (S335). The information device 10 displays the acquired random numbers (random numbers corresponding to the random numbers B23-1 to B23-3 in FIG. 14) on the selection screen A23 (FIG. 14) along with the friendly names (S336).

With this arrangement, the user can identify each of the display devices 20-1 to 20-3 and perform operation of selecting a desired display device 20 serving as a sharing target device by comparing the random numbers displayed on the selection screen A23 of the information device 10 with the random numbers superimposed and displayed on the respective screens of the display devices 20 (S312).

In a case where a sharing target device is decided on the basis of user operation on the selection screen A23, the information device 10 stores, in the memory 103, an IP address of the display device 20 serving as the sharing target device (S337). Then, in the information device 10, screen sharing is performed by exchanging data with the selected display device 20 (sharing target device) on the basis of the stored IP address.

As described above, in the third example of the screen sharing method, the common random number is displayed on the display 121 of the information device 10 and the displays 204 of the display devices 20-1 to 20-3, and therefore, the user can easily and reliably select a display device 20 to perform screen sharing with the information device 10 only by checking the random number displayed on the displays of the respective devices.

Note that, although a case where the random numbers are displayed has been exemplified in the above description, not limited to random numbers, unique character strings, codes, or the like may be displayed.

Fourth Example

Figure 17:
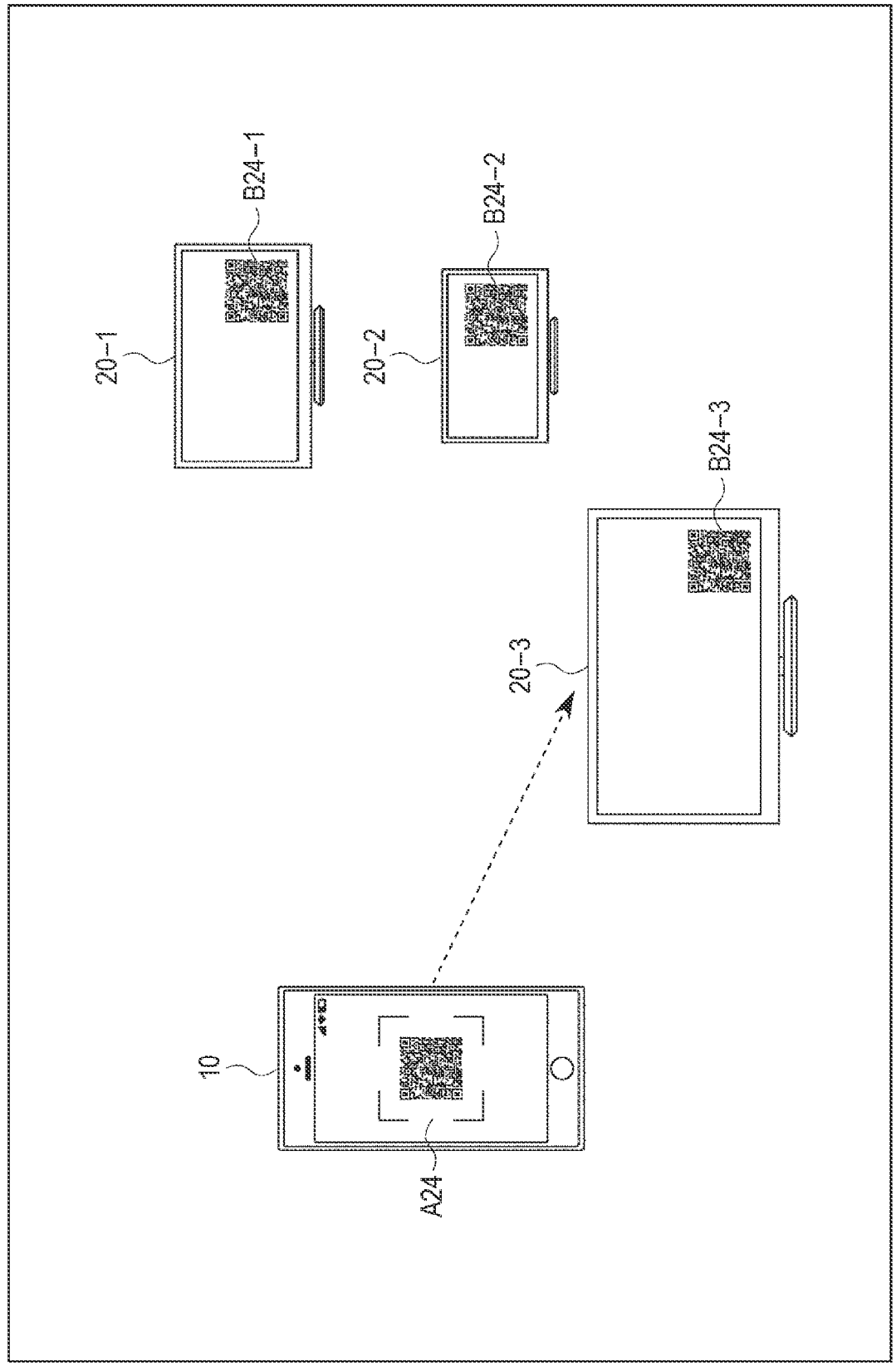
FIG. 17 is a diagram illustrating a fourth example of the screen sharing method.

FIG. 17 illustrates a fourth example of the screen sharing method.

In the fourth example of the screen sharing method, when screen sharing is performed, a two-dimensional code (for example, a QR code (registered trademark) or the like) is displayed on each of the plurality of display devices 20, and the two-dimensional code displayed on the desired display device 20 is read by the information device 10, by which screen sharing is performed between the information device 10 and the desired display device 20.

That is, in FIG. 17, in a case where screen sharing is performed from the information device 10 to the display device 20, a screen of each of the display devices 20-1 to 20-3 displays two-dimensional codes B24-1 to B24-3 unique to each device.

At this time, in the information device 10, a two-dimensional code reading application A24 is activated according to operation by the user. The two-dimensional code reading application A24 is a dedicated application for reading a two-dimensional code by utilizing an image capturing function of the camera 107, or the like.

Furthermore, at this time, the two-dimensional code reading application A24 may be activated on the basis of selection of activation of the application by the user, or may be automatically activated in response to display of the two-dimensional code on a screen of the display device 20.

For example, the user can select the display device 20-3 as the screen sharing target by waving the information device 10 on which the two-dimensional code reading application A24 is activated to read the two-dimensional code B24-3 on a screen of the display device 20-3 desired to be a target for screen sharing among the display devices 20-1 to 20-3 as the candidates for screen sharing.

Figure 18:
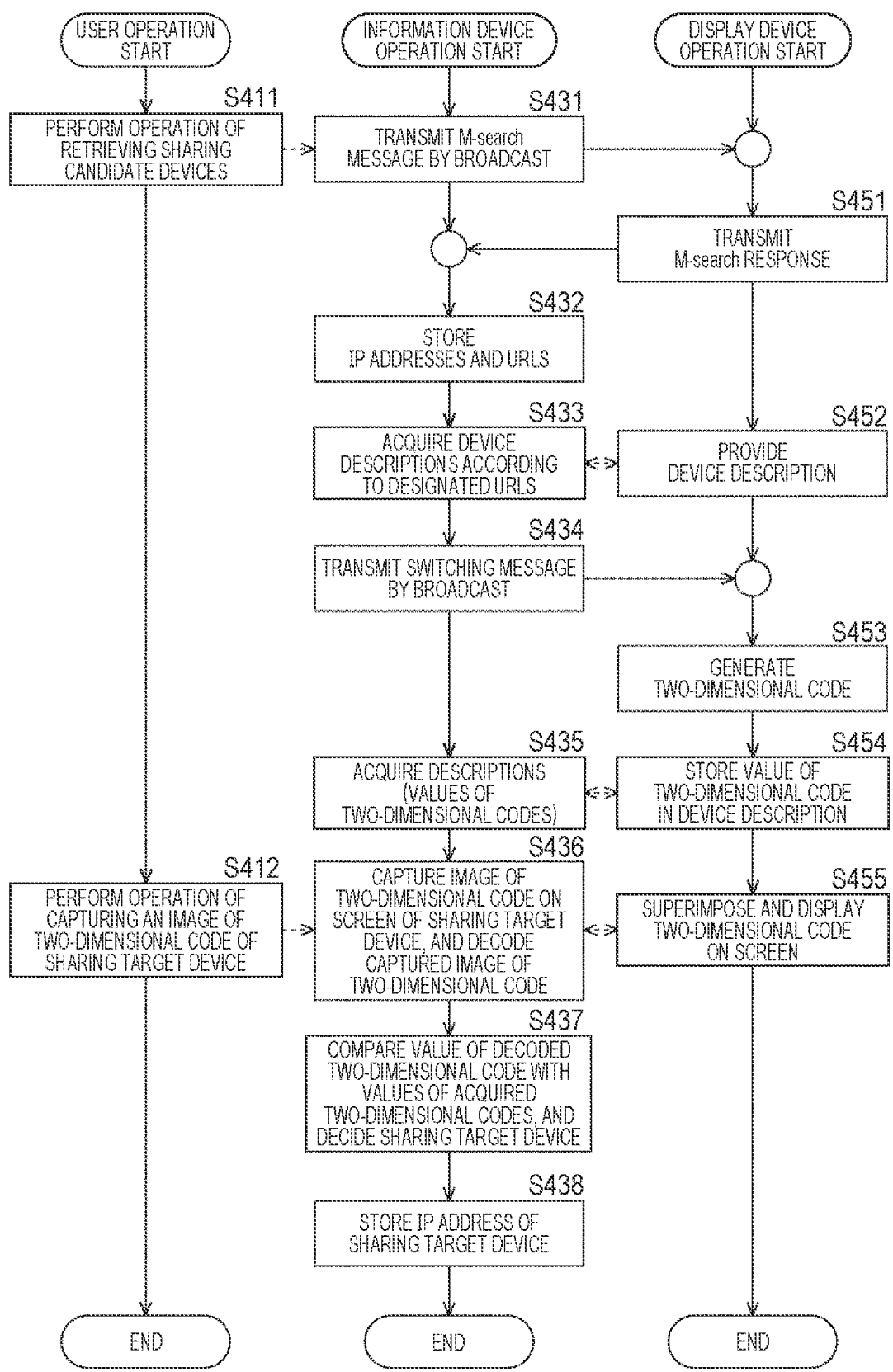
FIG. 18 is a flowchart illustrating a flow of processing by the fourth example of the screen sharing method.

FIG. 18 is a flowchart illustrating a flow of processing by the fourth example of the screen sharing method.

In FIG. 18, each processing step of the information device 10 is executed by the processing unit 100. Furthermore, each processing step of the display device 20 is executed by the processing unit 200.

In a case where operation of retrieving the display devices 20 (sharing candidate devices) is performed (S411), processing in Steps S431 to S435 is executed in the information device 10 (sharing source device), and processing in Steps S451 to S455 is executed in each of the display devices 20-1 to 20-3.

In Steps S431 to S433 and S451 to S452, similarly to Steps S131 to S133 and S151 to S152 in FIG. 9, an M-search message and an M-search response are exchanged between the information device 10 and the display devices 20-1 to 20-3, and device descriptions provided from the respective display devices 20 are acquired in the information device 10.

By utilizing the UDP, the information device 10 transmits a switching message to the network 80 by broadcast (S434).

Each of the display devices 20-1 to 20-3 that has received the switching message generates a two-dimensional code (S453). In generation of the two-dimensional code, for example, an application programming interface (API) for generating a two-dimensional code, or a service for generating the two-dimensional code can be utilized. The two-dimensional code is a display type code having information in the horizontal direction and the vertical direction, and for example, a QR code (registered trademark) widely used at present can be utilized.

Each of the display devices 20-1 to 20-3 stores a value (character string) of the generated two-dimensional code in the device description (S454).

Figure 19:
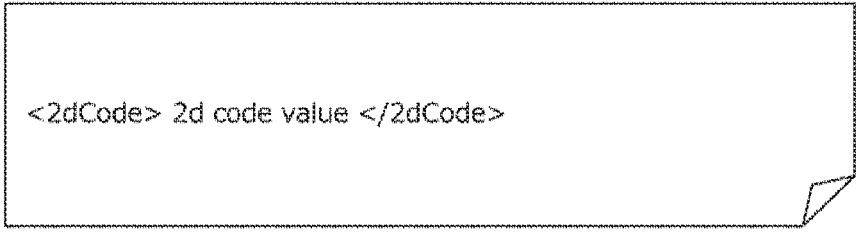
FIG. 19 is a diagram illustrating an example of description of a value of a two-dimensional code.

FIG. 19 illustrates an example of description of a value of the two-dimensional code. FIG. 19 describes a value of the two-dimensional code, "2d code value", as a 2dCode element of the device description.

Returning to the description in FIG. 18, the display devices 20-1 to 20-3 superimpose and display the respective generated two-dimensional codes (the two-dimensional codes B24-1 to B24-3 in FIG. 17) on the screen of the display 204 (S455).

According to the stored designated URLs, the information device 10 acquires the values of the two-dimensional codes stored in the device descriptions provided from the respective display devices 20 (S435).

Here, in a case where the user waves, over the two-dimensional code displayed on the screen of the desired display device 20 serving as the sharing target device, information device 10 in which the two-dimensional code reading application A24 (FIG. 17) is activated, and operation of capturing an image of the two-dimensional code is performed (S412), the following processing is performed in the information device 10.

That is, the information device 10 captures an image of the two-dimensional code on the screen of the desired display device 20 serving as the sharing target device, and decodes the captured image of the two-dimensional code (S436).

Furthermore, the information device 10 compares a value of the two-dimensional code obtained by decoding with the values of the two-dimensional codes obtained from the acquired device descriptions, and decides the display device 20 serving as the sharing target device according to a comparison result (S437).

Moreover, the information device 10 stores, in the memory 103, the IP address of the display device 20 serving as the sharing target device (S438). Then, in the information device 10, screen sharing is performed by exchanging data with the selected display device 20 (sharing target device) on the basis of the stored IP address.

As described above, in the fourth example of the screen sharing method, a two-dimensional code is displayed on the displays 204 of the display devices 20-1 to 20-3, and therefore, the user can easily and reliably select a display device 20 to perform screen sharing with the information device 10 only by capturing an image of the two-dimensional code displayed on the display 204 of the desired display device 20 with the camera 107 of the information device 10.

Note that, although a case where the two-dimensional code reading application A24 is used in reading of the two-dimensional code has been exemplified in the above description, the two-dimensional code may be read by another function of the information device 10.

Fifth Example

Figure 20:
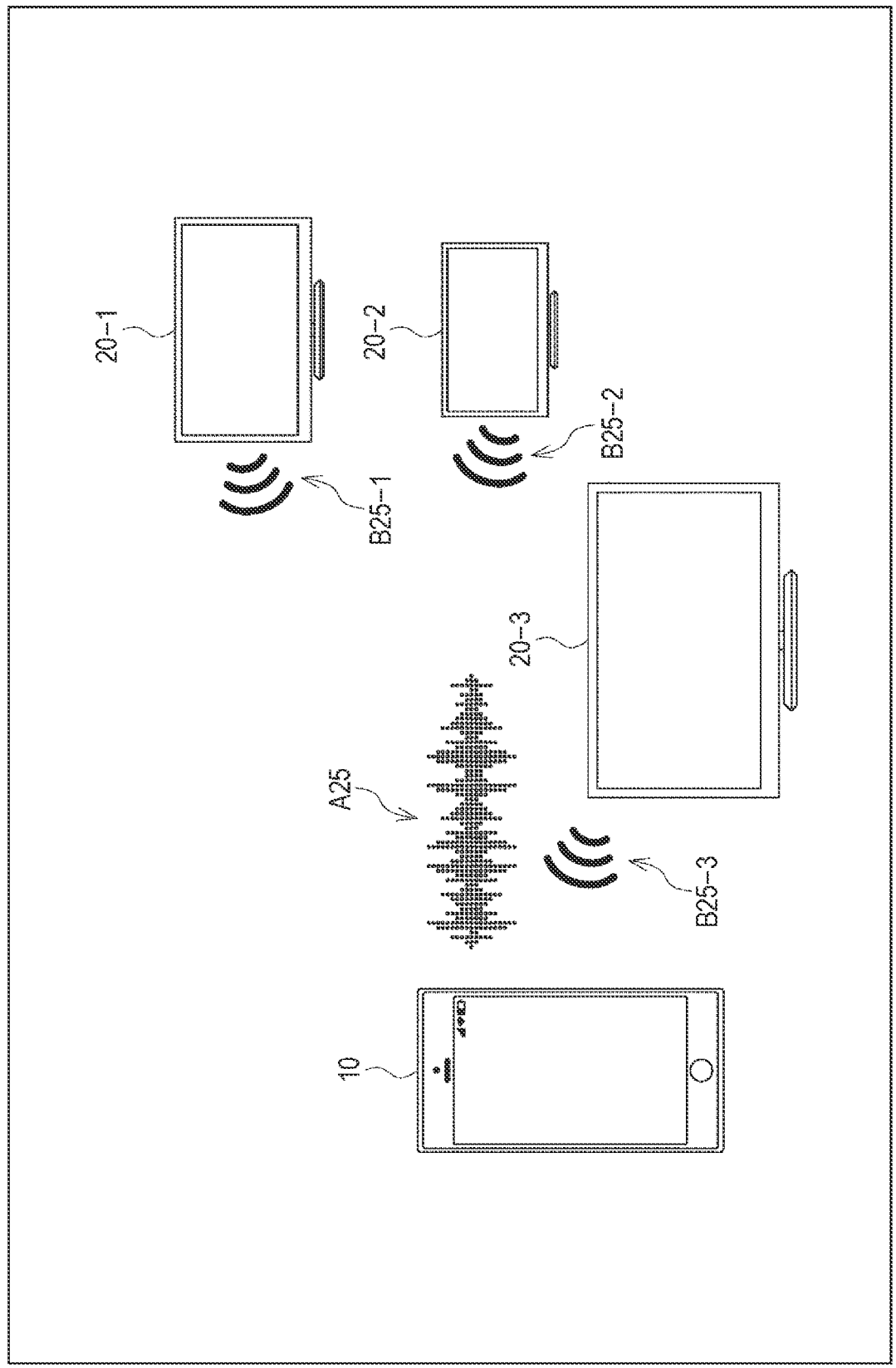
FIG. 20 is a diagram illustrating a fifth example of the screen sharing method.

FIG. 20 illustrates a fifth example of the screen sharing method.

In the fifth example of the screen sharing method, when screen sharing is performed, sound (a sound wave) is output from each of the plurality of display devices 20, and the information device 10 senses the sound wave, by which screen sharing is performed between the information device 10 and the desired display device 20.

That is, in FIG. 20, in a case where screen sharing is performed from the information device 10 to the display device 20, sound waves B25-1 to B25-3 are output from the display devices 20-1 to 20-3, respectively.

At this time, the information device 10 can sense the sound waves B25-1 to B25-3 output from the display devices 20-1 to 20-3 by utilizing a function of the microphone 112, the sensor 106, or the like.

For example, the user can select the display device 20-3 as the screen sharing target by moving the information device 10 to sense a sound wave A25 output from the display device 20-3 desired to be the target for screen sharing among the display devices 20-1 to 20-3 as the candidates for screen sharing.

Figure 21:
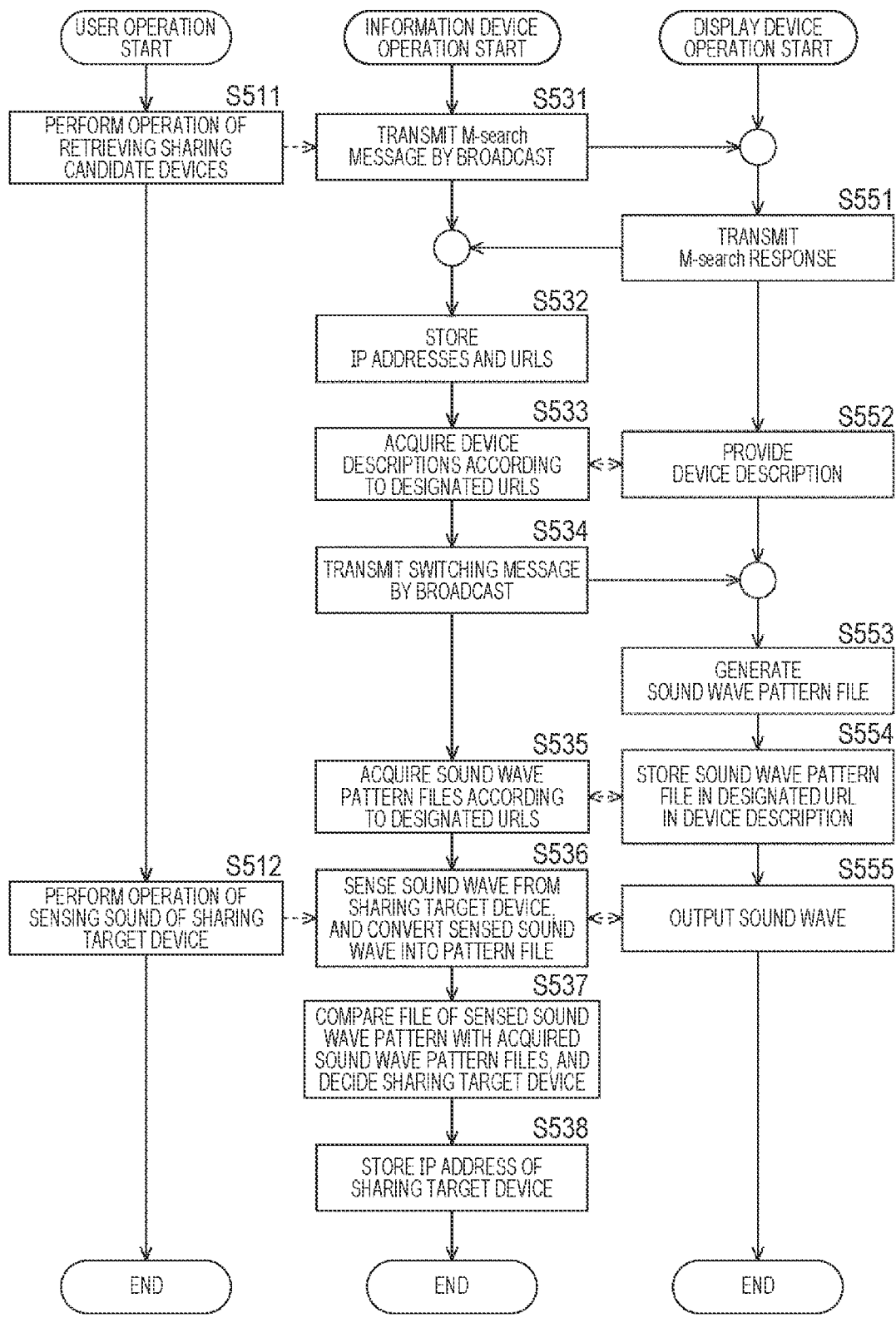
FIG. 21 is a flowchart illustrating a flow of processing by the fifth example of the screen sharing method.

FIG. 21 is a flowchart illustrating a flow of processing by the fifth example of the screen sharing method.

In FIG. 21, each processing step of the information device 10 is executed by the processing unit 100. Furthermore, each processing step of the display device 20 is executed by the processing unit 200.

In a case where operation of retrieving the display devices 20 (sharing candidate devices) is performed (S511), processing in Steps S531 to S535 is executed in the information device 10 (sharing source device), and processing in Steps S551 to S555 is executed in each of the display devices 20-1 to 20-3.

In Steps S531 to S533 and S551 to S552, similarly to Steps S131 to S133 and S151 to S152 in FIG. 9, an M-search message and an M-search response are exchanged between the information device 10 and the display devices 20-1 to 20-3, and device descriptions provided from the respective display devices 20 are acquired in the information device 10.

By utilizing the UDP, the information device 10 transmits a switching message to the network 80 by broadcast (S534).

Each of the display devices 20-1 to 20-3 that has received the switching message generates a sound wave pattern file (S553). The sound wave pattern file may be sequentially generated by a sound wave pattern generator, or a file held by the display device 20 beforehand, a file acquired from an outside, or the like may be used.

The display devices 20-1 to 20-3 store the generated sound wave pattern file in an address designated in a url element of a renderPattern element described in the device description (S554).

FIG. 22 illustrates an example of description of an address of a sound wave pattern file. FIG. 22 describes a relative address and file name of a field, "relative address value/filename", as the url element of the renderPattern element of the device description.

At this time, each of the display devices 20-1 to 20-3 stores the generated sound wave pattern file in a location designated by the relative address (relative address value) with the designated file name (filename) attached thereto.

Returning to the description in FIG. 21, the display devices 20-1 to 20-3 output sound waves corresponding to the respective generated sound wave pattern files (the sound waves B25-1 to B25-3 in FIG. 20) from the speaker 205, the output unit 208, or the like (S555).

According to the stored designated URLs, the information device 10 acquires the sound wave pattern files stored in the device descriptions provided from the respective display devices 20 (S535).

Here, in a case where the user brings the information device 10 close to the desired display device 20 serving as the sharing target device, and operation of sensing sound is performed (S512), the following processing is performed in the information device 10.

That is, the information device 10 senses the sound wave output from the desired display device 20 serving as the sharing target device, and converts the sensed sound wave into a pattern file (S536).

Furthermore, the information device 10 compares the file of the sensed sound wave pattern with the acquired sound wave pattern files, and decides the display device 20 serving as the sharing target device according to a comparison result (S537).

Moreover, the information device 10 stores, in the memory 103, the IP address of the display device 20 serving as the sharing target device (S538). Then, in the information device 10, screen sharing is performed by exchanging data with the selected display device 20 (sharing target device) on the basis of the stored IP address.

As described above, in the fifth example of the screen sharing method, a sound wave is output from the speaker 205 or the like of each of the display devices 20-1 to 20-3, and therefore, the user can easily and reliably select a display device 20 to perform screen sharing with the information device 10 only by the microphone 112, sensor 106, or the like of the information device 10 sensing a sound wave from the speaker 205 or the like of the desired display device 20.

Sixth Example

Figure 23:
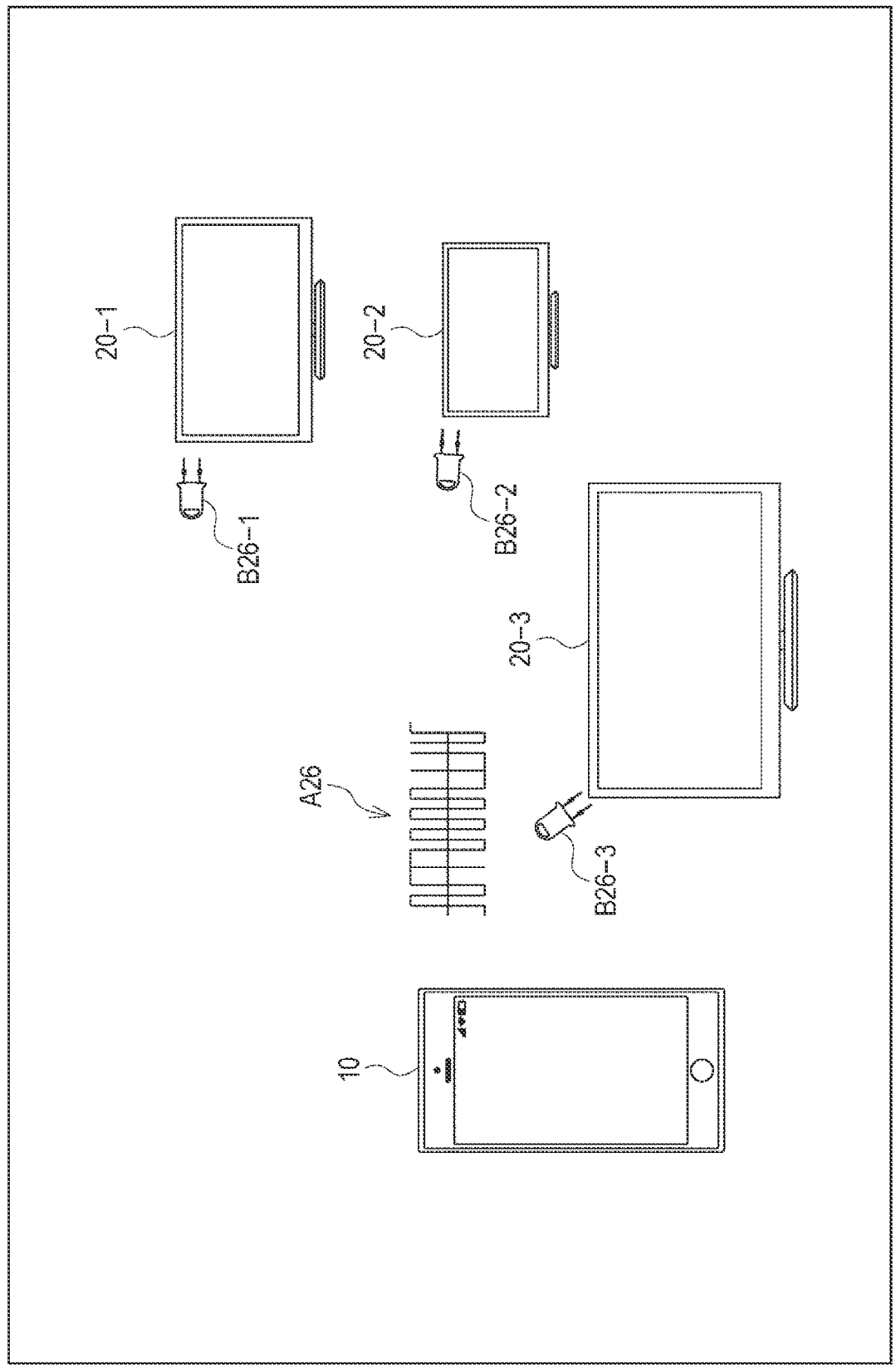
FIG. 23 is a diagram illustrating a sixth example of the screen sharing method.

FIG. 23 illustrates a sixth example of the screen sharing method.

In the sixth example of the screen sharing method, when screen sharing is performed, light is output from each of the plurality of display devices 20, and the information device 10 senses the light, by which screen sharing is performed between the information device 10 and the desired display device 20.

That is, in FIG. 23, in a case where screen sharing is performed from the information device 10 to the display device 20, light B26-1 to B26-3 is output from each of the display devices 20-1 to 20-3.

At this time, the information device 10 can sense the light B26-1 to B26-3 output from the display devices 20-1 to 20-3 by utilizing a function of the sensor 106, the camera 107, or the like.

For example, the user can select the display device 20-3 as the screen sharing target by moving the information device 10 to sense light A26 output from the display device 20-3 desired to be the target for screen sharing among the display devices 20-1 to 20-3 as the candidates for screen sharing.

Figure 24:
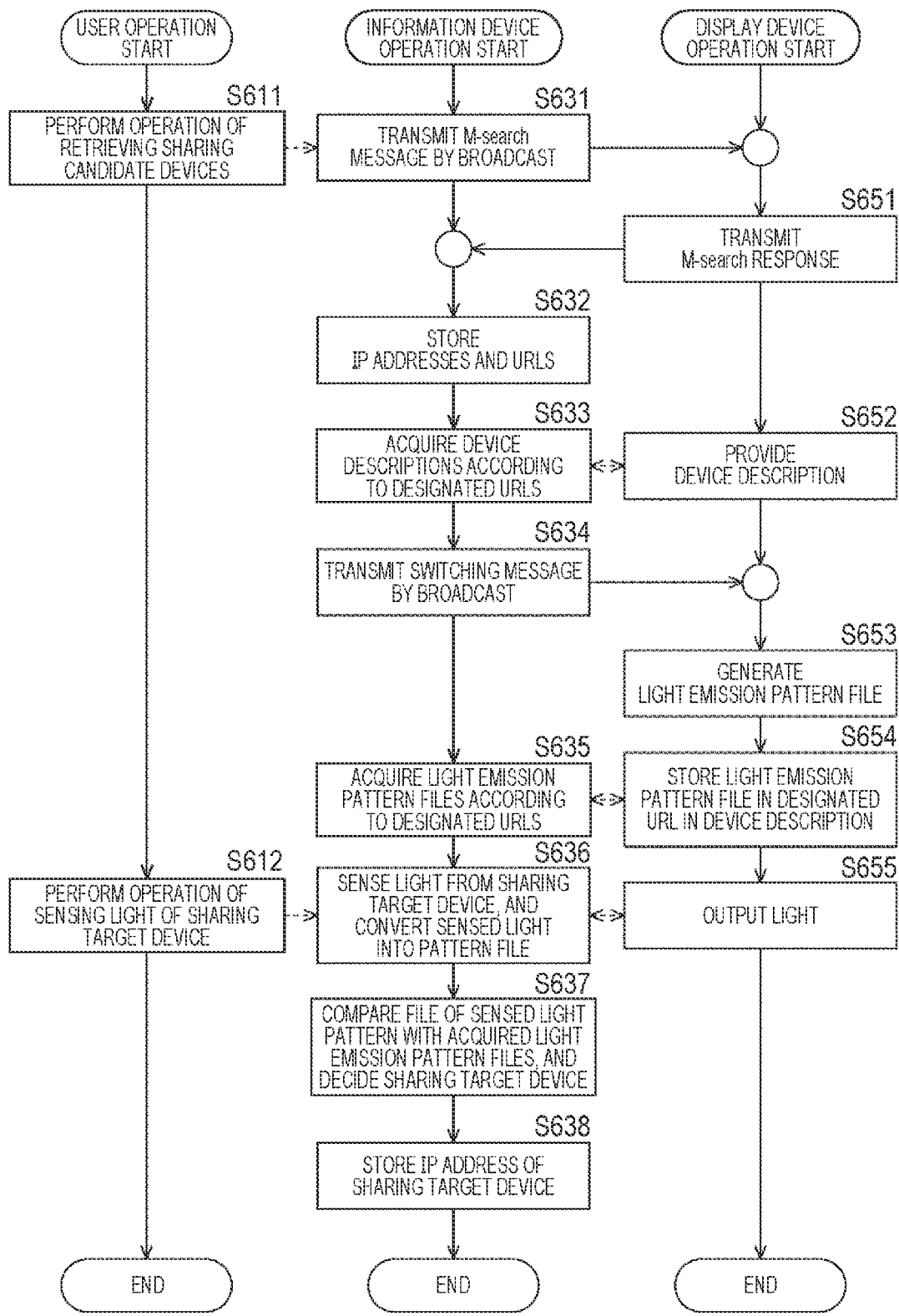
FIG. 24 is a flowchart illustrating a flow of processing by the sixth example of the screen sharing method.

FIG. 24 is a flowchart illustrating a flow of processing by the sixth example of the screen sharing method.

In FIG. 24, each processing step of the information device 10 is executed by the processing unit 100. Furthermore, each processing step of the display device 20 is executed by the processing unit 200.

In a case where operation of retrieving the display devices 20 (sharing candidate devices) is performed (S611), processing in Steps S631 to S635 is executed in the information device 10 (sharing source device), and processing in Steps S651 to S655 is executed in each of the display devices 20-1 to 20-3.

In Steps S631 to S633 and S651 to S652, similarly to Steps S131 to S133 and S151 to S152 in FIG. 9, an M-search message and an M-search response are exchanged between the information device 10 and the display devices 20-1 to 20-3, and device descriptions provided by the respective display devices 20 are acquired in the information device 10.

By utilizing the UDP, the information device 10 transmits a switching message to the network 80 by broadcast (S634).

Each of the display devices 20-1 to 20-3 that has received the switching message generates a light emission pattern file (S653). The light emission pattern file may be sequentially generated by a light emission pattern generator, or a file held by the display device 20 beforehand, a file acquired from an outside, or the like may be used.

The display devices 20-1 to 20-3 store the generated light emission pattern file in an address designated in a url element of a renderPattern element described in the device description (S654).

FIG. 25 illustrates an example of description of an address of a light emission pattern file. Each of the display devices 20-1 to 20-3 stores the generated light emission pattern file in a location designated by the relative address (relative address value) with a designated file name (filename) attached thereto.

Returning to the description in FIG. 24, the display devices 20-1 to 20-3 output light corresponding to the respective generated light emission pattern files (the light B26-1 to B26-3 in FIG. 23) from the output unit 208, the display 204, or the like (S655).

According to the stored designated URLs, the information device 10 acquires the light emission pattern files stored in the device descriptions provided from the respective display devices 20 (S635).

Here, in a case where the user brings the information device 10 close to the desired display device 20 serving as the sharing target device, and operation of sensing light is performed (S612), the following processing is performed in the information device 10.

That is, the information device 10 senses the light output from the desired display device 20 serving as the sharing target device, and converts the sensed light into a pattern file (S636).

Furthermore, the information device 10 compares the file of the sensed light pattern with the acquired light emission pattern files, and decides the display device 20 serving as the sharing target device according to a comparison result (S637).

Moreover, the information device 10 stores, in the memory 103, the IP address of the display device 20 serving as the sharing target device (S638). Then, in the information device 10, screen sharing is performed by exchanging data with the selected display device 20 (sharing target device) on the basis of the stored IP address.

As described above, in the sixth example of the screen sharing method, light is output from the output unit 208 or the like of each of the display devices 20-1 to 20-3, and therefore, the user can easily and reliably select a display device 20 to perform screen sharing with the information device 10 only by the sensor 106, camera 107, or the like of the information device 10 sensing light from the output unit 208 or the like of the desired display device 20.

Seventh Example

Figure 26:
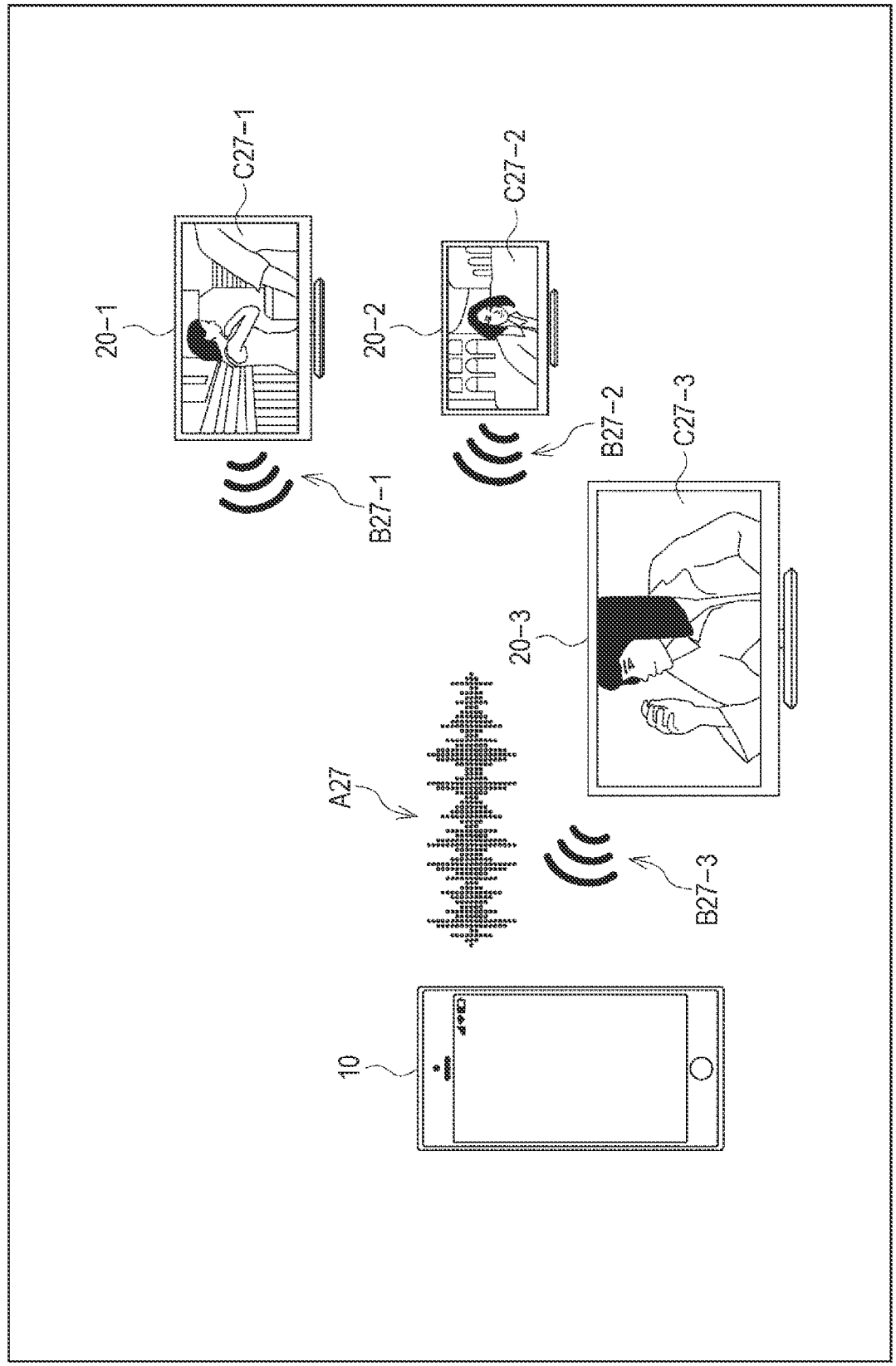
FIG. 26 is a diagram illustrating a seventh example of the screen sharing method.

FIG. 26 illustrates a seventh example of the screen sharing method.

In the seventh example of the screen sharing method, when screen sharing is performed, at least one of sound (a sound wave) or an image is output from each of the plurality of display devices 20, and the information device 10 extracts a fingerprint of at least one of the sound (the sound wave) or the image, by which screen sharing is performed between the information device 10 and the desired display device 20.

That is, in FIG. 26, in a case where screen sharing is performed from the information device 10 to the display device 20, sound waves B27-1 to B27-3 are output from the display devices 20-1 to 20-3, respectively. At this time, the information device 10 can take in the sound waves B27-1 to B27-3 output from the display devices 20-1 to 20-3 by utilizing a function of the microphone 112, the sensor 106, or the like.

Furthermore, in FIG. 26, images C27-1 to C27-3 are displayed on the display devices 20-1 to 20-3, respectively. At this time, the information device 10 can take in the images C27-1 to C27-3 displayed on the display devices 20-1 to 20-3 by utilizing a function of the camera 107, the sensor 106, or the like.

For example, the user can select the display device 20-3 as the screen sharing target by moving the information device 10 to take in a sound wave A27 output from the display device 20-3 desired to be the target for screen sharing among the display devices 20-1 to 20-3 as the candidates for screen sharing, and by using a fingerprint extracted from the sound wave A27.

Figure 27:
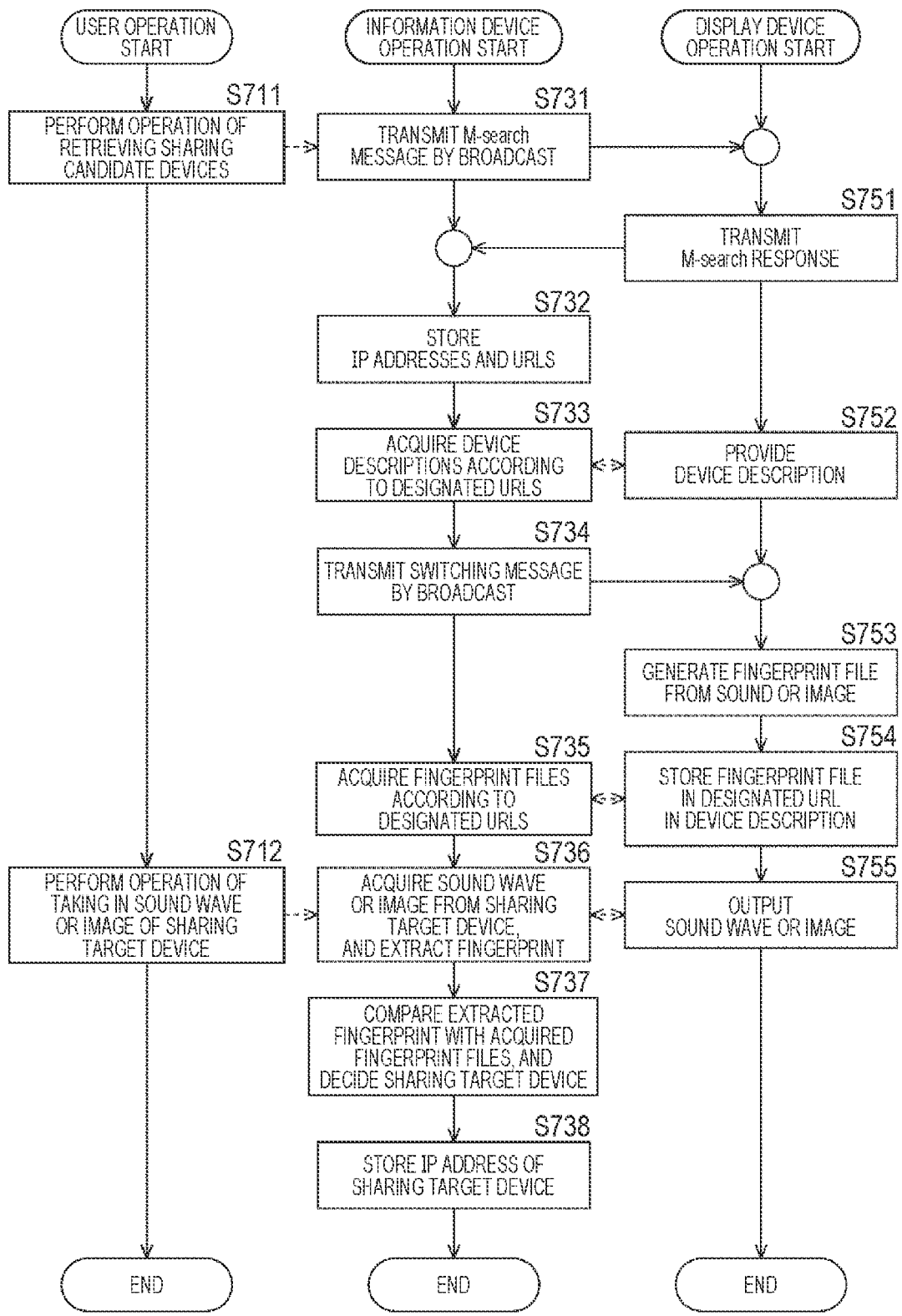
FIG. 27 is a flowchart illustrating a flow of processing by the seventh example of the screen sharing method.

FIG. 27 is a flowchart illustrating a flow of processing by the seventh example of the screen sharing method.

In FIG. 27, each processing step of the information device 10 is executed by the processing unit 100. Furthermore, each processing step of the display device 20 is executed by the processing unit 200.

In a case where operation of retrieving the display devices 20 (sharing candidate devices) is performed (S711), processing in Steps S731 to S735 is executed in the information device 10 (sharing source device), and processing in Steps S751 to S755 is executed in each of the display devices 20-1 to 20-3.

In Steps S731 to S733 and S751 to S752, similarly to Steps S131 to S133 and S151 to S152 in FIG. 9, an M-search message and an M-search response are exchanged between the information device 10 and the display devices 20-1 to 20-3, and device descriptions provided by the respective display devices 20 are acquired in the information device 10.

By utilizing the UDP, the information device 10 transmits a switching message to the network 80 by broadcast (S734).

Each of the display devices 20-1 to 20-3 that has received the switching message generates a fingerprint file on the basis of the fingerprint obtained from at least one of the sound (the sound wave) or the image (S753).

The display devices 20-1 to 20-3 store the generated fingerprint file in an address designated in a url element of a soundSource element or displaySource element in the device description (S754).

FIG. 28 illustrates an example of description of an address of a fingerprint file.

A fingerprint file of the sound wave is stored in a location designated by a relative address (relative address value) of a url element of the soundSource element with a designated file name (filename) attached thereto. A fingerprint file of the image is stored in a location designated by a relative address (relative address value) of a url element of the displaySource element with a designated file name (filename) attached thereto.

Returning to the description in FIG. 27, the respective display devices 20-1 to 20-3 output at least one of the sound waves or images corresponding to the generated fingerprint file (S755).

Specifically, in the display devices 20-1 to 20-3, the sound waves (sound waves B27-1 to B27-3 in FIG. 26) are output from the speaker 205 or the like on the basis of the fingerprint files of the sound waves, and the images (images C27-1 to C27-3 in FIG. 26) are displayed on the display 204 or the like on the basis of the fingerprint files of the images.

According to the stored designated URLs, the information device 10 acquires the fingerprint files stored in the device descriptions provided from the respective display devices 20 (S735).

Here, in a case where the user brings the information device 10 close to the desired display device 20 serving as the sharing target device, and operation of taking in sound or an image is performed (S712), the following processing is performed in the information device 10.

That is, the information device 10 acquires the sound wave or image output from the desired display device 20 serving as the sharing target device, and extracts the fingerprint from the sound wave or the image (S736).

Furthermore, the information device 10 compares the extracted fingerprint with the fingerprints obtained from the acquired fingerprint files, and decides the display device 20 serving as the sharing target device according to a comparison result (S737).

Note that, because a relative address of a file related to a sound wave is described in the device description in each of the display devices 20, the information device 10 can acquire the file regarding the sound wave according to the relative address, compare the sound wave with the sound wave taken in, and determine whether or not the sound waves coincide with each other.

Furthermore, each of the display devices 20 may detect a characteristic point of the sound wave and describe characteristic point detection information thereof in the device description, by which the information device 10 may, on the basis of characteristic point detection information acquired according to the relative address, compare the characteristic point with a characteristic point of the sound wave taken in, and make a coincidence determination.

Furthermore, each of the display devices 20 may insert a watermark in sound (a sound wave), generate a file of a parameter of the watermark, and describe a relative address of the file in the device description, by which the information device 10 may acquire the file of the parameter of the watermark according to the relative address, compare the watermark with the watermark extracted from the audio (the sound wave) taken in, and make a coincidence determination.

Moreover, a relative address of a file regarding to an image or moving image can be described in the device description in each of the display devices 20, and the information device 10 can acquire the file related to the image or moving image according to the relative address, compare the image or moving image with the image or moving image taken in, and make a coincidence determination.

Furthermore, each of the display devices 20 may detect a characteristic point of the image and describe characteristic point detection information thereof in the device description, by which the information device 10 may, on the basis of characteristic point detection information acquired according to the relative address, compare the characteristic point with a characteristic point of the image taken in, and make a coincidence determination.

Furthermore, characteristic point detection processing in both or either one of the information device 10 or the display device 20 may be performed by an external device such as a server connected to both or either one of the information device 10 or the display device 20 via the network 80 or the network 90. In this case, both or either one of the information device 10 or the display device 20 may, by transmitting the acquired information of the sound wave or image to an external device and acquiring characteristic point detection information of the sound wave or image detected by the external device, describe the characteristic point detection information to the device description, and perform processing of comparison of the characteristic points and coincidence determination. The information device 10 may perform processing of deciding the display device 20 serving as the sharing target device on the basis of processing of comparison of fingerprints or characteristic points and of coincidence determination, the processing being performed in the external device.

Furthermore, each of the display devices 20 may insert a watermark in a moving image, generate a file of a parameter of the watermark, and describe a relative address of the file in the device description, by which the information device 10 may acquire the file of the parameter of the watermark according to the relative address, compare the watermark with the watermark extracted from the moving image (image) taken in, and make a coincidence determination.

The information device 10 stores, in the memory 103, the IP address of the display device 20 serving as the sharing target device (S738). Then, in the information device 10, screen sharing is performed by exchanging data with the selected display device 20 (sharing target device) on the basis of the stored IP address.

As described above, in the seventh example of the screen sharing method, a sound wave or image is output from the speaker 205, display 204, or the like of each of the display devices 20-1 to 20-3, and therefore, the user can easily and reliably select a display device 20 to perform screen sharing with the information device 10 only by the microphone 112, camera 107, or the like of the information device 10 taking in a sound wave or image from the desired display device 20.

Eighth Example

Incidentally, although a case where each of the screen sharing methods corresponding to the novel method is performed independently has been described in the above description, a plurality of screen sharing methods may be prepared, and a more appropriate screen sharing method may be implemented from among the plurality of screen sharing methods according to various conditions.

FIG. 29 illustrates an example of description for a device description in a case where a plurality of screen sharing methods is provided.

In FIG. 29, similarly to FIG. 10 described above, the deviceType element, the friendlyName element, the manufacturer element, the manufacturerURL element, the modelDescription element, the modelName element, the modelNumber element, the modelURL element, the serialNumber element, the UDN element, the UPC element, and the iconList element are described in the device description.

Furthermore, in FIG. 29, the displaySource element, the soundSource element, the deviceID element, a qrCode element, and the renderPattern element are added to the device description.

The displaySource element includes a picture_url element and a fingerprint_url element. The picture_url element is an element corresponding to the first example of the screen sharing method described above, and designates a relative address and a file name for when an image file is stored. The fingerprint_url element is an element corresponding to the seventh example of the screen sharing method described above, and designates a relative address and a file name for when an image fingerprint file is stored.

The soundSource element includes the fingerprint_url element. The fingerprint_url element is an element corresponding to the seventh example of the screen sharing method described above, and designates a relative address and a file name for when a sound fingerprint file is stored.

The deviceID element is an element corresponding to the third example of the screen sharing method described above, and designates a random number. The qrCode element is an element corresponding to the fourth example of the screen sharing method described above, and designates a value of a two-dimensional code.

The renderPattern element includes a soundEmission_url element and a lightEmission_url element. The soundEmission_url element is an element corresponding to the fifth example of the screen sharing method described above, and designates a relative address and a file name for when a sound wave pattern file is stored. The lightEmission_url element is an element corresponding to the sixth example of the screen sharing method described above, and designates a relative address and a file name for when a light emission pattern file is stored.

Thus, in the above-described device description (FIG. 29), an element corresponding to the implemented screen sharing method is described for each of the display devices 20, and therefore the information device 10 can recognize a screen sharing method implemented by each of the display devices 20 on the basis of the device description (FIG. 29) acquired from each of the display devices 20, and can implement a more appropriate screen sharing method.

Figure 30:
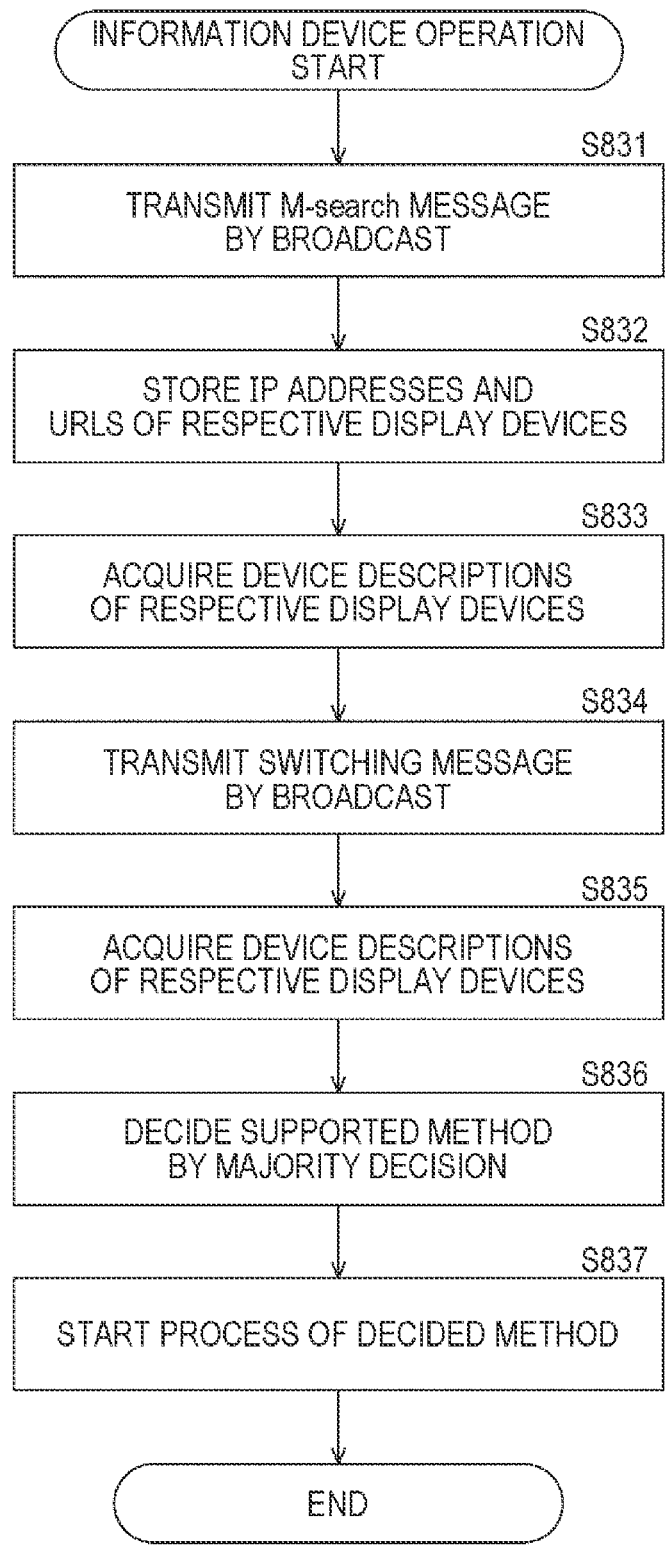
FIG. 30 is a flowchart illustrating a flow of processing by an eighth example of the screen sharing method.

FIG. 30 is a flowchart illustrating a flow of processing in the eighth example of the screen sharing method. Note that, in FIG. 30, each processing step is executed by the processing unit 100 of the information device 10.

By utilizing the UDP, the information device 10 transmits an M-search message to the network 80 by broadcast (S831).

On the basis of the M-search responses received from the respective display devices 20-1 to 20-3, the information device 10 stores, in the memory 103, IP addresses and URLs of device descriptions of the respective display devices 20 (S832).

According to the stored designated URLs, the information device 10 acquires the device descriptions provided from the respective display devices 20 (S833).

By utilizing the UDP, the information device 10 transmits a switching message to the network 80 by broadcast (S834).

According to the stored designated URLs, the information device 10 acquires the device descriptions provided from the respective display devices 20 (S835). In the device description acquired here, an element corresponding to the implemented screen sharing method is added for each of the display devices 20 (FIG. 29).

The information device 10 decides a supported screen sharing method by majority decision on the basis of the device descriptions (FIG. 29) provided by the respective display devices 20 (S836).

In this decision, the screen sharing methods implemented by the display devices 20 can be recognized from the device descriptions (FIG. 29) of the respective display devices 20, and therefore, it is possible to select a screen sharing method implemented by the largest number of display devices 20.

At this time, in a case where there is a plurality of the same largest number of screen sharing methods, the screen sharing method to be implemented can be selected according to a preset priority or the like. Specifically, for example, in a case where a priority of the fourth example of the screen sharing method is higher than a priority of the seventh example of the screen sharing method, the method using a two-dimensional code is prioritized over the method using a fingerprint.

Note that the method using majority decision is merely an example as a method for deciding a screen sharing method, and the screen sharing method may be decided by using, for example, setting information set by the user, past history information, or the like.

The information device 10 starts a process of the decided screen sharing method (S837).

As described above, in the eighth example of the screen sharing method, a more appropriate screen sharing method is selected even in a case where different screen sharing methods are implemented by the respective display devices 20, and therefore, the user can more reliably select a display device 20 to perform screen sharing with the information device 10.

2. Modifications (Another Configuration of System)

The above-described configuration is merely an example of a configuration of the content reproduction system 1, and another configuration may be adopted by adding another unillustrated device, removing an illustrated device, or the like.

For example, in the content reproduction system 1, the information device 10 or the display device 20 may be connected (directly connected) to the network 90 such as the Internet or a mobile telephone network without the router 30, and may receive streaming data distributed from the distribution server 40.

Furthermore, although a case where screen sharing is performed from the information device 10 such as a smartphone to the display device 20 such as a television receiver has been described in the above description, conversely, screen sharing may be performed from the display device 20 such as a television receiver to the information device 10 such as a smartphone. Also in this case, a screen sharing method corresponding to the above-described novel method is used.

Furthermore, although a case where the information device 10 and the plurality of display devices 20 are provided in a predetermined space, such as a home of a certain user, has been exemplified as the configuration of the content reproduction system 1 described above, the information device 10 and the plurality of display devices 20 may be similarly provided in another space such as a home of another user.

Note that, although a case where the information device 10 and the display devices 20 receive (reproduce) communication content has been mainly described in the above description, a screen sharing method corresponding to the novel method may be used in a case where other content such as broadcast content or video content is received (reproduced).

Furthermore, although a case where friendly names such as names of devices are displayed on the selection screen of the information device 10 at a time of screen sharing has been described in the above description, for example, text of various statuses (color of light, temperature, or the like) or model numbers, other than the names of the devices, may be (simultaneously) displayed. For example, along with the friendly names on the selection screen A21, the friendly names indicating the display devices 20, names and outlines of content currently being reproduced on corresponding display devices 20 may be displayed, or information regarding processing being performed by the display devices 20 may be displayed.

Furthermore, although a case where all the display devices 20-1 to 20-N are television receivers has been exemplified in the above description, needless to say, the display devices may be devices other than television receivers. Moreover, the display devices 20-1 to 20-N are not necessarily to include only the same type of devices such as television receivers, and may include a plurality of types of devices such as a television receiver and a display apparatus. For example, the display device 20 may be a refrigerator capable of screen sharing with the information device 10, and information regarding content output from a refrigerator as the display device 20 or a dish recipe displayed on a display of the refrigerator may be displayed on the selection screen A21 displayed on the information device 10.

Furthermore, in the present disclosure, the system means a set of a plurality of components (apparatuses, modules (parts), or the like) without regard to whether or not all the components are in the same housing. Therefore, a plurality of apparatuses housed in separate housings and connected via a network, and one apparatus housing a plurality of modules in one housing are both systems.

Furthermore, respective components may use any communication mode. In other words, the respective components may be connected as the network 80 or the network 90 via a communication network such as the Internet, an intranet, or a mobile telephone network, or may be connected via a local network (local area network (LAN) or wide area network (WAN)) or the like. Moreover, the respective components may be connected by wire or wirelessly. Note that the network 80 and the network 90 may be the same network.

(Overall Configuration)

Figure 31:
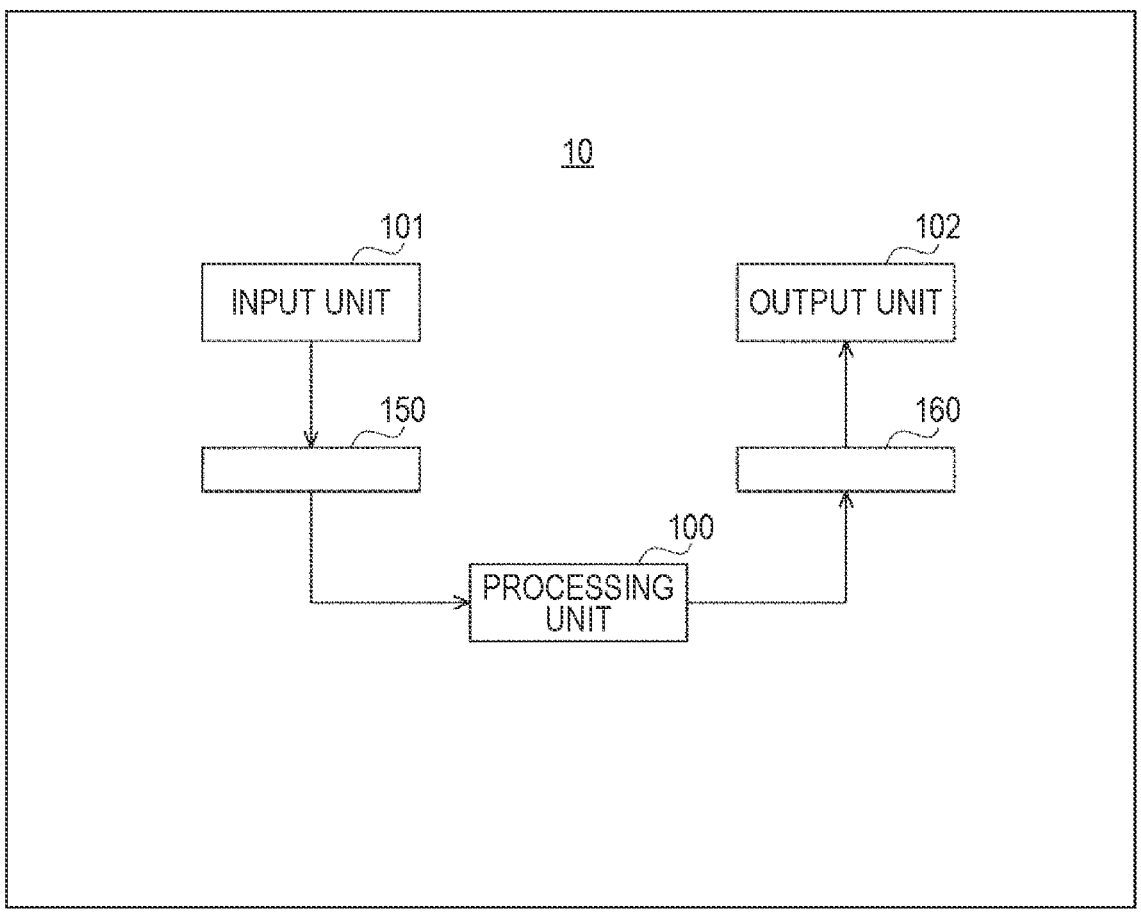
FIG. 31 is a block diagram illustrating an example of an overall configuration of one embodiment of the present disclosure.

FIG. 31 is a block diagram illustrating an example of an overall configuration of one embodiment of the present disclosure.

With reference to FIG. 31, a system 10 corresponding to the information device 10 (or to the display device 20) includes an input unit 101, the processing unit 100, and the output unit 102. The input unit 101, the processing unit 100, and the output unit 102 are implemented by one or a plurality of information processing apparatuses as illustrated in a configuration example of the system 10 to be described later.

Note that, although the configuration of the system 10 corresponding to the information device 10 will be described as a representative example in the following description, a system corresponding to the display device 20 can be similarly configured.

(Example of Input Unit)

The input unit 101 includes, for example, software or the like that acquires information from an operation input apparatus, a sensor, or an external service, and receives input of various pieces of information from the user, a surrounding environment, or another service.

The operation input apparatus includes, for example, a hardware button, a keyboard, a mouse, a touch panel, a touch sensor, a proximity sensor, an acceleration sensor, an angular velocity sensor, a temperature sensor, or the like, and receives operation input by a user. Furthermore, the operation input apparatus may include a camera (image sensor), a microphone, or the like that receives operation input represented by a gesture or voice of the user.

Note that the input unit 101 may include a processor or processing circuit that converts a signal or data acquired by the operation input apparatus into an operation command. Alternatively, the input unit 101 may output the signal or data acquired by the operation input apparatus to an interface 150 without converting the signal or data into an operation command. In this case, the signal or data acquired by the operation input apparatus is converted into an operation command in the processing unit 100, for example.

The sensor includes an acceleration sensor, an angular velocity sensor, a geomagnetic sensor, an illuminance sensor, a temperature sensor, an atmospheric pressure sensor, or the like, and detects acceleration, angular velocity, azimuth, illuminance, temperature, atmospheric pressure, or the like applied to the apparatus. For example, in a case where an apparatus including a sensor is carried or worn by the user, the above-described various sensors can detect various types of information as information regarding the user, for example, information indicating a motion, orientation, or the like of the user.

Furthermore, the sensor may include a sensor that detects biological information of the user, such as a pulse, perspiration, a brain wave, a tactile sense, an olfactory sense, or a gustatory sense. The input unit 101 may include a processing circuit that acquires information indicating emotion of the user by analyzing information detected by these sensors and/or image data or audio data detected by a camera or microphone to be described later. Alternatively, the above-described information and/or data may be output to the interface 150 without being analyzed, and analysis may be executed in the processing unit 100, for example.

Moreover, the sensor may acquire an image or audio in vicinity of the user or the apparatus as data by using a camera, a microphone, the above-described various sensors, or the like. Furthermore, the sensor may include a position detection means that detects an indoor or outdoor position.

Specifically, the position detection means may include a global navigation satellite system (GLASS) receiver, for example, a global positioning system (GPS) receiver, a global navigation satellite system (GLONASS) receiver, a BeiDou navigation satellite system (BDS) receiver, and/or a communication apparatus, or the like.

The communication apparatus detects a position by utilizing a technique such as, for example, Wi-Fi (registered trademark), Multi-Input Multi-Output (MIMO), cellular communication (for example, position detection using a portable base station or femtocell), near field communication (for example, Bluetooth Low Energy (BLE) or Bluetooth (registered trademark)), or Low Power Wide Area (LPWA).

In a case where a sensor as described above detects a position or situation (including biological information) of the user, an apparatus including the sensor is carried or worn by the user, for example. Alternatively, even in a case where an apparatus including a sensor is installed in a living environment of the user, detection of the position or situation (including biological information) of the user may be possible. For example, a pulse of the user can be detected by analyzing an image including a face of the user, the image being acquired by a camera fixedly installed in a room or the like.

Note that the input unit 101 may include a processor or processing circuit that converts a signal or data acquired by a sensor into a predetermined format (for example, converts an analog signal into a digital signal, or encodes image data or audio data). Alternatively, the input unit 101 may output the acquired signal or data to the interface 150 without converting the signal or data into the predetermined format. In this case, the signal or data acquired by the sensor is converted into an operation command in the processing unit 100.

By utilizing an application program interface (API) of the external service, for example, the software that acquires information from the external service acquires various pieces of information provided by the external service. For example, the software may acquire information from a server of the external service, or may acquire information from application software of a service executed on a client apparatus.

Software may acquire, for example, information of text, image, or the like posted to the external service, such as a social medium, by the user or another user.

The acquired information is not necessarily intentionally posted by the user or the another user, and may be, for example, a log of operation executed by the user or the another user, or the like. Furthermore, the acquired information is not limited to personal information of the user or the another user, and may be information such as, for example, news, weather forecast, traffic information, point of interest (POI) or, advertisement, the information being distributed to an unspecified number of users.

Furthermore, for the information acquired from the external service, information acquired by the above-described various sensors, such as, for example, acceleration, angular velocity, orientation, altitude, illuminance, temperature, atmospheric pressure, pulse, perspiration, brain wave, tactile sense, olfactory sense, or gustatory sense information, or other biological information, emotion or position information, or the like may be detected by a sensor included in another system linked to the external service, and information generated by being posted to the external service may be included.

The interface 150 is an interface between the input unit 101 and the processing unit 100. For example, in a case where the input unit 101 and the processing unit 100 are implemented by separate apparatuses, the interface 150 may include a wired or wireless communication interface. Furthermore, the Internet may be interposed between the input unit 101 and the processing unit 100.

More specifically, the wired or wireless communication interface may include cellular communication such as 3G/LTE/5G, Wi-Fi (registered trademark), Bluetooth (registered trademark), near field communication (NFC), Ethernet (registered trademark), High-Definition Multimedia Interface (HDMI (registered trademark)), Universal Serial Bus (USB), or the like.

Furthermore, in a case where the input unit 101 and at least a part of the processing unit 100 are implemented by the same apparatus, the interface 150 may include a bus in the apparatus, data reference in a program module, or the like (hereinafter, each of these is also referred to as an intra-apparatus interface).

Furthermore, in a case where the input unit 101 is implemented by being distributed to a plurality of apparatuses, the interface 150 may include different types of interfaces for the respective apparatuses. For example, the interface 150 may include both a communication interface and an intra-apparatus interface.

(Example of Processing Unit)

The processing unit 100 executes various processing on the basis of information acquired by the input unit 101. More specifically, for example, the processing unit 100 includes a processor or processing circuit such as a central processing unit (CPU), a graphics processing unit (GPU), a digital signal processor (DSP), an application specific integrated circuit (ASIC), or a field-programmable gate array (FPGA).

Furthermore, the processing unit 100 may include a memory or storage apparatus that temporarily or permanently stores a program executed in the processor or processing circuit, and data read and written in processing.

Note that the processing unit 100 may be implemented by a single processor or processing circuit in a single apparatus, or may be implemented by being distributed to a plurality of apparatuses or to a plurality of processors or processing circuits in the same apparatus.

Figure 32:
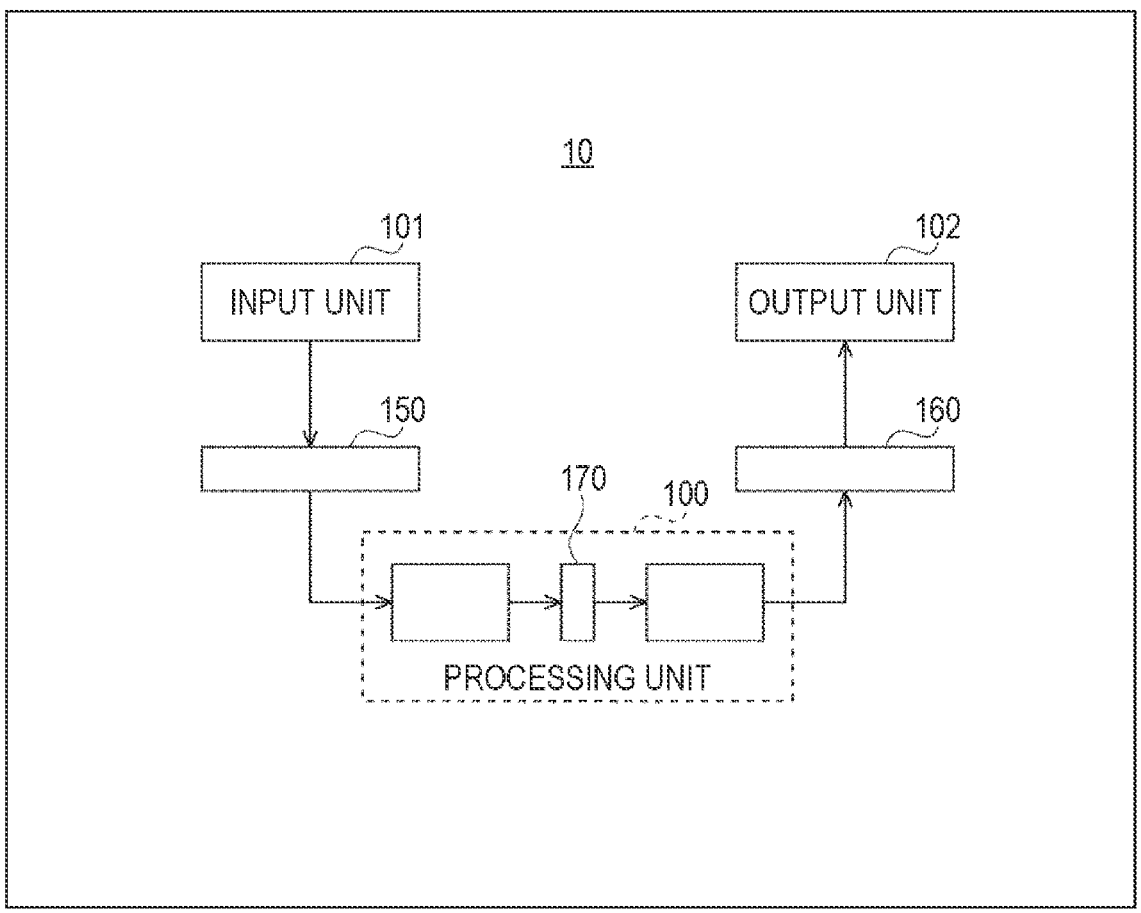
FIG. 32 is a block diagram illustrating another example of the overall configuration of one embodiment of the present disclosure.
Figure 33:
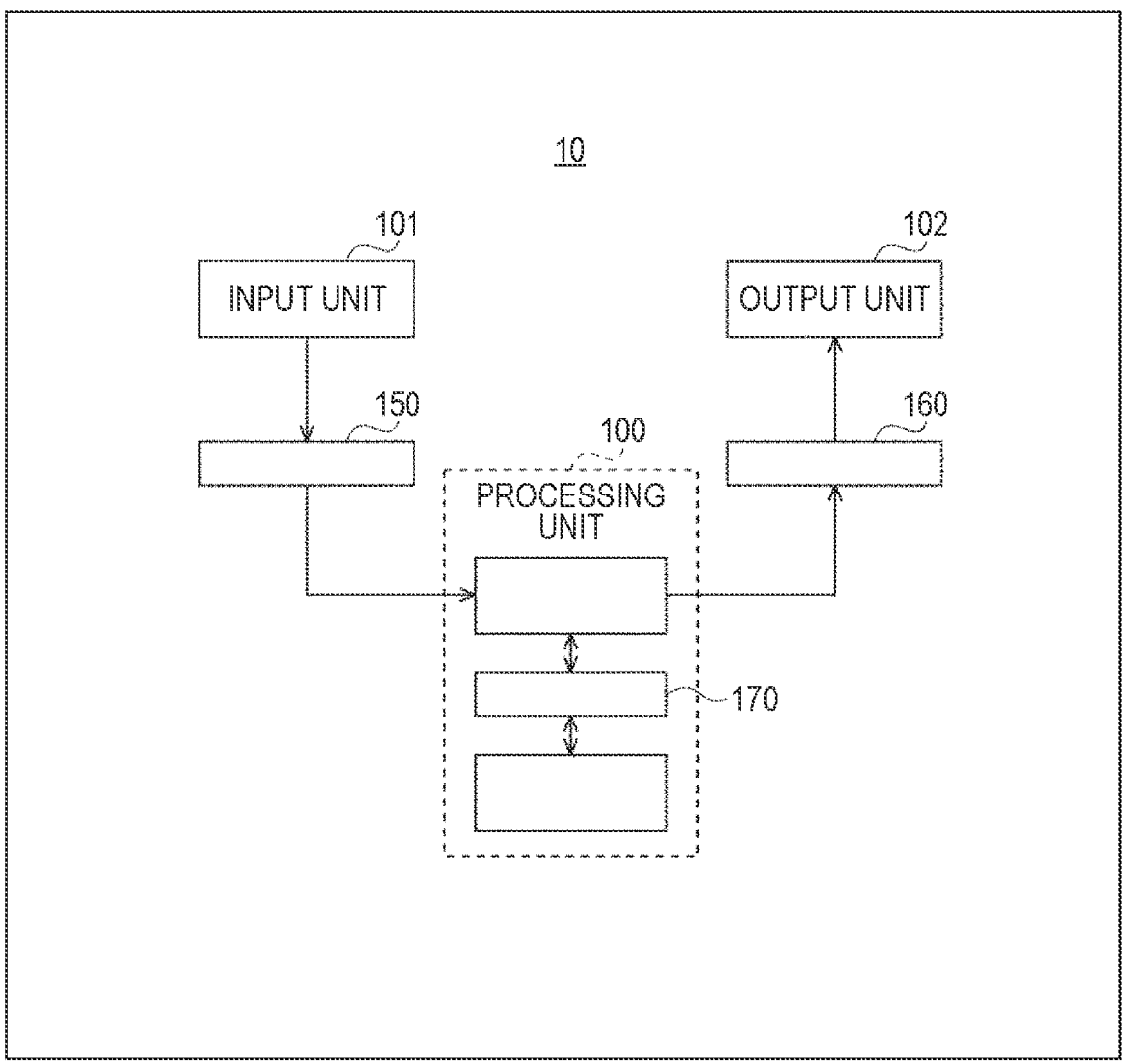
FIG. 33 is a block diagram illustrating another example of the overall configuration of one embodiment of the present disclosure.

In a case where the processing unit 100 is implemented by being distributed, as in the examples illustrated in FIGS. 32 and 33, an interface 170 is interposed between the divided portions of the processing unit 100. The interface 170 may include a communication interface or an intra-apparatus interface, similarly to the interface 150 described above.

Note that, although individual functional blocks constituting the processing unit 100 are exemplified in detailed description of the processing unit 100 to be described later, the interface 170 may be interposed between any of the functional blocks. That is, in a case where the processing unit 100 is implemented by being distributed to a plurality of apparatuses, or to a plurality of processors or processing circuits, how to distribute functional blocks to each of the apparatuses, each of the processors, or each of the processing circuits is arbitrary unless otherwise described.

(Example of Output Unit)

The output unit 102 outputs information provided from the processing unit 100 to the user (The user may be the same as or different from the user of the input unit 101.), the external apparatus, or another service. For example, the output unit 102 may include an output apparatus, a control apparatus, software that provides information to an external service, or the like.

The output apparatus outputs the information provided from the processing unit 100 in a form perceived by a sense of the user, such as a visual sense, an auditory sense, a tactile sense, an olfactory sense, or a gustatory sense (The user may be the same as or different from the user of the input unit 101.). For example, the output apparatus is a display, and outputs information with an image.

Note that the display is not limited to a reflective or self-luminous display such as a liquid crystal display (LCD) or an organic electro-luminescence (EL) display, and includes a combination of a light guiding member that guides image display light to eyes of the user and a light source, as used in a wearable apparatus or the like. Furthermore, the output apparatus may include a speaker and output information by audio. In addition, the output apparatus may include a projector, a vibrator, or the like.

The control apparatus controls the apparatus on the basis of the information provided from the processing unit 100. The apparatus to be controlled may be included in an apparatus that implements the output unit 102, or may be an external apparatus. More specifically, for example, the control apparatus includes a processor or processing circuit that generates a control command.

In a case where the external apparatus is controlled, the output unit 102 may further include a communication apparatus that transmits the control command to the external apparatus. The control apparatus controls, for example, a printer that outputs the information provided from the processing unit 100 as a printed material. The control apparatus may include a driver that controls writing of the information provided from the processing unit 100 to a storage apparatus or a removable recording medium.

Alternatively, the control apparatus may control an apparatus other than an apparatus that outputs or records the information provided from the processing unit 100. For example, the control apparatus may control a lighting apparatus to turn on lighting, control a television to turn off an image, control an audio apparatus to adjust volume, or control a robot to control movement thereof, or the like.

Furthermore, the control apparatus may control an input apparatus included in the input unit 101. That is, the control apparatus can control the input apparatus to acquire predetermined information. Furthermore, the control apparatus may be implemented by the same apparatus as the input apparatus. With this arrangement, the input apparatus can control another input apparatus. For example, in a case where there is a plurality of camera apparatuses, and normally only one camera is activated for a purpose of power saving, control is performed so that the active camera apparatus activates another connected camera apparatus when a person is recognized.

The software that provides information to an external service provides the external service with the information provided from the processing unit 100 by utilizing, for example, an API of the external service. For example, the software may provide information to a server of the external service, or may provide information to application software of a service executed on a client apparatus.

The provided information does not necessarily need to be immediately reflected in the external service, and may be provided as a candidate for the user to post or transmit to the external service, for example.

More specifically, for example, the software may provide, in browser software executed on the client apparatus, text used as a candidate for a search keyword or for a uniform resource locator (URL) input by the user. Furthermore, for example, on behalf of the user, the software may post text, an image, a moving image, audio, or the like to an external service such as a social medium.

An interface 160 is an interface between the processing unit 100 and the output unit 102. For example, in a case where the processing unit 100 and the output unit 102 are implemented by separate apparatuses, the interface 160 may include a wired or wireless communication interface.

Furthermore, in a case where at least a part of the processing unit 100 and the output unit 102 are implemented by the same apparatus, the interface 160 may include the intra-apparatus interface described above. Furthermore, in a case where the output unit 102 is implemented by being distributed to a plurality of apparatuses, the interface 160 may include different types of interfaces for the respective apparatuses. For example, the interface 160 may include both a communication interface and an intra-apparatus interface.

(System Configuration)

One embodiment of the present disclosure has been described above. As described above, the system 10 according to the present embodiment includes the input unit 101, the processing unit 100, and the output unit 102, and these components are implemented by one or a plurality of information processing apparatuses. Hereinafter, examples of a combination of information processing apparatuses that implement the system 10 will be described along with more specific examples.

First Example

Figure 34:
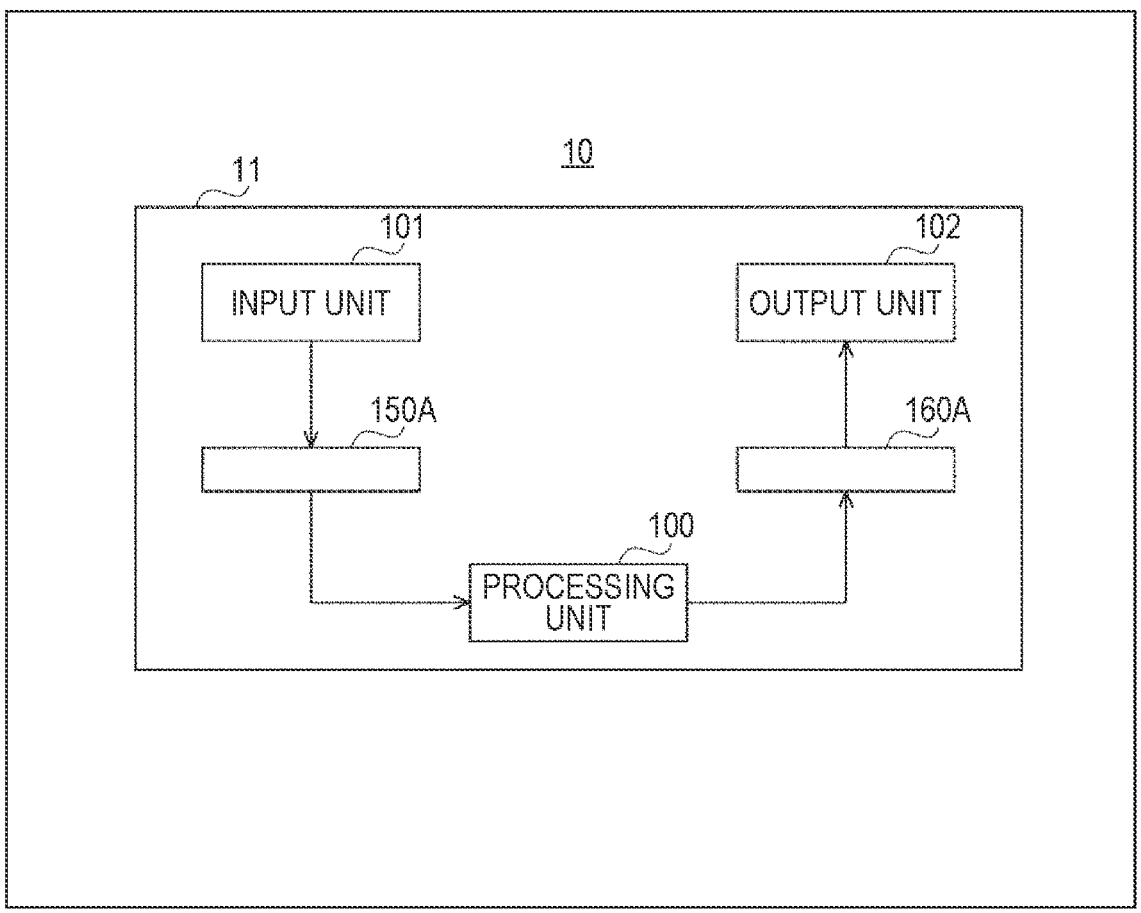
FIG. 34 is a block diagram illustrating a first example of a system configuration according to an embodiment of the present disclosure.

FIG. 34 is a block diagram illustrating a first example of a system configuration according to an embodiment of the present disclosure.

With reference to FIG. 34, the system 10 includes an information processing apparatus 11. The input unit 101, the processing unit 100, and the output unit 102 are all implemented in the information processing apparatus 11. The information processing apparatus 11 may be a terminal apparatus or a server as described below.

In the first example, the information processing apparatus 11 may be a stand-alone apparatus that does not communicate with an external apparatus via a network in order to implement a function according to the embodiment of the present disclosure.

Note that the information processing apparatus 11 may communicate with an external apparatus for another function, and therefore may not necessarily be a stand-alone apparatus. Both an interface 150A between the input unit 101 and the processing unit 100 and an interface 160A between the processing unit 100 and the output unit 102 may be intra-apparatus interfaces.

In the first example, the information processing apparatus 11 may be, for example, a terminal apparatus. In this case, the input unit 101 may include an input apparatus, a sensor, software that acquires information from an external service, or the like. The software that acquires information from an external service acquires data from, for example, application software of a service executed on the terminal apparatus.

The processing unit 100 is implemented by a processor or processing circuit included in the terminal apparatus operating according to a program stored in a memory or a storage apparatus. The output unit 102 may include an output apparatus, a control apparatus, software that provides information to an external service, or the like. The software that provides information to an external service may provide information to, for example, application software of a service executed on the terminal apparatus.

Alternatively, in the first example, the information processing apparatus 11 may be a server. In this case, the input unit 101 may include software that acquires information from an external service. The software that acquires information from an external service acquires data from, for example, a server of the external service (which may be the information processing apparatus 11 itself).

The processing unit 100 is implemented by a processor included in the terminal apparatus operating according to a program stored in a memory or a storage apparatus. The output unit 102 may include software that provides information to an external service, or the like. The software that provides information to an external service provides information to, for example, a server of the external service (which may be the information processing apparatus 11 itself).

Second Example

Figure 35:
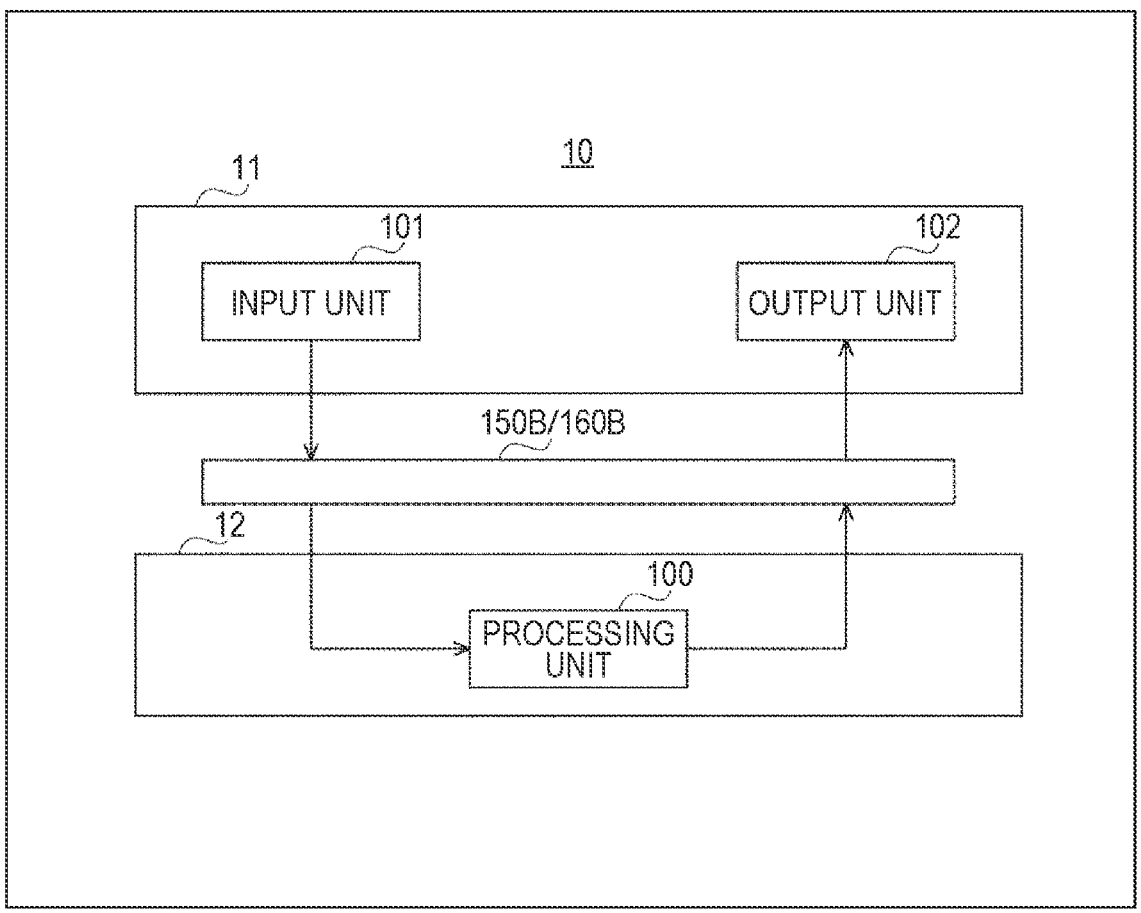
FIG. 35 is a block diagram illustrating a second example of the system configuration according to the embodiment of the present disclosure.

FIG. 35 is a block diagram illustrating a second example of the system configuration according to the embodiment of the present disclosure.

With reference to FIG. 35, the system 10 includes information processing apparatuses 11 and 12. The input unit 101 and the output unit 102 are implemented in the information processing apparatus 11. Meanwhile, the processing unit 100 is implemented in an information processing apparatus 12.

The information processing apparatus 11 and the information processing apparatus 12 communicate with each other via a network in order to implement a function according to the embodiment of the present disclosure. Both an interface 150B between the input unit 101 and the processing unit 100 and an interface 160B between the processing unit 100 and the output unit 102 may be inter-apparatus communication interfaces.

In the second example, the information processing apparatus 11 may be, for example, a terminal apparatus. In this case, similarly to the first example described above, the input unit 101 may include an input apparatus, a sensor, software that acquires information from an external service, or the like. Similarly to the first example described above, also, the output unit 102 may include an output apparatus, a control apparatus, software that provides information to an external service, or the like.

Alternatively, the information processing apparatus 11 may be a server for exchanging information with an external service. In this case, the input unit 101 may include software that acquires information from an external service. Furthermore, the output unit 102 may include software that provides information to an external service.

Furthermore, in the second example, the information processing apparatus 12 may be a server or a terminal apparatus. The processing unit 100 is implemented by a processor or processing circuit included in the information processing apparatus 12 operating according to a program stored in a memory or a storage apparatus.

The information processing apparatus 12 may be an apparatus used exclusively as, for example, a server. In this case, the information processing apparatus 12 may be installed in a data center or the like, or may be installed in a home. Alternatively, although the information processing apparatus 12 can be utilized as a terminal apparatus for another function, the information processing apparatus 12 may be an apparatus that does not implement the input unit 101 and the output unit 102 for a function according to the embodiment of the present disclosure.

In the following examples, the information processing apparatus 12 may be a server or a terminal apparatus in the above-described sense.

As an example, a case where the information processing apparatus 11 is a wearable device and the information processing apparatus 12 is a mobile device connected to the wearable device by Bluetooth (registered trademark) or the like will be considered.

In a case where the wearable device receives operation input by the user (the input unit 101), and the mobile device executes processing on the basis of a request transmitted on the basis of the operation input (the processing unit 100), and outputs a result of the processing from the wearable device (the output unit 102), it can be said that the wearable device functions as the information processing apparatus 11 in the second example described above, and that the mobile device functions as the information processing apparatus 12.

Third Example

Figure 36:
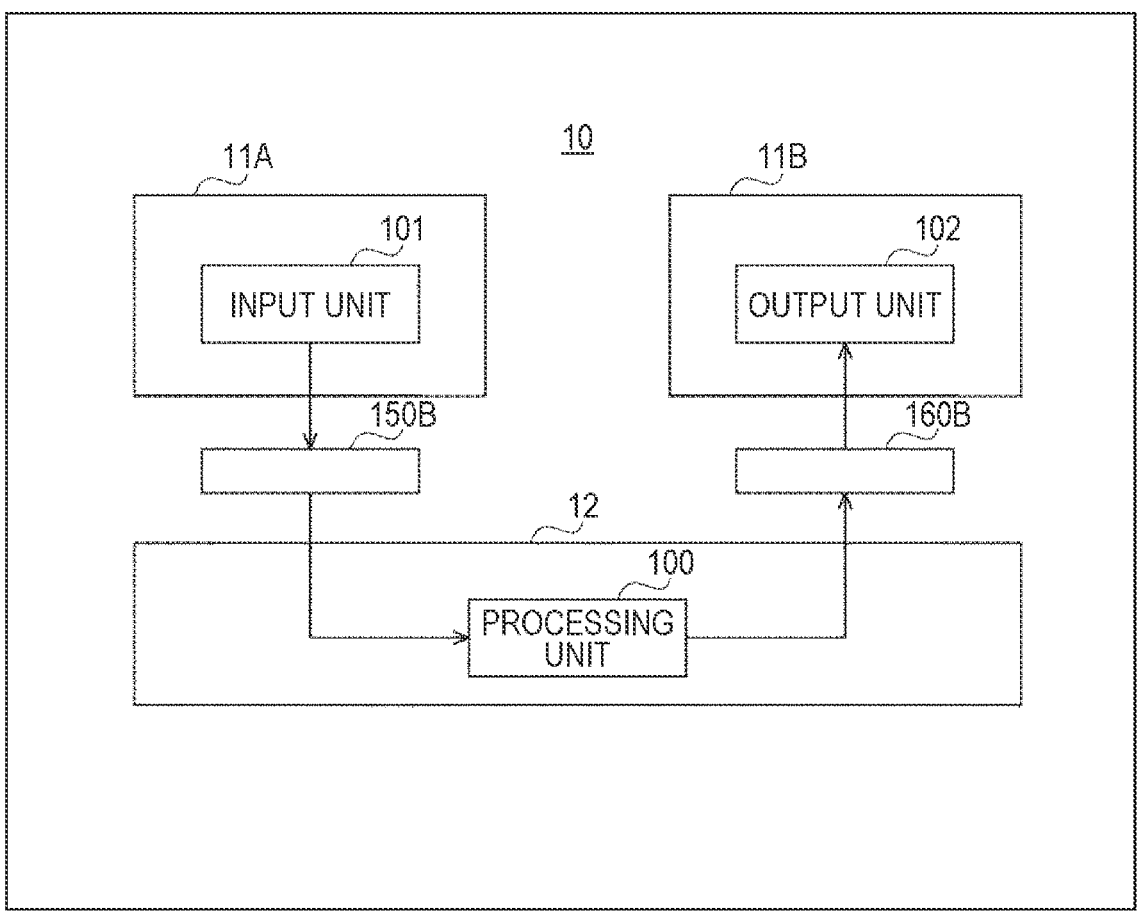
FIG. 36 is a block diagram illustrating a third example of the system configuration according to the embodiment of the present disclosure.

FIG. 36 is a block diagram illustrating a third example of the system configuration according to the embodiment of the present disclosure.

With reference to FIG. 36, the system 10 includes information processing apparatuses 11A, 11B, and 12. The input unit 101 is implemented in the information processing apparatus 11A. The output unit 102 is implemented in an information processing apparatus 11B. Furthermore, the processing unit 100 is implemented in the information processing apparatus 12.

The information processing apparatus 11A or 11B and the information processing apparatus 12 communicate with each other via a network in order to implement a function according to the embodiment of the present disclosure. Both an interface 150B between the input unit 101 and the processing unit 100 and an interface 160B between the processing unit 100 and the output unit 102 may be inter-apparatus communication interfaces.

However, because the information processing apparatus 11A and the information processing apparatus 11B are separate apparatuses in the third example, the interfaces 150B and 160B may include different types of interfaces.

In the third example, the information processing apparatuses 11A and 11B may be, for example, terminal apparatuses. In this case, similarly to the first example described above, the input unit 101 may include an input apparatus, a sensor, software that acquires information from an external service, or the like. Similarly to the first example described above, also, the output unit 102 may include an output apparatus, a control apparatus, software that provides information to an external service, or the like.

Alternatively, one or both of the information processing apparatuses 11A and 11B may be servers for acquiring information from an external service and providing information to the external service. In this case, the input unit 101 may include software that acquires information from an external service. Furthermore, the output unit 102 may include software that provides information to an external service.

Furthermore, in the third example, similarly to the second example described above, the information processing apparatus 12 may be a server or a terminal apparatus. The processing unit 100 is implemented by a processor or processing circuit included in the information processing apparatus 12 operating according to a program stored in a memory or a storage apparatus.

In the second example described above, the information processing apparatus 11A that implements the input unit 101 and the information processing apparatus 11B that implements the output unit 102 are separate apparatuses. Therefore, for example, it is possible to implement a function of outputting a result of processing based on input acquired by the information processing apparatus 11A, which is a terminal apparatus possessed or used by a first user, from the information processing apparatus 11B, which is a terminal apparatus possessed or used by a second user different from the first user.

Furthermore, it is also possible to implement a function of outputting a result of processing based on input acquired by the information processing apparatus 11A, which is a terminal apparatus possessed or used by the first user, from the information processing apparatus 11B, which is a terminal apparatus not at hand of the first user (for example, installed at home while the first user is not at home) at that point of time. Alternatively, both the information processing apparatus 11A and the information processing apparatus 11B may be terminal apparatuses possessed or used by the same user.

For example, in a case where the information processing apparatuses 11A and 11B are wearable devices worn on different parts of the user, or in a case where the information processing apparatuses 11A and 11B are a combination of a wearable device and a mobile device, a function in which these devices are linked can be provided to the user.

Fourth Example

Figure 37:
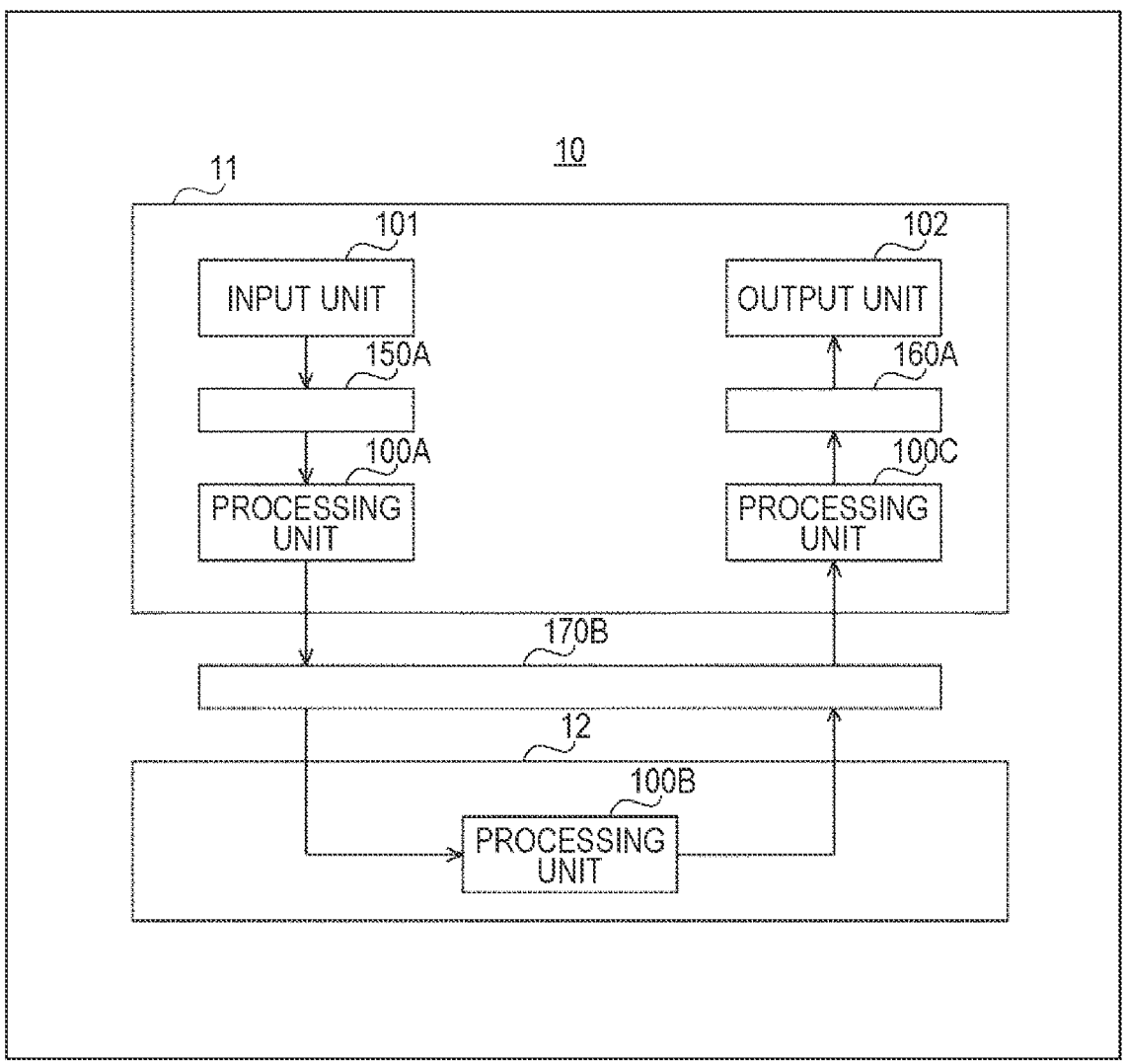
FIG. 37 is a block diagram illustrating a fourth example of the system configuration according to the embodiment of the present disclosure.

FIG. 37 is a block diagram illustrating a fourth example of the system configuration according to the embodiment of the present disclosure.

With reference to FIG. 37, the system 10 includes the information processing apparatuses 11 and 12. In the fourth example, the input unit 101 and the output unit 102 are implemented in the information processing apparatus 11. Meanwhile, the processing unit 100 is implemented by being distributed to the information processing apparatus 11 and the information processing apparatus 12.

The information processing apparatus 11 and the information processing apparatus 12 communicate with each other via a network in order to implement a function according to the embodiment of the present disclosure.

As described above, in the fourth example, the processing unit 100 is implemented by being distributed between the information processing apparatus 11 and the information processing apparatus 12.

More specifically, the processing unit 100 includes processing units 100A and 100C implemented by the information processing apparatus 11 and a processing unit 100B implemented by the information processing apparatus 12. The processing unit 100A executes processing on the basis of information provided from the input unit 101 via the interface 150A, and provides a result of the processing to the processing unit 100B. In this sense, it can also be said that the processing unit 100A executes pre-processing.

Meanwhile, the processing unit 100C executes processing on the basis of information provided from the processing unit 100B, and provides a result of the processing to the output unit 102 via the interface 160A. In this sense, it can also be said that the processing unit 100C executes post-processing.

Note that, although both the processing unit 100A that executes the pre-processing and the processing unit 100C that executes the post-processing are illustrated in the illustrated example, in practice, only either one of the processing units may exist.

That is, the information processing apparatus 11 implements the processing unit 100A that executes pre-processing, and may not implement the processing unit 100C that executes post-processing, and the information provided from the processing unit 100B may be provided to the output unit 102 as is. Similarly, the information processing apparatus 11 implements the processing unit 100C that executes post-processing, and may not implement the processing unit 100A that executes pre-processing.

An interface 170B is interposed between the processing unit 100A and the processing unit 100B and between the processing unit 100B and the processing unit 100C. The interface 170B is an inter-apparatus communication interface.

Meanwhile, in a case where the information processing apparatus 11 implements the processing unit 100A, the interface 150A is an intra-apparatus interface. Similarly, in a case where the information processing apparatus 11 implements the processing unit 100C, the interface 160A is an intra-apparatus interface.

Note that the above-described fourth example is similar to the above-described second example except that one or both of the processing unit 100A and the processing unit 100C are implemented by a processor or processing circuit included in the information processing apparatus 11. That is, the information processing apparatus 11 may be a terminal apparatus or server for exchanging information with an external service. Furthermore, the information processing apparatus 12 may be a server or a terminal apparatus.

Fifth Example

Figure 38:
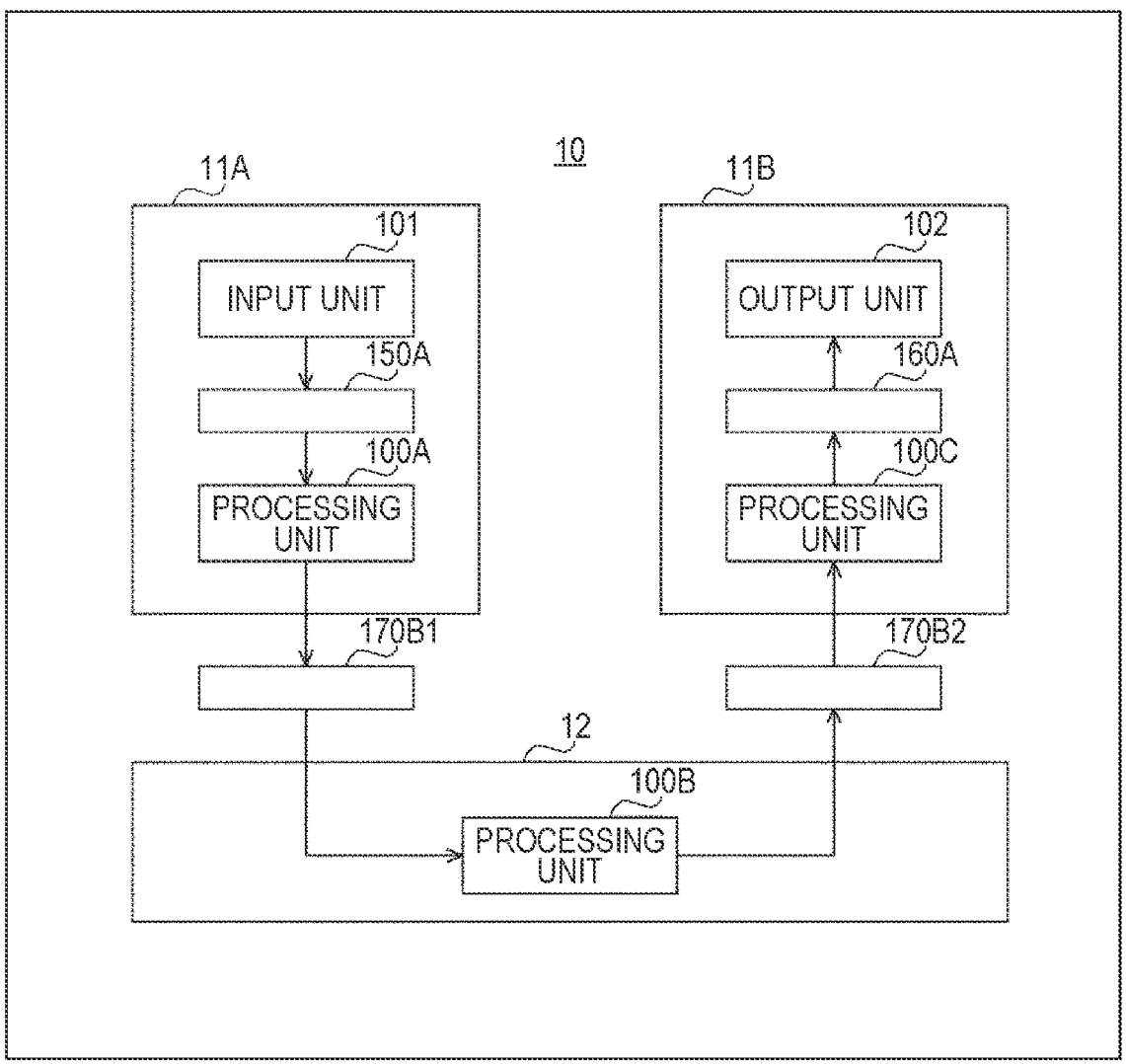
FIG. 38 is a block diagram illustrating a fifth example of the system configuration according to the embodiment of the present disclosure.

FIG. 38 is a block diagram illustrating a fifth example of the system configuration according to the embodiment of the present disclosure.

With reference to FIG. 38, the system 10 includes the information processing apparatuses 11A, 11B, and 12. The input unit 101 is implemented in the information processing apparatus 11A. The output unit 102 is implemented in an information processing apparatus 11B. Furthermore, the processing unit 100 is implemented by being distributed to the information processing apparatuses 11A and 11B, and the information processing apparatus 12.

The information processing apparatus 11A or 11B and the information processing apparatus 12 communicate with each other via a network in order to implement a function according to the embodiment of the present disclosure.

As illustrated, in the fifth example, the processing unit 100 is implemented by being distributed between the information processing apparatus 11A or 11B and the information processing apparatus 12. More specifically, the processing unit 100 includes the processing unit 100A implemented by the information processing apparatus 11A, the processing unit 100B implemented by the information processing apparatus 12, and the processing unit 100C implemented by the information processing apparatus 11B.

Such distribution of the processing unit 100 is similar to the distribution in the above-described fourth example. However, because the information processing apparatus 11A and the information processing apparatus 11B are separate apparatuses in the fifth example, the interfaces 170B1 and 170B2 may include different types of interfaces.

Note that the above-described fifth example is similar to the above-described third example except that one or both of the processing unit 100A and the processing unit 100C are implemented by a processor or processing circuit included in the information processing apparatus 11A or the information processing apparatus 11B.

That is, the information processing apparatuses 11A and 11B may be a terminal apparatus or server for exchanging information with an external service. Furthermore, the information processing apparatus 12 may be a server or a terminal apparatus. Furthermore, although a processing unit in a terminal or server having an input unit and output unit will be omitted in the examples described below, any or all of the apparatuses may have a processing unit.

(Example of Client-Server System)

Figure 39:
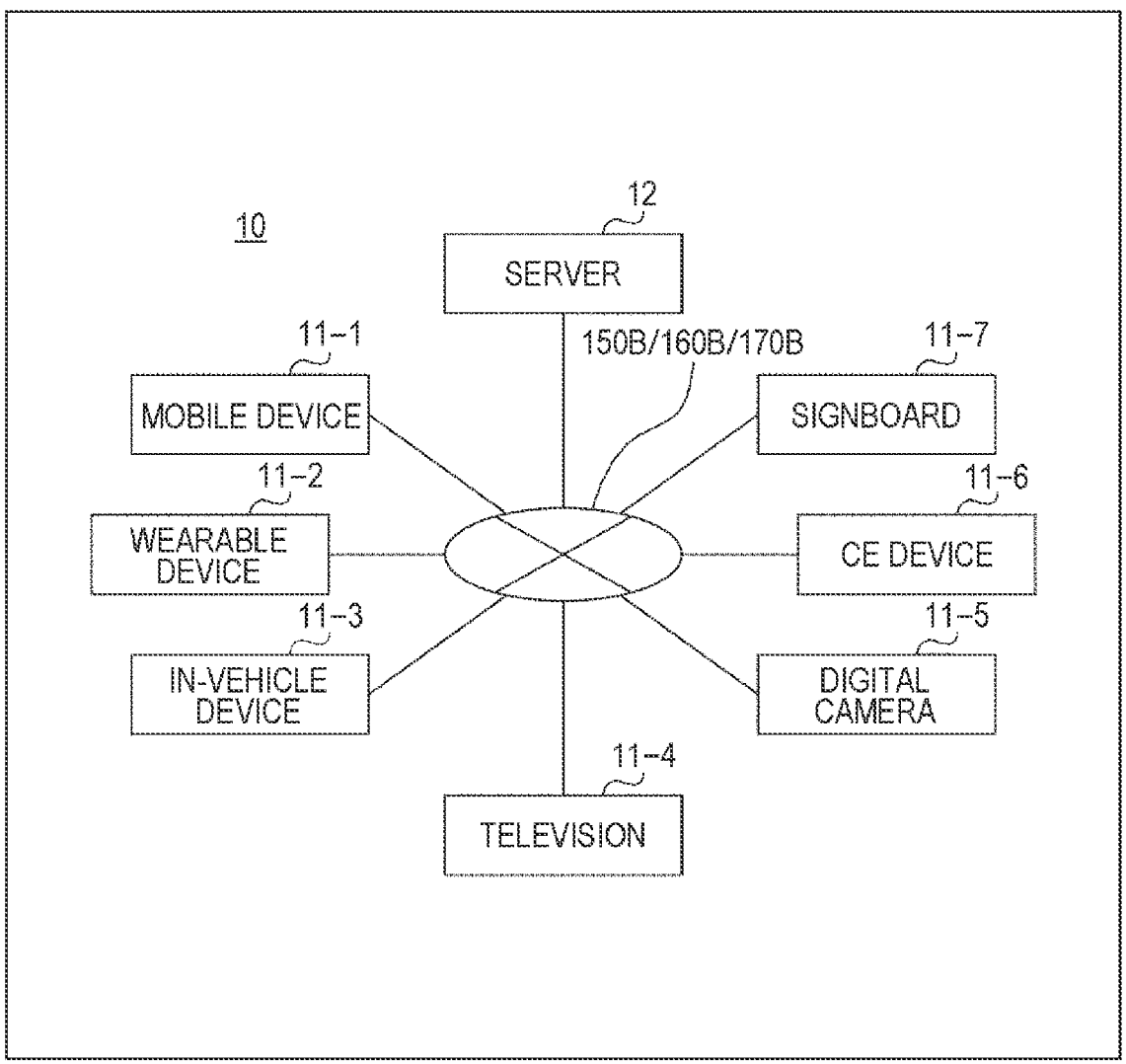
FIG. 39 is a diagram illustrating a client-server system as one of more specific examples of the system configuration according to the embodiment of the present disclosure.

FIG. 39 is a diagram illustrating a client-server system as one of more specific examples of the system configuration according to the embodiment of the present disclosure. In the illustrated example, the information processing apparatus 11 (or the information processing apparatus 11A or 11B) is a terminal apparatus, and the information processing apparatus 12 is a server.

As illustrated, the terminal apparatus may include, for example, a mobile device 11-1, an in-vehicle device 11-3, a television receiver 11-4, a digital camera 11-5, a consumer electronics (CE) device 11-6, a signboard 11-7, and the like.

The mobile device 11-1 includes a smartphone, a tablet terminal, a notebook personal computer (PC), or the like. A wearable device 11-2 includes an eyewear or contact-lens-type terminal, a wristwatch-type terminal, a wristband-type terminal, a ring-type terminal, a headset, a terminal attached to or integrated in clothing, a terminal attached to or integrated in a shoe, a necklace-type terminal, or the like.

The in-vehicle device 11-3 includes the wearable device 11-2, a car navigation system, a rear seat entertainment system, or the like. The CE device 11-6 includes a recorder, a game machine, an air conditioner, a refrigerator, a washing machine, a desktop PC, or the like. The signboard 11-7 includes a robot apparatus, a device including a sensor attached to equipment and installed, or a digital signboard (digital signage) installed on a street, and the like.

These information processing apparatuses 11 (terminal apparatuses) communicate with the information processing apparatus 12 (server) via a network. The network between the terminal apparatus and the server corresponds to the interface 150B, interface 160B, or interface 170B in the above-described examples. Moreover, these apparatuses may individually perform coordinated operation between the apparatuses, or a system in which all the apparatuses can perform coordinated operation may be constructed.

Note that the example illustrated in FIG. 39 is provided to facilitate understanding of an example in which the system 10 is implemented in a client-server system, and the system 10 is not limited to such a client-server system, as described in each of the above-described examples.

That is, for example, both the information processing apparatuses 11 and 12 may be terminal apparatuses, or both the information processing apparatuses 11 and 12 may be servers. In a case where the information processing apparatus 11 includes the information processing apparatuses 11A and 11B, either one of the information processing apparatuses 11A and 11B may be a terminal apparatus and another one may be a server.

Furthermore, also in a case where the information processing apparatus 11 is a terminal apparatus, examples of the terminal apparatus are not limited to the above-described terminal apparatuses 11-1 to 11-7, and another type of terminal apparatus may be included.

(Hardware Configuration)

Figure 40:
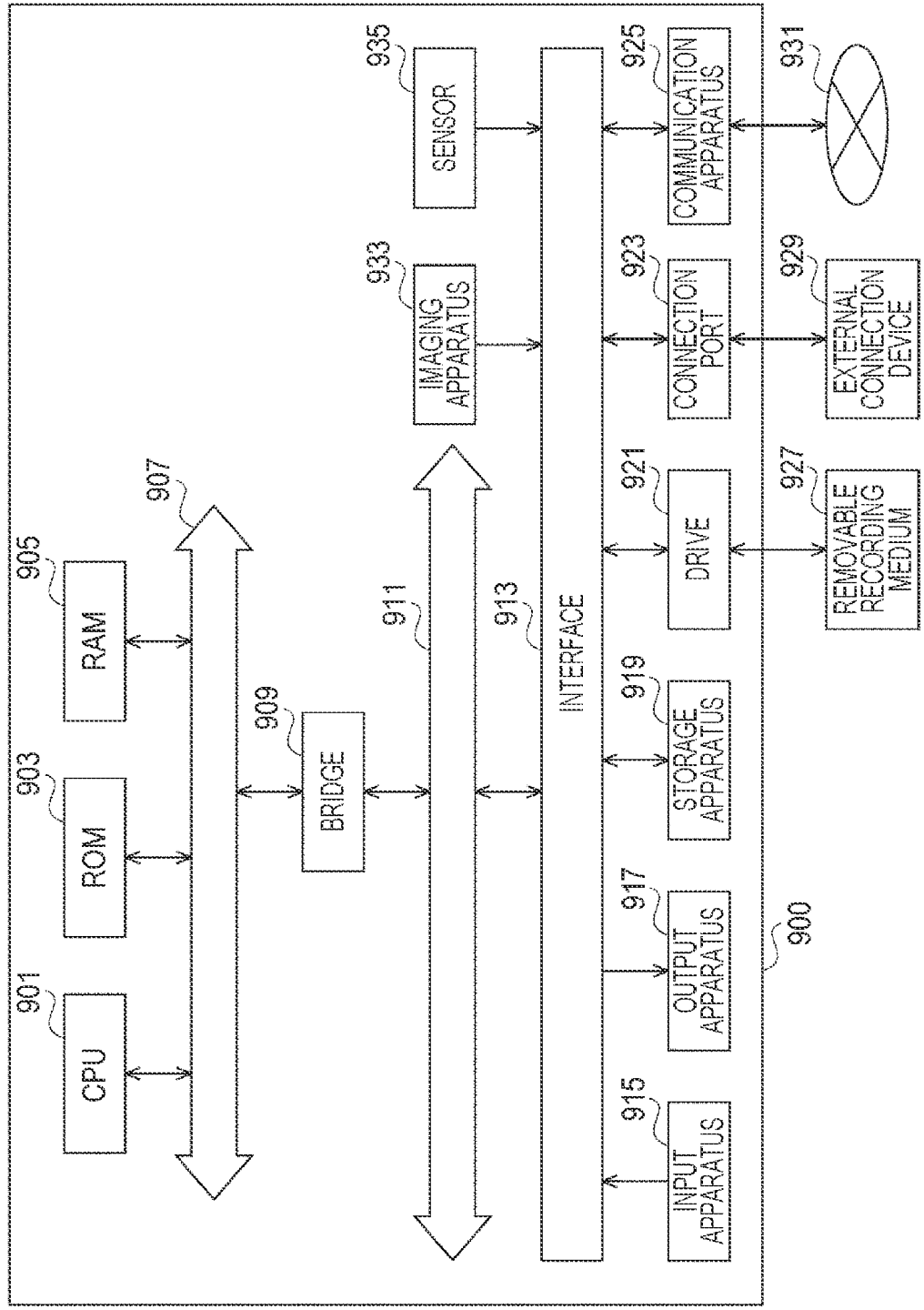
FIG. 40 is a block diagram illustrating a hardware configuration example of an information processing apparatus according to the embodiment of the present disclosure.

Next, a hardware configuration of the information processing apparatus according to the embodiment of the present disclosure will be described with reference to FIG. 40. FIG. 40 is a block diagram illustrating a hardware configuration example of the information processing apparatus according to the embodiment of the present disclosure.

The information processing apparatus 900 includes a central processing unit (CPU) 901, a read only memory (ROM) 903, and a random access memory (RAM) 905. Furthermore, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925.

Moreover, the information processing apparatus 900 may include an imaging apparatus 933 and a sensor 935 as necessary. The information processing apparatus 900 may have a processing circuit such as a digital signal processor (DSP), an application specific integrated circuit (ASIC), or a field programmable gate array (FPGA) in place of or in addition to the CPU 901.

The CPU 901 functions as an arithmetic processing apparatus and a control apparatus, and controls an entire or a part of operation in the information processing apparatus 900 in accordance with a program of various kinds recorded in the ROM 903, the RAM 905, the storage apparatus 919, or a removable recording medium 927.

The ROM 903 stores a program, a calculation parameter, or the like, that is used by the CPU 901. The RAM 905 primarily stores a program used in execution of the CPU 901, a parameter that changes as appropriate in the execution, or the like. The CPU 901, the ROM 903, and the RAM 905 are interconnected by the host bus 907 configured by an internal bus such as a CPU bus. Moreover, the host bus 907 is connected to the external bus 911 such as a peripheral component interconnect/interface (PCI) bus via the bridge 909.

The input apparatus 915 is an apparatus such as a mouse, a keyboard, a touch panel, a button, a switch, and a lever for example, which is operated by the user. The input apparatus 915 may be, for example, a remote control apparatus utilizing infrared light or another radio wave, or may be an external connection device 929 such as a mobile phone corresponding to operation of the information processing apparatus 900.

The input apparatus 915 includes an input control circuit that generates an input signal on the basis of information input by the user and outputs the input signal to the CPU 901. By operating this input apparatus 915, the user inputs various kinds of data to the information processing apparatus 900, or gives an instruction on processing operation.

The output apparatus 917 is configured by an apparatus capable of, by using a sense such as a visual sense, an auditory sense, or a tactile sense, notifying the user of acquired information. The output apparatus 917 may be, for example, a display apparatus such as a liquid crystal display (LCD) or an organic electro-luminescence (EL) display, an audio output apparatus such as a speaker or headphones, a vibrator, or the like. The output apparatus 917 outputs a result obtained by processing by the information processing apparatus 900 as a screen image such as text or an image, audio such as voice or sound, vibration, or the like.

The storage apparatus 919 is a data storage apparatus configured as an example of a storage unit of the information processing apparatus 900. The storage apparatus 919 includes, for example, a magnetic storage unit device such as a hard disk drive (HDD), a semiconductor storage device, an optical storage device, or a magneto-optical storage device. The storage apparatus 919 stores, for example, a program executed by the CPU 901, various kinds of data, various kinds of data acquired from an outside, or the like.

The drive 921 is a reader/writer for the removable recording medium 927 such as a magnetic disk, an optical disk, a magneto-optical disk, or a semiconductor memory, and built in or externally attached to the information processing apparatus 900. The drive 921 reads information recorded in the removable recording medium 927 that is mounted and outputs the information to the RAM 905. Furthermore, the drive 921 writes record in the removable recording medium 927 that is mounted.

The connection port 923 is a port for directly connecting a device to the information processing apparatus 900. The connection port 923 may be, for example, a universal serial bus (USB) port, an IEEE1394 port, a small computer system interface (SCSI) port, or the like.

Furthermore, the connection port 923 may be an RS-232C port, an optical audio terminal, a high-definition multimedia interface (HDMI (registered trademark)) port, or the like. By connecting the external connection device 929 to the connection port 923, various kinds of data may be exchanged between the information processing apparatus 900 and the external connection device 929.

The communication apparatus 925 is, for example, a communication interface including a communication device, or the like, for connecting to a communication network 931. The communication apparatus 925 may be, for example, a communication card for a local area network (LAN), Bluetooth (registered trademark), Wi-Fi, a wireless USB (WUSB), or the like.

Furthermore, the communication apparatus 925 may be a router for optical communication, a router for asymmetric digital subscriber line (ADSL), a modem for communication of various kinds, or the like. The communication apparatus 925 transmits and receives a signal, or the like, with, for example, the Internet or another communication device by using a predetermined protocol such as Transmission Control Protocol/Internet Protocol (TCP/IP).

Furthermore, the communication network 931 connected to the communication apparatus 925 is a network connected by wire or wirelessly, and may include, for example, the Internet, a home LAN, infrared communication, radio wave communication, satellite communication, or the like.

The imaging apparatus 933 is an apparatus that images real space by using, for example, an image sensor such as a complementary metal oxide semiconductor (CMOS) or a charge coupled device (CCD), and a member of various kinds such as a lens for controlling image formation of an object image to the image sensor, and generates a captured image. The imaging apparatus 933 may capture a still image, or may capture a moving image.

The sensor 935 is, for example, a sensor of various kinds, such as an acceleration sensor, an angular velocity sensor, a geomagnetic sensor, an illuminance sensor, a temperature sensor, an atmospheric pressure sensor, or a sound sensor (microphone).

The sensor 935 acquires information regarding surrounding environment of the information processing apparatus 900, such as information regarding a state of the information processing apparatus 900 itself including, for example, orientation of a housing of the information processing apparatus 900, brightness or noise surrounding the information processing apparatus 900, or the like. Furthermore, the sensor 935 may include a global positioning system (GPS) receiver that receives a GPS signal and measures a latitude, longitude, and altitude of an apparatus.

An example of the hardware configuration of the information processing apparatus 900 has been described above. Each of the components described above may be configured by using a general-purpose member, or may be configured by hardware dedicated to a function of each of the components. Such a configuration may be changed as appropriate according to a technical level at a time of implementation.

Note that, in the present disclosure, processing performed by a computer according to the program does not necessarily have to be performed in time series in an order described as a flowchart. That is, processing performed by the computer according to a program also includes processing that is executed in parallel or individually (for example, parallel processing or object processing). Furthermore, the program may be processed by one computer (processor) or may be subjected to distributed processing by a plurality of computers.

Note that embodiments of the present technology are not limited to the above-described embodiments, and various changes can be made without departing from the scope of the present technology.

Furthermore, the following configurations can be used for the present technology.

(1)

An information processing apparatus including a processing unit that generates, on the basis of a message transmitted from a sharing source device that performs screen sharing, identification information that identifies the information processing apparatus serving as a sharing candidate device as a candidate for screen sharing, provides the sharing source device with device information regarding the information processing apparatus, and outputs the generated identification information.

(2)

The information processing apparatus according to (1),
in which the device information includes information regarding the identification information.

(3)

The information processing apparatus according to (2),
in which the processing unit controls display of the generated identification information, and provides the generated identification information to the sharing source device on the basis of the device information.

(4)

The information processing apparatus according to (3),
in which the identification information includes an image, text, or a code.

(5)

The information processing apparatus according to (4),
in which the identification information corresponds to an image displayed on a display of the sharing source device.

(6)

The information processing apparatus according to (4),
the information processing apparatus further including a display unit, in which the processing unit controls display of the identification information on the display unit, and the identification information is displayed on a display of the sharing source device.

(7)

The information processing apparatus according to any one of (2) to (6), pin which the processing unit generates a two-dimensional code that identifies the information processing apparatus, controls display of the generated two-dimensional code, and provides the sharing source device with the device information including information regarding the two-dimensional code.

(8)

The information processing apparatus according to any one of (2) to (7), in which the processing unit generates information regarding sound or regarding light, the information identifying the information processing apparatus, controls output of the sound or output of the light, and provides the sharing source device with the device information including information regarding the sound or regarding the light.

(9)

The information processing apparatus according to any one of (2) to (8), in which the processing unit generates information regarding sound or regarding an image, the information identifying the information processing apparatus, controls output of the sound or display of the image, and provides the sharing source device with the device information including information regarding the sound or regarding the image.

(10)

The information processing apparatus according to any one of (2) to (9), in which the device information includes information regarding the identification information corresponding to a plurality of methods.

(11)

An information processing method including, by an information processing apparatus, generating, on the basis of a message transmitted from a sharing source device that performs screen sharing, identification information that identifies the information processing apparatus serving as a sharing candidate device as a candidate for screen sharing, providing the sharing source device with device information regarding the information processing apparatus, and outputting the generated identification information.

(12)

An information processing apparatus including a processing unit that acquires device information regarding a sharing candidate device as a candidate for screen sharing, acquires identification information that identifies the sharing candidate device, and decides, on the basis of the acquired device information and the acquired identification information, a sharing target device as a target for screen sharing from among a plurality of the sharing candidate devices.

(13)

The information processing apparatus according to (12),
in which the device information includes information regarding the identification information.

(14)

The information processing apparatus according to (13),
in which the processing unit acquires the identification information on the basis of the acquired device information, controls display of the acquired identification information, and decides, according to operation by a user, the sharing target device corresponding to the identification information that is displayed.

(15)

The information processing apparatus according to (14),
in which the identification information includes an image, text, or a code.

(16)

The information processing apparatus according to (15),
in which the identification information corresponds to an image displayed on a display of the sharing target device.

(17)

The information processing apparatus according to any one of (13) to (16), in which the processing unit controls, according to operation by a user, reading of a two-dimensional code displayed on the sharing candidate device, and decides the sharing target device on the basis of the read two-dimensional code and the device information.

(18)

The information processing apparatus according to any one of (13) to (17), in which the processing unit controls sensing of physical quantity regarding sound or light output from the sharing candidate device, and decides the sharing target device on the basis of a pattern of the sensed physical quantity and the device information.

(19)

The information processing apparatus according to any one of (13) to (18),
in which the processing unit
extracts a fingerprint from sound or an image output from the sharing candidate device, and
decides the sharing target device on the basis of the extracted fingerprint and the device information.

(20)

The information processing apparatus according to any one of (13) to (19),
in which the device information includes information regarding the identification information corresponding to a plurality of methods, and
the processing unit decides the sharing target device according to a specific method identified by the device information.

REFERENCE SIGNS LIST

1 Content reproduction system
10 Information device
20, 20-1 to 20-N Display device
21 Remote controller
30 Router
40, 40-1 to 40-M Distribution server
50 Transmitter
80 Network
90 Network
100 Processing unit
101 Input unit
102 Output unit
103 Memory
104 Storage unit
105 Communication unit
106 Sensor
107 Camera
108 Power supply unit
111 Button
112 Microphone
121 Display
122 Speaker
131 Device information acquisition unit
132 Identification information acquisition unit
133 Sharing target device decision unit
134 Presentation control unit
135 Communication control unit
200 Processing unit
201 Tuner
202 Signal input unit
203 Data processing unit
204 Display
205 Speaker
206 Communication unit
207 Operation reception unit
208 Output unit
231 Device information provision unit
232 Identification information generation unit
233 Output control unit
234 Communication control unit
901 CPU

The invention claimed is:

1. An information processing apparatus comprising a processing unit that
generates, on a basis of a message transmitted from a sharing source device that performs screen sharing, identification information that identifies the information processing apparatus serving as a sharing candidate device as a candidate for screen sharing,
provides the sharing source device with device information regarding the information processing apparatus such that content to be shared is displayed along with a name of the information processing apparatus and an image displayed on the information processing apparatus are displayed on a selection screen of the sharing source device based on the device information, and
outputs the generated identification information.

2. The information processing apparatus according to claim 1,
wherein the device information includes information regarding the identification information.

3. The information processing apparatus according to claim 2,
wherein the processing unit controls display of the generated identification information, and
provides the generated identification information to the sharing source device on a basis of the device information.

4. The information processing apparatus according to claim 3,
wherein the identification information includes an image, text, or a code.

5. The information processing apparatus according to claim 4,
wherein the identification information corresponds to an image displayed on a display of the sharing source device.

6. The information processing apparatus according to claim 4, the information processing apparatus further comprising a display unit,
wherein the processing unit
controls display of the identification information on the display unit, and
the identification information is displayed on a display of the sharing source device.

7. The information processing apparatus according to claim 2,
wherein the processing unit
generates a two-dimensional code that identifies the information processing apparatus, controls display of the generated two-dimensional code, and
provides the sharing source device with the device information including information regarding the two-dimensional code.

8. The information processing apparatus according to claim 2,
wherein the processing unit
generates information regarding sound or regarding light, the information identifying the information processing apparatus,
controls output of the sound or output of the light, and
provides the sharing source device with the device information including information regarding the sound or regarding the light.

9. The information processing apparatus according to claim 2,
wherein the processing unit
generates information regarding sound or regarding an image, the information identifying the information processing apparatus,
controls output of the sound or display of the image, and provides the sharing source device with the device information including information regarding the sound or regarding the image.

10. The information processing apparatus according to claim 2,
wherein the device information includes information regarding the identification information corresponding to a plurality of methods.

11. An information processing method comprising,
by an information processing apparatus:
generating, on a basis of a message transmitted from a sharing source device that performs screen sharing, identification information that identifies the information processing apparatus serving as a sharing candidate device as a candidate for screen sharing,
providing the sharing source device with device information regarding the information processing apparatus such that content to be shared is displayed along with a name of the information processing apparatus and an image displayed on the information processing apparatus are displayed on a selection screen of the sharing source device based on the device information, and
outputting the generated identification information.

* * * * *